United States Patent
Shinohara et al.

(10) Patent No.: US 10,114,226 B2
(45) Date of Patent: Oct. 30, 2018

(54) OPTICAL DEVICE

(71) Applicant: OMRON Corporation, Kyoto-shi, Kyoto (JP)

(72) Inventors: Masayuki Shinohara, Kyoto (JP); Norikazu Kitamura, Osaka (JP); Yasuhiro Tanoue, Shiga (JP); Mitsuru Okuda, Shiga (JP); Kazuyuki Okada, Shiga (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/455,590

(22) Filed: Mar. 10, 2017

(65) Prior Publication Data

US 2017/0192244 A1    Jul. 6, 2017

Related U.S. Application Data

(63) Continuation of application No. PCT/JP2015/075718, filed on Sep. 10, 2015.

(30) Foreign Application Priority Data

Oct. 6, 2014  (JP) ................. 2014-205574
Dec. 11, 2014 (JP) ................. 2014-250981
Jul. 31, 2015 (JP) ................. 2015-152395

(51) Int. Cl.
*G02B 27/22*  (2018.01)
*F21V 8/00*    (2006.01)
*G02B 3/08*    (2006.01)

(52) U.S. Cl.
CPC .......... *G02B 27/2214* (2013.01); *G02B 3/08* (2013.01); *G02B 6/003* (2013.01); *G02B 6/0035* (2013.01);
(Continued)

(58) Field of Classification Search
CPC .......... G02B 27/2214; G02B 27/2235; G02B 27/01; G02B 27/0101; G02B 3/08;
(Continued)

(56) References Cited

U.S. PATENT DOCUMENTS 7,042,637 B2 * 5/2006 Mukawa ............. G03B 21/005
                                                  345/102
9,256,007 B2 * 2/2016 Vasylyev ............ G02B 3/005
(Continued)

FOREIGN PATENT DOCUMENTS

JP    2000-510603 A    8/2000
JP    2008-275922 A    11/2008
(Continued)

OTHER PUBLICATIONS

Phys128A/B, UCSB, https://web.archive.org/web/20140513154705/http://web.physics.ucsb.edu/~phys128/experiments/holography/HolographyFall06.pdf, Oct. 2006.*
(Continued)

*Primary Examiner* — Collin X Beatty
(74) *Attorney, Agent, or Firm* — Metrolexis Law Group, PLLC

(57) ABSTRACT

An optical device includes a light guiding plate which guides lights within the surface parallel to an emission surface, and light converging sections onto which the lights guided by the light guiding plate are incident, each of the light converging sections having an optical surface which allows an emitted light to be emitted from the emission surface in a direction where the emitted light is to be substantially converged on one convergence point or convergence line in space or to be substantially diverged from one convergence point or convergence line in space. The light converging sections are formed respectively along a predetermined line within the surface parallel to the emission surface, and the convergence points or the convergence lines are different from each other among the light converging sections, and an image is formed in space by an aggregation of the convergence points or the convergence lines.

35 Claims, 88 Drawing Sheets

(52) U.S. Cl.
CPC ....... *G02B 6/0038* (2013.01); *G02B 27/2235* (2013.01)

(58) Field of Classification Search
CPC .... G02B 6/003; G02B 6/0035; G02B 6/0038; G02B 2027/011; G02B 2027/0174; G02B 5/1857; G03H 1/0248; G03H 1/28; G03H 1/265; G03H 2001/2239
USPC ... 359/13, 15, 22, 24, 32, 34, 463, 630–640, 359/464
See application file for complete search history.

(56) References Cited

U.S. PATENT DOCUMENTS

| | | | | |
|---|---|---|---|---|
| 9,341,850 | B1* | 5/2016 | Cakmakci | G02B 27/0172 |
| 9,568,662 | B2* | 2/2017 | Lim | G02B 6/0045 |
| 2013/0321913 | A1* | 12/2013 | Harrold | G02B 6/0028 359/464 |
| 2014/0168735 | A1* | 6/2014 | Yuan | G02B 27/0103 359/12 |
| 2014/0268327 | A1 | 9/2014 | Dunn et al. | |

FOREIGN PATENT DOCUMENTS

| | | |
|---|---|---|
| JP | 2009-540440 A | 11/2009 |
| JP | 2012-008464 A | 1/2012 |
| JP | 5701434 B1 | 4/2015 |
| WO | 2012/077360 A1 | 6/2012 |

OTHER PUBLICATIONS

Chinese office action letter dated Apr. 25, 2018 in a counterpart Chinese patent application.
Chinese office action letter dated Aug. 7, 2018 in a counterpart Chinese patent application.

* cited by examiner

730

732

740a 740b 740c 740d 740e 740f 740g 740h

790

| ψ | 5° | 10° | 15° | 20° |
|---|---|---|---|---|
| SUBJECT A | × | × | × | ○ |
| SUBJECT B | × | × | × | ○ |
| SUBJECT C | × | × | ○ | ○ |
| SUBJECT D | × | × | × | ○ |
| SUBJECT E | × | × | × | ○ |

OPTICAL DEVICE

The contents of the following Japanese patent application and international application are incorporated herein by reference, Japanese Patent Application No. 2014-205574 filed on Oct. 6, 2014, Japanese Patent Application No. 2014-250981 filed on Dec. 11, 2014, Japanese Patent Application No. 2015-152395 filed on Jul. 31, 2015, and International Application No. PCT/JP2015/075718 filed on Sep. 10, 2015.

BACKGROUND

1. Technical Field

The present invention relates to an optical device.

2. Related Art

A display apparatus allowing a stereoscopic vision has been known, which includes a light guiding plate, a light source, and a mask or a lens array arranged on a front surface side of the light guiding plate in a parallax barrier manner or a lens array manner (for example, refer to Patent Document 1).

[Patent Document 1] Japanese Patent Application Publication No. 2012-008464

SUMMARY

As using a mask or a lens array, a configuration of an optical device becomes complicated. Also, a stereoscopic image is deformed and is easy to be recognized in some cases. Also, it is not easy to form a stereoscopic image by lights from a transparent optical device. For example, as shown in FIG. 92A, in a case of viewing with both eyes a display device 9000 in which a right-eye image 9001 and a left-eye image 9002 are displayed, only when the right-eye image 9001 is only viewed with the right eye and the left-eye image 9002 is only viewed with the left eye, an object can be seen as if it is in a position of a point 9020 and the focus matches in the position. The point 9020 is an intersection point of a line connecting a correspondence point 9011 in the right-eye image 9001 with the right eye and a line connecting a correspondence point 9012 in the left-eye image 9002 with the left eye. However, if the optical device 9000 is transparent, an observer sees not only the right-eye image 9001 and the left-eye image 9002 but also an object 9003 in the background. For that reason, the object 9003 in the background is focused easily. In this case, for example, as shown in FIG. 92B, to the eyes of the observer, the right-eye image 9001 and the left-eye image 9002 easily look like they are separated.

BRIEF DESCRIPTION OF THE DRAWINGS

FIG. 17 schematically shows a cross section parallel to the xz plane of the display apparatus 10 along with an image visually recognizable by an observer and the like.

Figure 76:
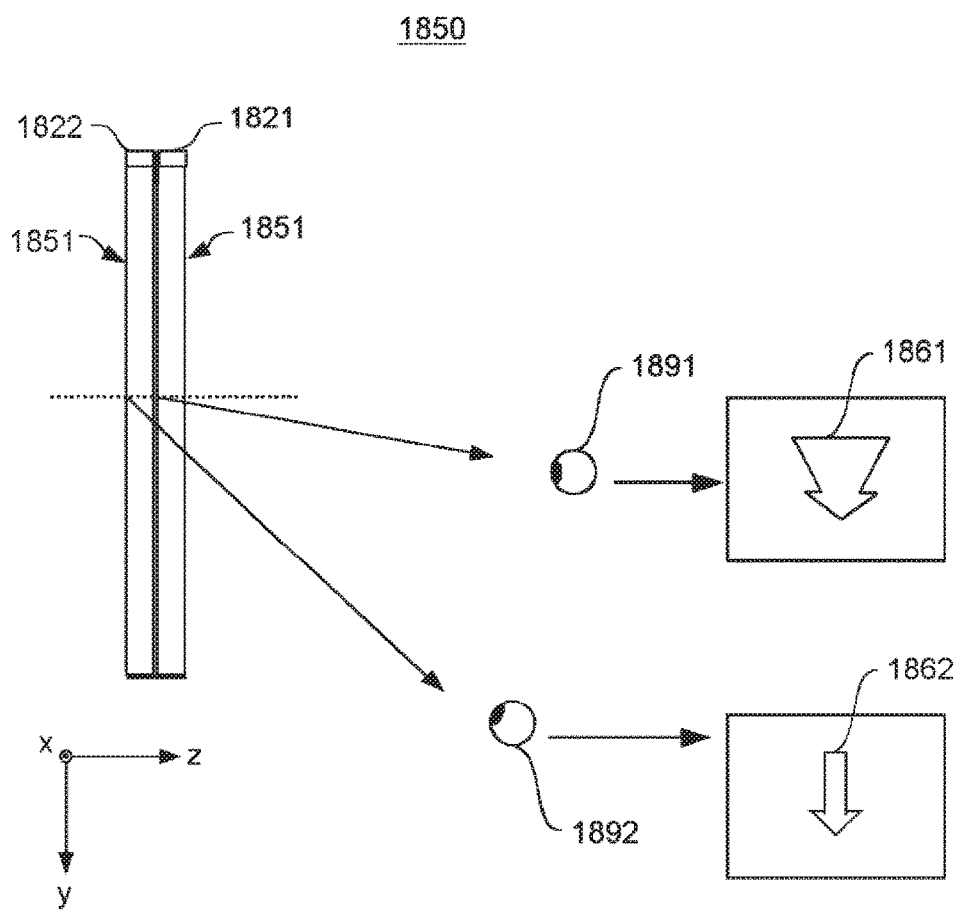

FIG. 76 schematically shows a display apparatus 1850 as a variation of the display apparatus 1800.

Figure 77A:

FIG. 77A is a drawing for describing a configuration for increasing a grayscale of a stereoscopic image.

Figure 77B:
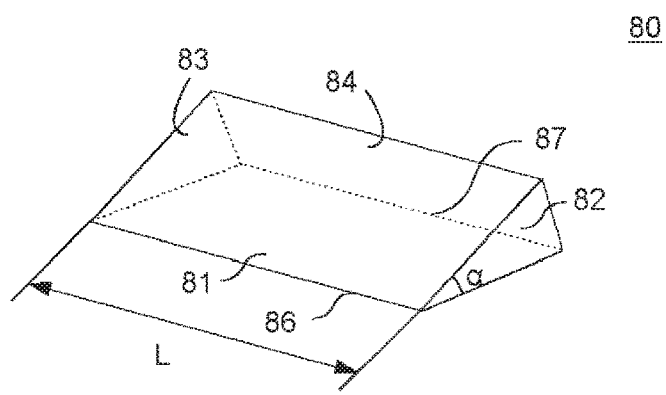

FIG. 77B is a drawing for describing a configuration for increasing a grayscale of a stereoscopic image.

Figure 77C:
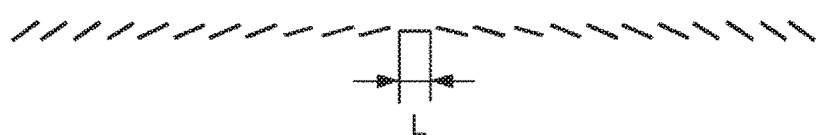

FIG. 77C is a drawing for describing a configuration for increasing a grayscale of a stereoscopic image.

Figure 78A:
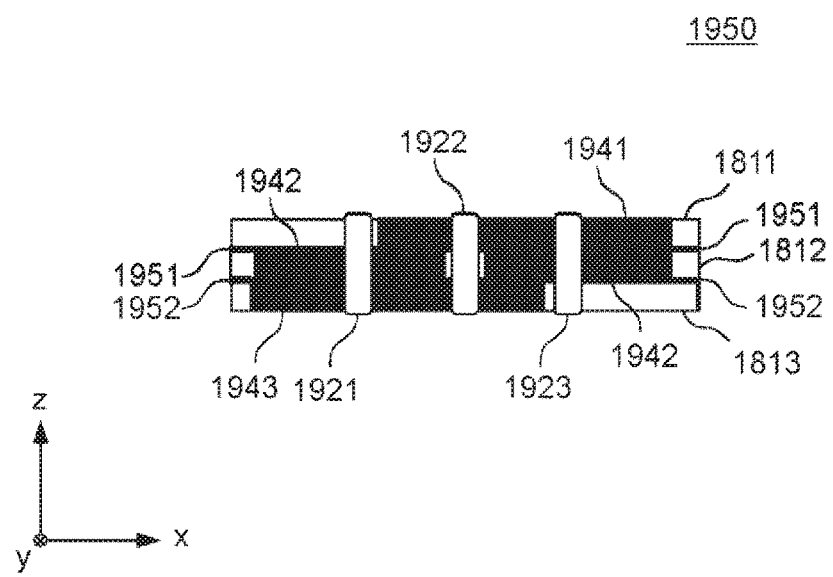

FIG. 78A schematically shows a display apparatus 1950 as a variation of the display apparatus 1900.

Figure 78B:
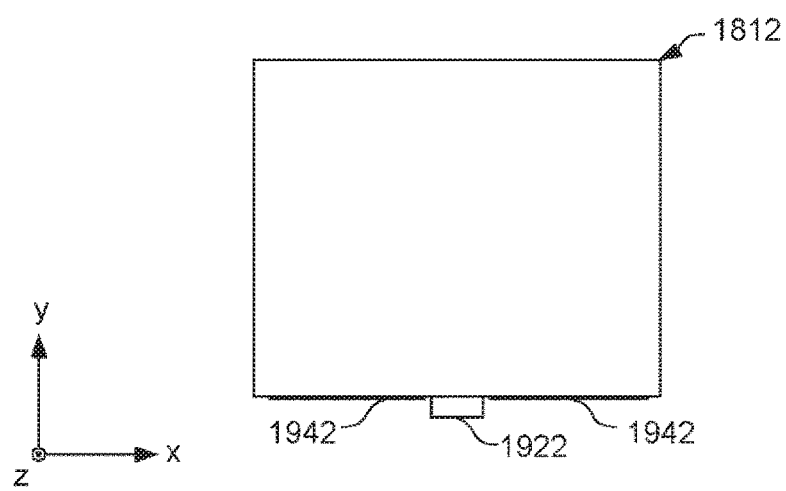

FIG. 78B schematically shows the display apparatus 1950 as a variation of the display apparatus 1900.

Figure 79A:
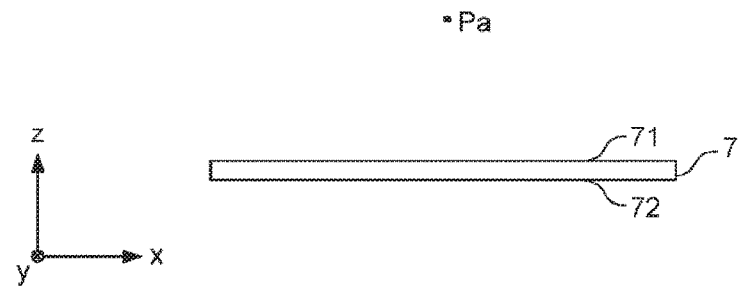

FIG. 79A shows another example of a design method of reflection surfaces in the light guiding plate 7.

Figure 79B:
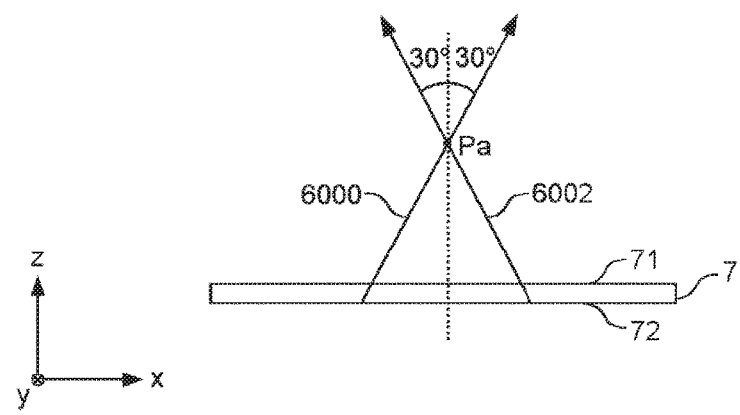

FIG. 79B shows another example of a design method of reflection surfaces in the light guiding plate 7.

Figure 79C:
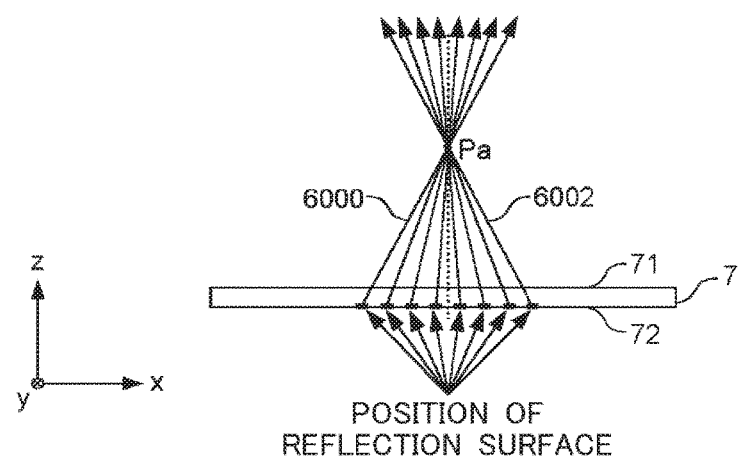

FIG. 79C shows another example of a design method of reflection surfaces in the light guiding plate 7.

Figure 80A:
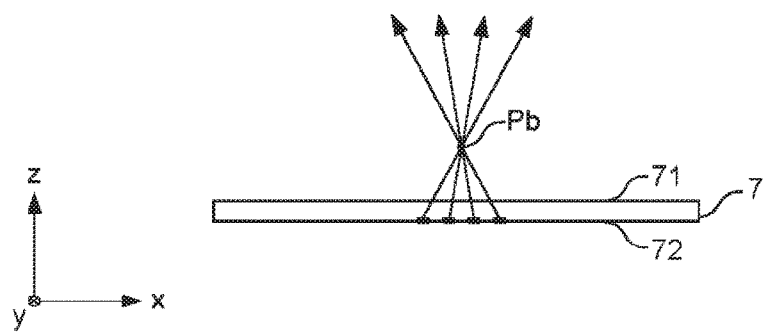

FIG. 80A shows a design example of reflection surfaces corresponding to a fixed point Pb in the vicinity of the main surface 72.

Figure 80B:
Figure 80B:
Figure 80B:
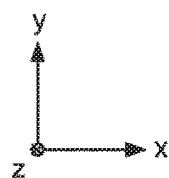

FIG. 80B shows a design example of reflection surfaces corresponding to the fixed point Pb in the vicinity of the main surface 72.

Figure 80C:
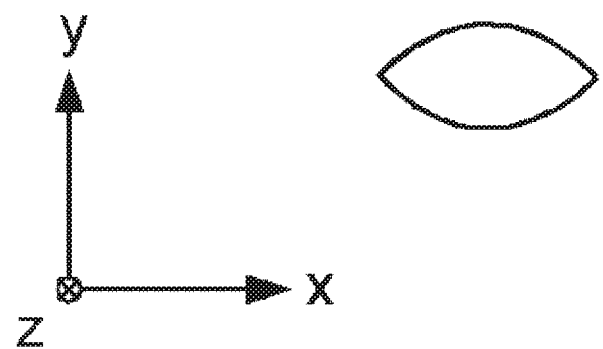

FIG. 80C shows a design example of reflection surfaces corresponding to the fixed point Pb in the vicinity of the main surface 72.

Figure 80D:
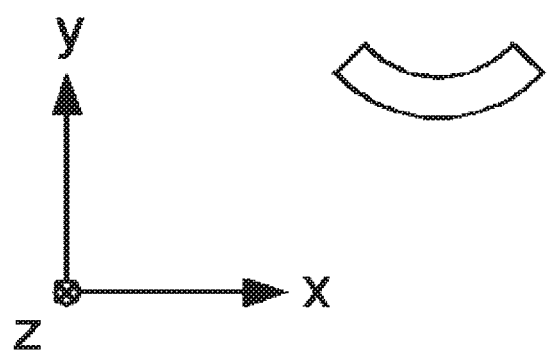

FIG. 80D shows a design example of reflection surfaces corresponding to the fixed point Pb in the vicinity of the main surface 72.

Figure 81A:
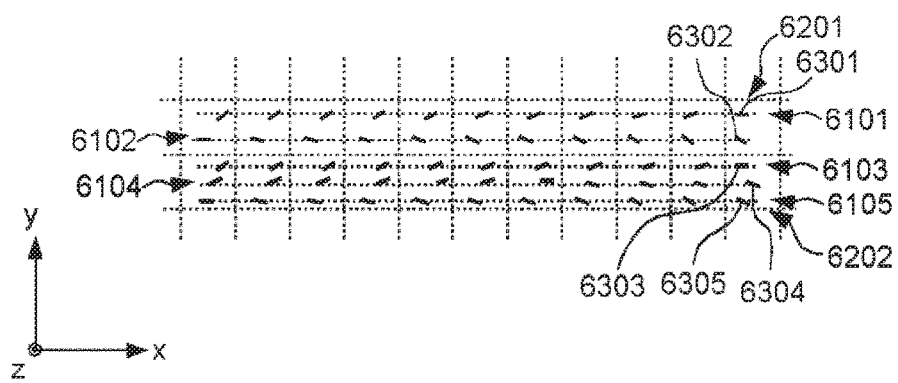

FIG. 81A schematically shows an example where a plurality of reflection surfaces are periodically arranged together.

Figure 81B:
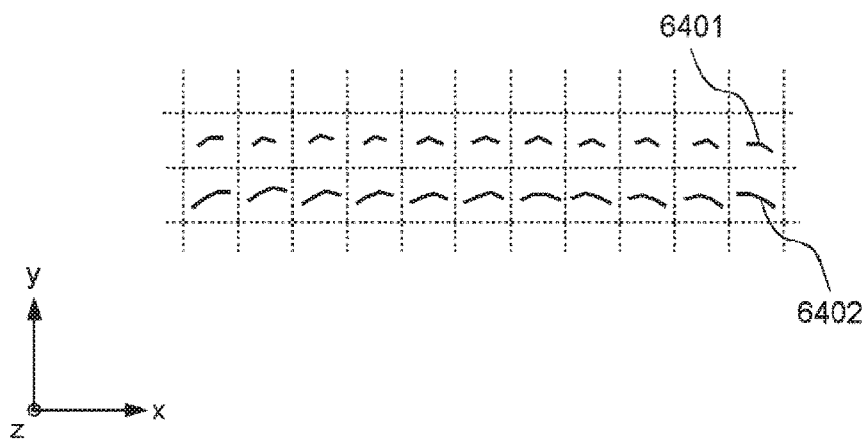

FIG. 81B schematically shows an example where a plurality of reflection surfaces are periodically arranged together.

Figure 82A:
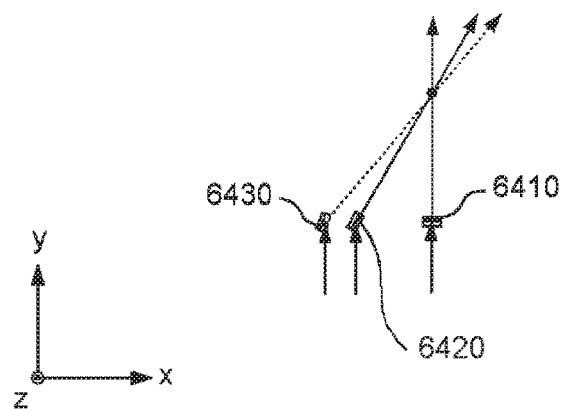

FIG. 82A is a drawing for describing an angle range within which lights can be emitted from the light guiding plate 7.

Figure 82B:
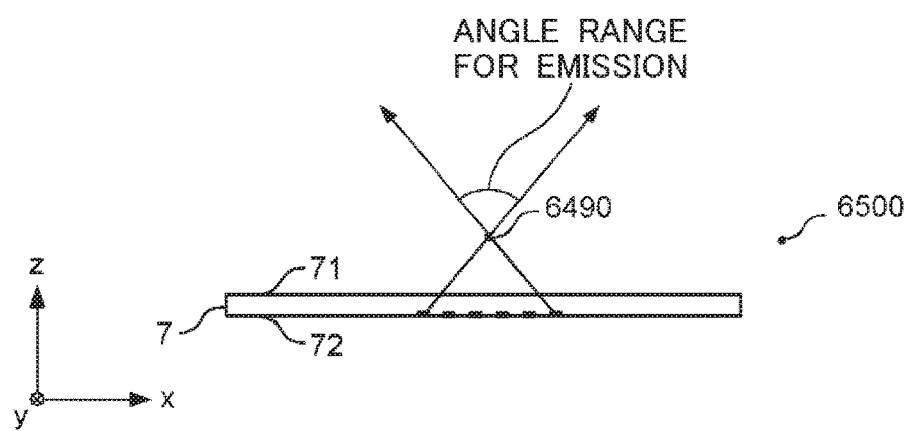

FIG. 82B is a drawing for describing an angle range within which lights can be emitted from the light guiding plate 7.

Figure 83A:
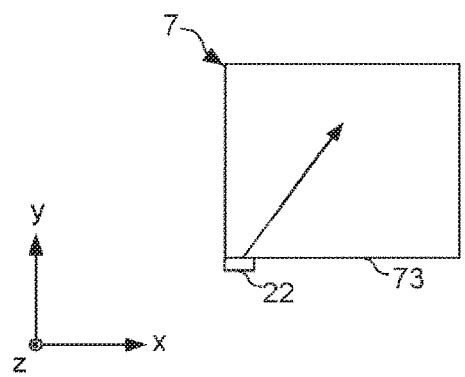

FIG. 83A shows a configuration for forming an image in a position from which reflection surfaces are apart in an alignment direction.

Figure 83B:
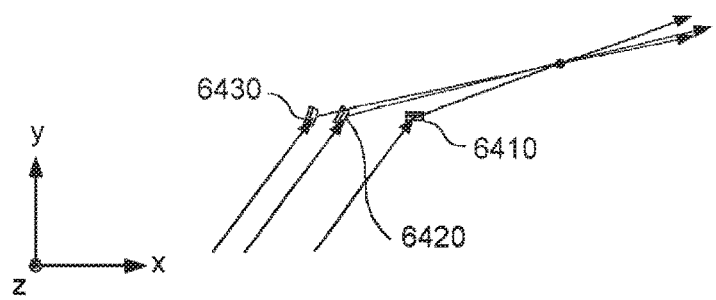

FIG. 83B shows a configuration for forming an image in a position from which reflection surfaces are apart in an alignment direction.

Figure 83C:
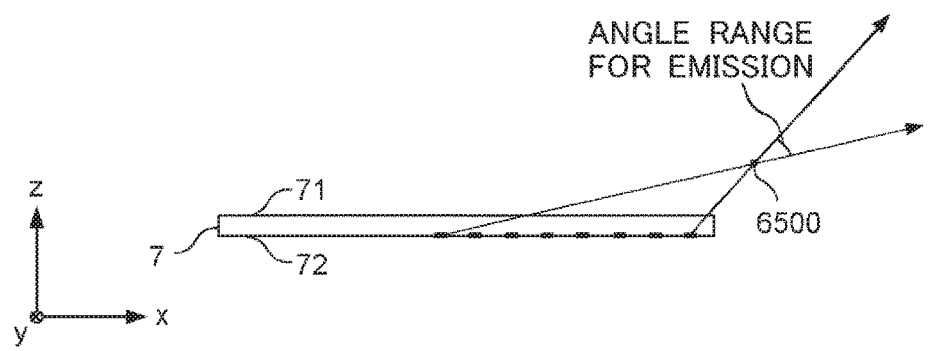

FIG. 83C shows a configuration for forming an image in a position from which reflection surfaces are apart in an alignment direction.

Figure 84:
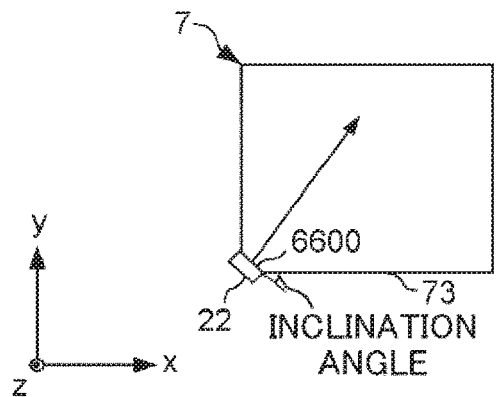

FIG. 84 shows a form where the end surface 73 has an inclination surface in an end portion.

Figure 85:
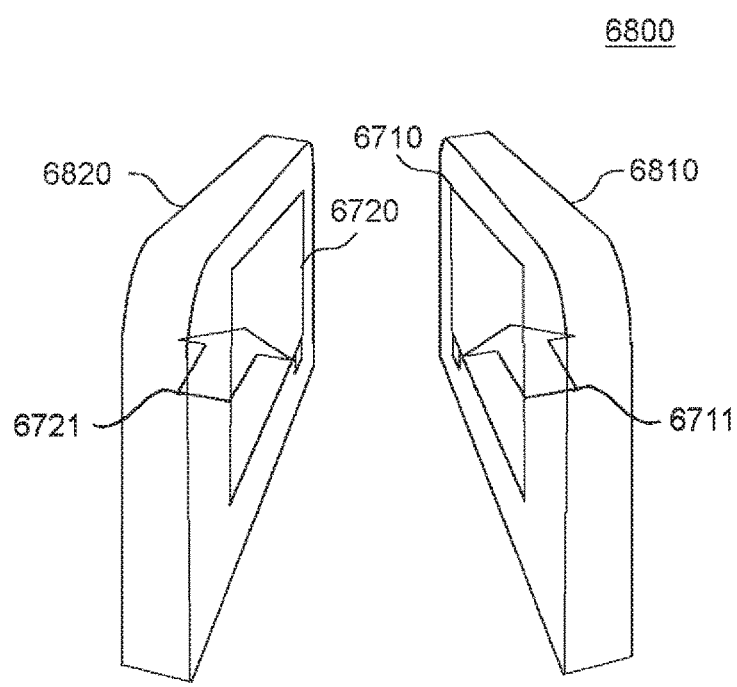

FIG. 85 schematically shows a ticket examination machine system 6800 using a display apparatus 6700 which allows propagation lights to be inclined with respect to the y axis.

Figure 86:
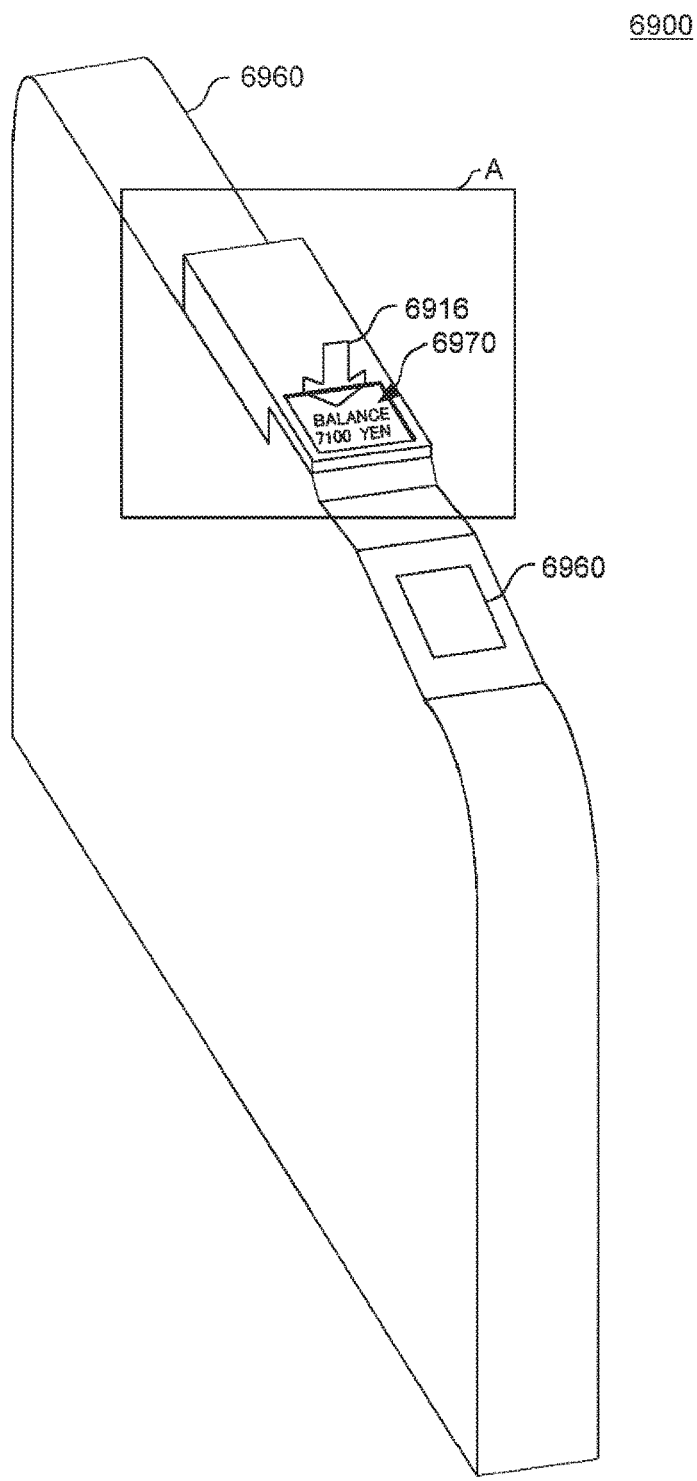

FIG. 86 schematically shows a display apparatus 6910 applied to the ticket examination machine system 6900.

Figure 87:
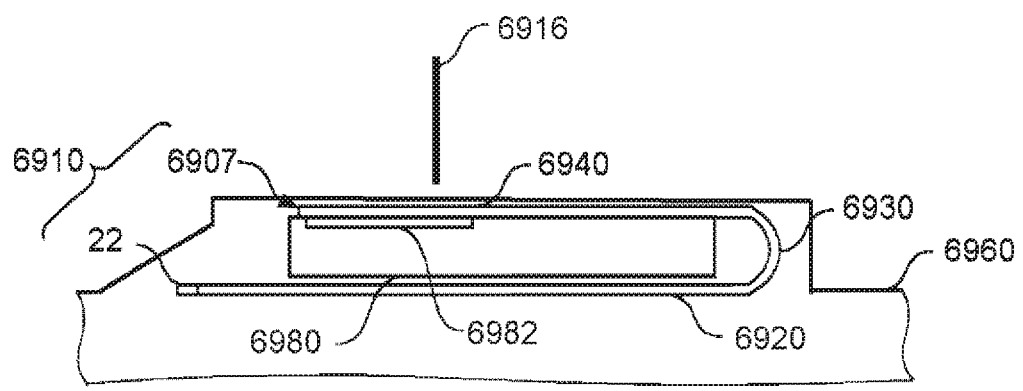

FIG. 87 is a cross-section view of a section A of the ticket examination machine system 6900.

Figure 88:
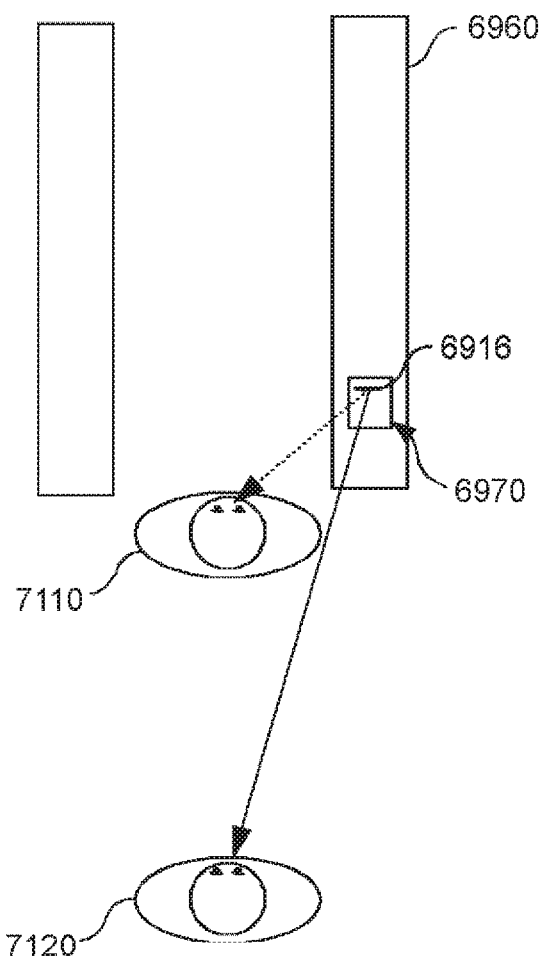

FIG. 88 schematically shows a positional relation of passers for visually recognizing an image 6916.

Figure 89A:
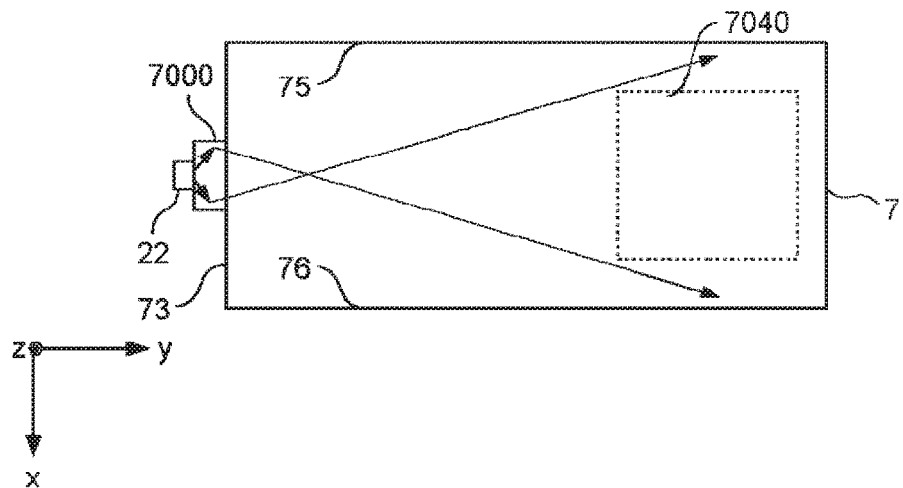

FIG. 89A shows a configuration for making an incident light of the light guiding plate 7 be close to a parallel light.

Figure 89B:
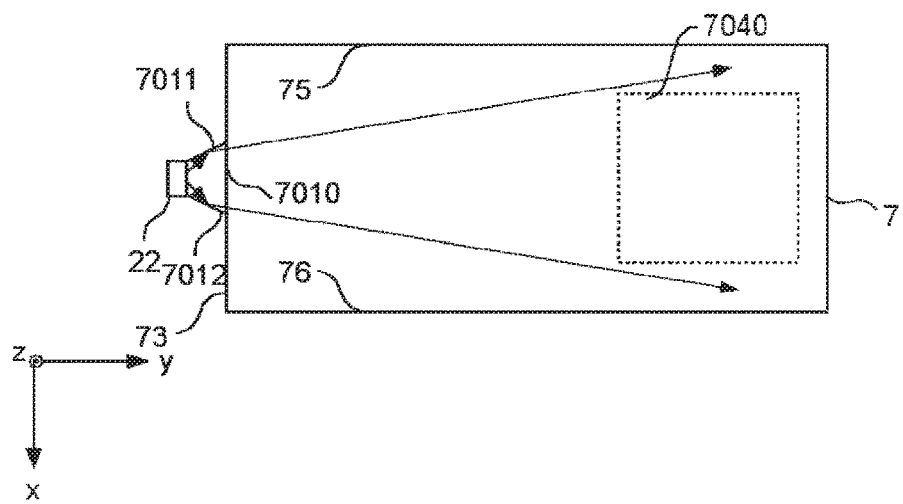

FIG. 89B shows a configuration for making an incident light of the light guiding plate 7 be close to a parallel light.

Figure 89C:
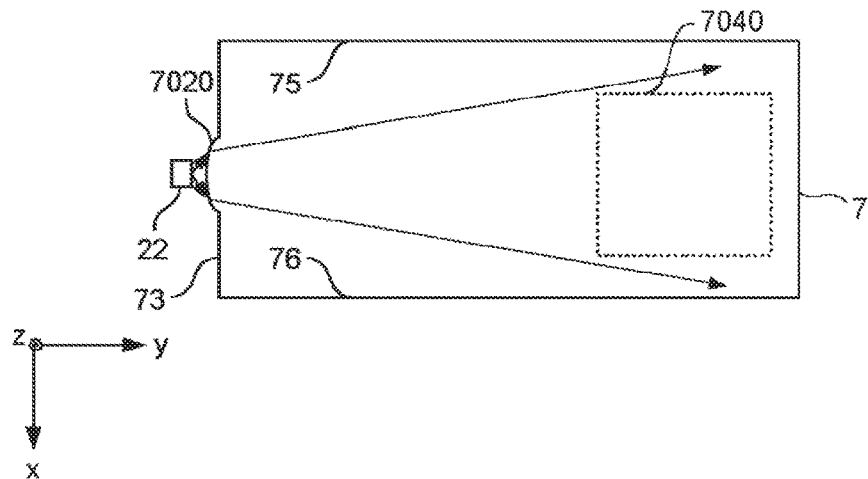

FIG. 89C shows a configuration for making an incident light of the light guiding plate 7 be close to a parallel light.

Figure 90A:
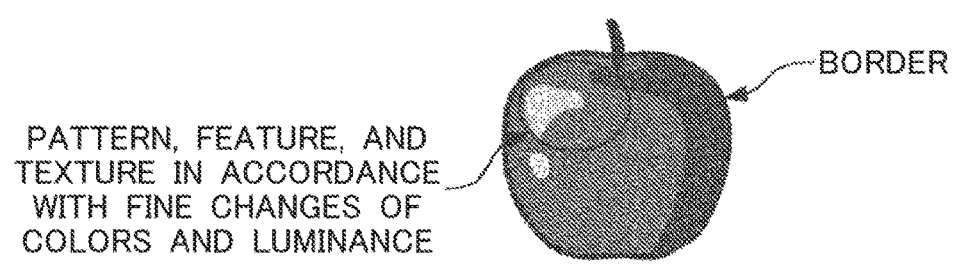

FIG. 90A schematically shows a problem in a multi-view stereoscopic display apparatus.

Figure 90B:
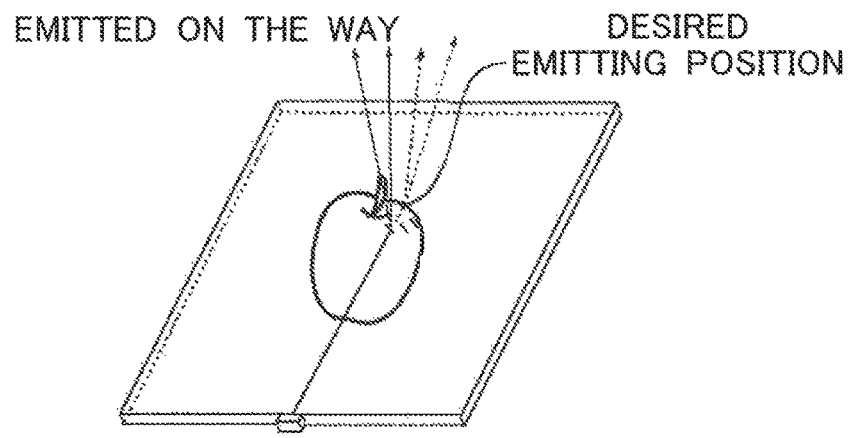

FIG. 90B schematically shows a problem in the multi-view stereoscopic display apparatus.

Figure 91A:
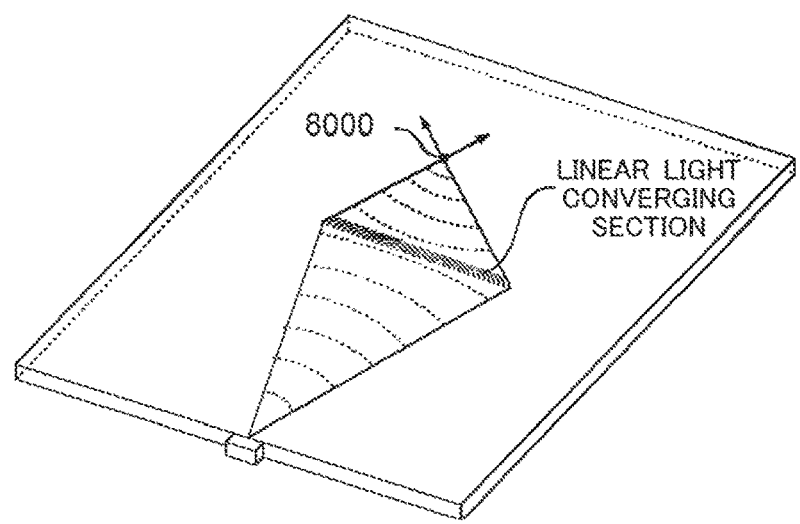

FIG. 91A schematically shows the present embodiment.

Figure 91B:
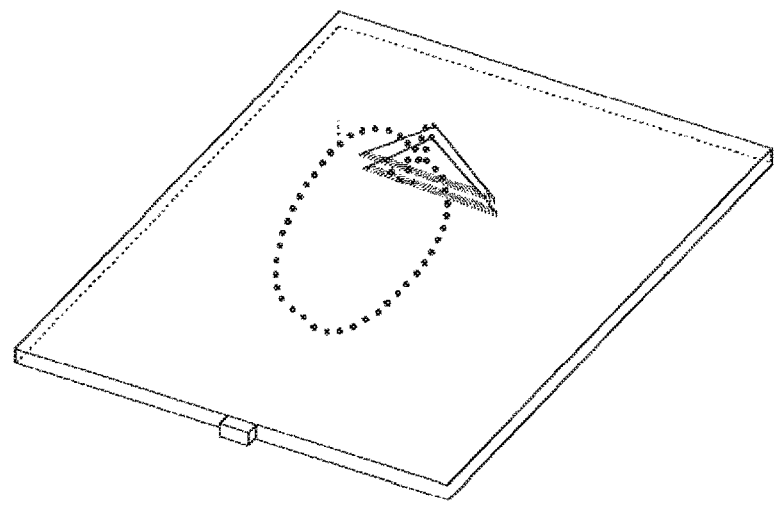

FIG. 91B schematically shows the present embodiment.

Figure 92A:
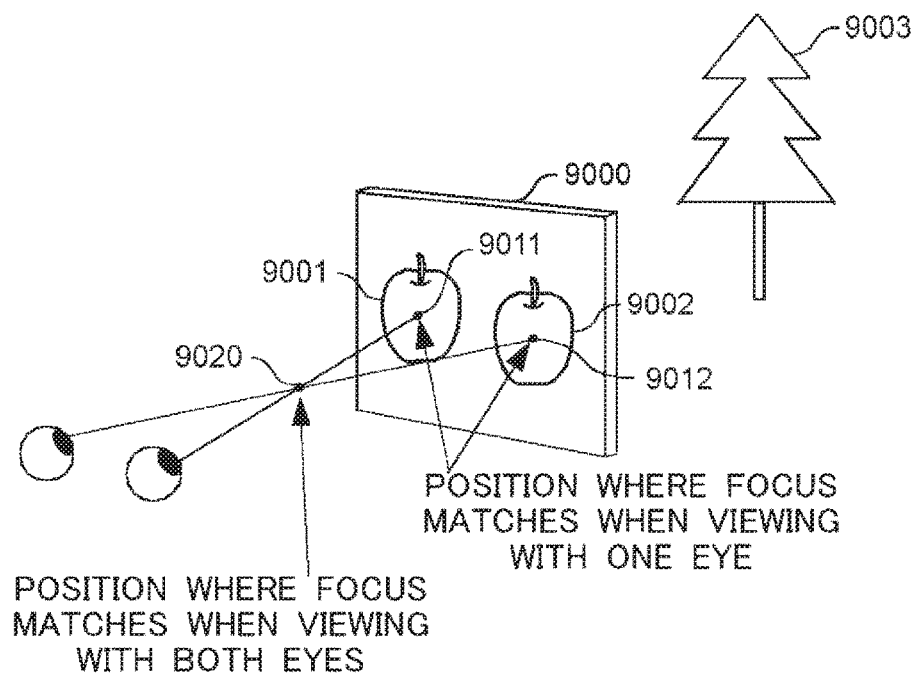

FIG. 92A schematically shows a problem in a stereoscopic display according to a transparent optical device.

Figure 92B:
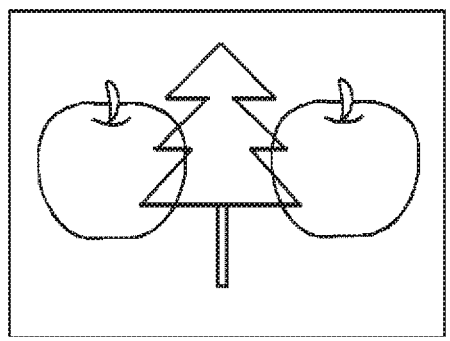

FIG. 92B schematically shows a problem in a stereoscopic display according to a transparent optical device.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
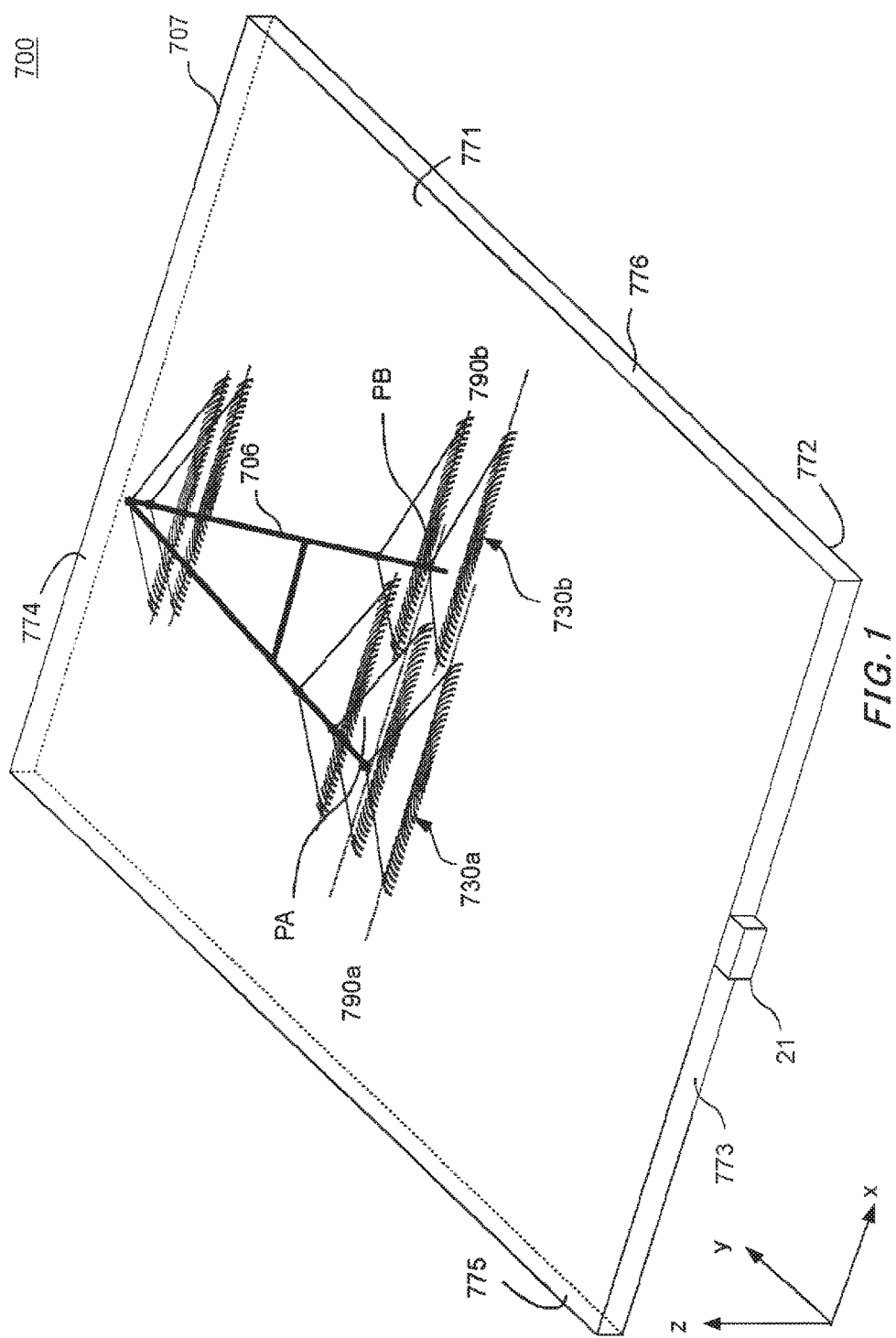
FIG. 1 schematically shows a display apparatus 700 along with a projected stereoscopic image.

FIG. 1 schematically shows a display apparatus 700 in one embodiment along with a stereoscopic image projected onto the space. The display apparatus 700 forms an image 706 of a letter "A" as a stereoscopic image in space. It should be noted that for a purpose for describing understandably easily, the drawings used in the description of embodiments are shown in outline or schematically and may be not drawn to an actual scale in some cases.

A stereoscopic image indicates an image recognized as if it is in a position different from a position on a display surface of a display apparatus. The stereoscopic image also includes, for example, a two-dimensional image which looks like that it is floating from the display surface of the display apparatus. That is, the stereoscopic image is a concept including not only an image recognized as a stereoscopic shape but also an image in a two-dimensional shape recognized in a position different from a position on the display surface of the display apparatus.

The display apparatus 700 includes a light guiding plate 707 and a light source 21. The light guiding plate 707 is formed by resin material which is transparent and has a relatively high refractive index. The material to form the light guiding plate 707 may be, for example, polycarbonate resin (PC), polymethyl metacrylate resin (PMMA), glass and the like.

The light guiding plate 707 includes a main surface 771 which is an emission surface to emit lights, and a main surface 772 on an opposite side to the main surface 771. Also, the light guiding plate 707 includes an end surface 773, an end surface 774, an end surface 775 and an end surface 776, which are end surfaces on all four sides of the light guiding plate 707. The end surface 773 is an incident light end surface of the light guiding plate 707. A light source 21 is provided on the end surface 773, and lights from the light source 21 are incident from the end surface 773 onto the light guiding plate 707. The end surface 774 is a surface on the opposite side to the end surface 773. The end surface 776 is a surface on the opposite side to the end surface 775. The light guiding plate 707 guides lights within the surface parallel to the main surface 771.

In descriptions of embodiments, a right-handed-system orthogonal coordinate system of x axis, y axis, and z axis may be used in some cases. A direction perpendicular to the main surface 771 is determined as a z-axis direction. A direction from the main surface 772 to the main surface 771 is determined as a z-axis plus direction. Also, a direction perpendicular to the end surface 773 is determined as a y-axis direction. A direction from the end surface 773 to the end surface 774 is determined as a y-axis plus direction. The x axis is determined as a direction perpendicular to the end surface 775 and the end surface 776, and a direction from the end surface 775 to the end surface 776 is an x-axis plus direction. It should be noted that in order to prevent a redundant description, a surface parallel to the xy plane may be called as xy plane, a surface parallel to the yz plane may be called as yz plane, and a surface parallel to the xz plane may be called as xz plane in some cases.

On the main surface 772 of the light guiding plate 707, a plurality of light converging sections 730 are formed, including a light converging section 730a and a light converging section 730b. The light guiding plate 7 guides lights from the light source 21 by spreading the lights in a planar manner within the surface parallel to the main surface 771. The light converging sections 730 are respectively formed by a part of Fresnel lens. The light converging sections 730 have been formed substantially continuously in the x-axis direction. It should be noted that a gap may be respectively provided between a plurality of refractive surfaces (prism surfaces) of the light converging sections 730 which function as the Fresnel lens. Lights guided by the light guiding plate 707 are incident onto each position in the x-axis direction of the light converging sections 730. The light converging sections 730 allows the lights incident onto each position of the light converging sections 730 to be substantially converged on fixed points respectively corresponding to the light converging sections 730. In FIG. 1, a situation where a plurality of light rays from the light converging sections 730 are converged.

Specifically, the light converging section 730a corresponds to a fixed point PA on an image 706. The light ray from each position of the light converging section 730a is converged on the fixed point PA. Therefore, the wavefront of the lights from the light converging section 730a becomes a wavefront of lights as to be emitted from the fixed point PA. The light converging section 730b is a light converging section corresponding to a fixed point PB on the image 706. The light ray from each position of the light converging section 730b is converged on the fixed point PB. In this way, the light ray from each position of any of the light converging sections 730 is substantially converged at the fixed point corresponding to the light converging section 730. Accordingly, according to any of the light converging sections 730, the wavefront of lights where lights are to be emitted from the corresponding fixed point can be provided. The fixed points corresponding to the respective light converging sections 730 are different from each other, and the image 706 is formed in space by an aggregation of a plurality of the fixed points respectively corresponding to the light converging sections 730. In this way, the display apparatus 700 projects a stereoscopic image in space.

As described later, within the xy plane, a light flux guided by the light guiding plate 707 and passing through each position within the light guiding plate 707 has a spread angle smaller than a predetermined value in a direction, as a center, connecting each position within the light guiding plate 707 with the light source 21. Also, within the surface orthogonal to the xy plane including the lines connecting each position within the light guiding plate 707 with the light source 21, the light flux guided by the light guiding plate 707 and passing through each position within the light guiding plate 707 has a spread angle smaller than a predetermined value in the direction, as a center, connecting each position within the light guiding plate 707 with the light source 21. In a case where the light converging sections 730 are provided in a position apart from the light source 21, the light flux guided by the light guiding plate 707 and incident onto the light converging section 730 generally does not have a spread within the xy plane in the y-axis direction as a center. Therefore, for example, on a surface parallel to the xz plane including PA, the lights from the light converging section 730a are substantially converged to one fixed point. It should be noted that in the present specification, the spread of the light flux passing through a point within the light guiding plate indicates a spread of lights in a case where the light flux is considered as the light diverged from the point.

Also, the spread of the light flux passing through the point within the light guiding plate may be simply called a spread of lights in some cases.

It should be noted that in a case where the spread of the lights incident onto the light converging sections 730 exists in the z direction, as described later, the lights from the light converging sections 730 are converged on a line along the y axis, the line including a fixed point in space. Here, in particular, since the following will describe the spread of lights within the xy plane of the lights incident onto the light converging sections 730 and a convergence of lights from the light converging sections 730 within the xz plane, the lights from the light converging sections 730 will be described as being converged on the fixed point.

As illustrated, the light converging section 730a has been formed along a line 790a. The light converging section 730b has been formed along a line 790b. Here, the line 790a and the line 790b are straight lines parallel to the x axis. Any of the light converging sections 730 are substantially continuously formed along straight lines parallel to the x axis. In this way, the light converging sections 730 have been respectively formed with a length in a direction perpendicular to a light guiding direction of the light guiding plate 707 within the surface parallel to the main surface 771.

In this way, the light converging sections 730 have been formed along the line respectively predetermined within the surface parallel to the main surface 771. Then, each of the light converging sections 730, onto which the lights guided by the light guiding plate 707 are incident, allows an emitted light to be emitted from the main surface 771 in a direction where the emitted light is to be substantially converged on one convergence point in space. It should be noted that in a case where the fixed point is on the main surface 772 side of the light guiding plate 707, the emitted light becomes to be diverged in the direction from the fixed point. Therefore, in a case where the fixed point is on the main surface 772 side of the light guiding plate 707, the reflection surfaces included in the light converging sections 730 allow the emitted light to be emitted from the main surface 771 in a direction where the emitted light is to be substantially diverged from one convergence point in space.

Figure 2A:
FIG. 2A schematically shows a light converging section 730.
Figure 2B:
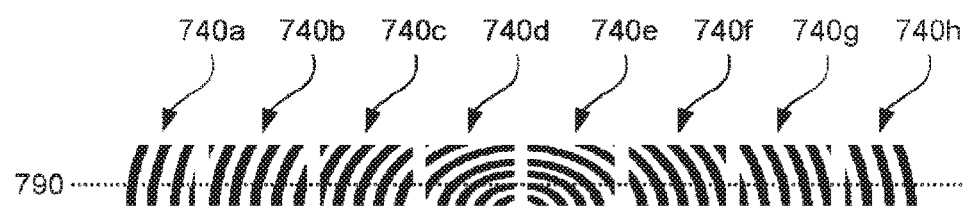
FIG. 2B schematically shows a light converging section 732 as a variation of the light converging section 730.

FIGS. 2A and 2B schematically show the light converging section 732 as a variation of the light converging section 730. The light converging section 732 shown in FIG. 2B corresponds to a plurality of portions, i.e. a portion 740a, portion 740b, portion 740c, portion 740d, portion 740e, portion 740f, portion 740g and portion 740h, which are divided from the light converging section 730 shown in FIG. 2A along the x-axis direction. The light converging section 730 has an optical surface which continuously changes along the lengthwise direction of the light converging section 730; on the other hand, the light converging section 732 has an optical surface which intermittently changes along the lengthwise direction of the light converging section 732, such as the portion 740a, the portion 740b, the portion 740c, the portion 740d, the portion 740e, the portion 740f, the portion 740g, and the portion 740h. The lights from each of the respective portions 740 of the light converging section 732 are converged on the same fixed point corresponding to the light converging section 732. On the fixed point, an intensity distribution of lights in the x-axis direction of the lights from each of the respective portions 740 is a distribution substantially having a peak in the position of the fixed point and being decreased rapidly as being apart from the fixed point. On the other hand, in a case where the optical surface of the light converging section 730 is set as a continuous optical surface without being spaced in the x-axis direction, the lights from a partial surface of the optical surface are partially overlapped by the lights from the optical surface in the periphery of the partial surface. For that reason, compared to a case where the portions 740 are provided slightly spaced in the x-axis direction, a spread occurs in the intensity distribution of the lights from the corresponding partial surface in the x-axis direction. That is, by dividing the light converging sections into the plurality of portions 740 and providing the plurality of portions 740 in a spaced manner, the spread of the intensity distribution of the lights from each of the respective portions 740 can be smaller compared to a case where the plurality of portions 740 are not spaced. In this way, by dividing the light converging section into the plurality of portions, a so-called black matrix effect may occur and a contrast of image may be increased in some cases.

It should be noted that a diffraction grating may be applied, instead of the Fresnel lens such as a cylindrical type and the like, as the light converging section 730 and the light converging section 732. Also, a light converging section formed on the reflection surfaces such as the prism and the like may be applied as the light converging section 730 and the light converging section 732. A case of forming on the reflection surfaces will be further described.

Figure 3:
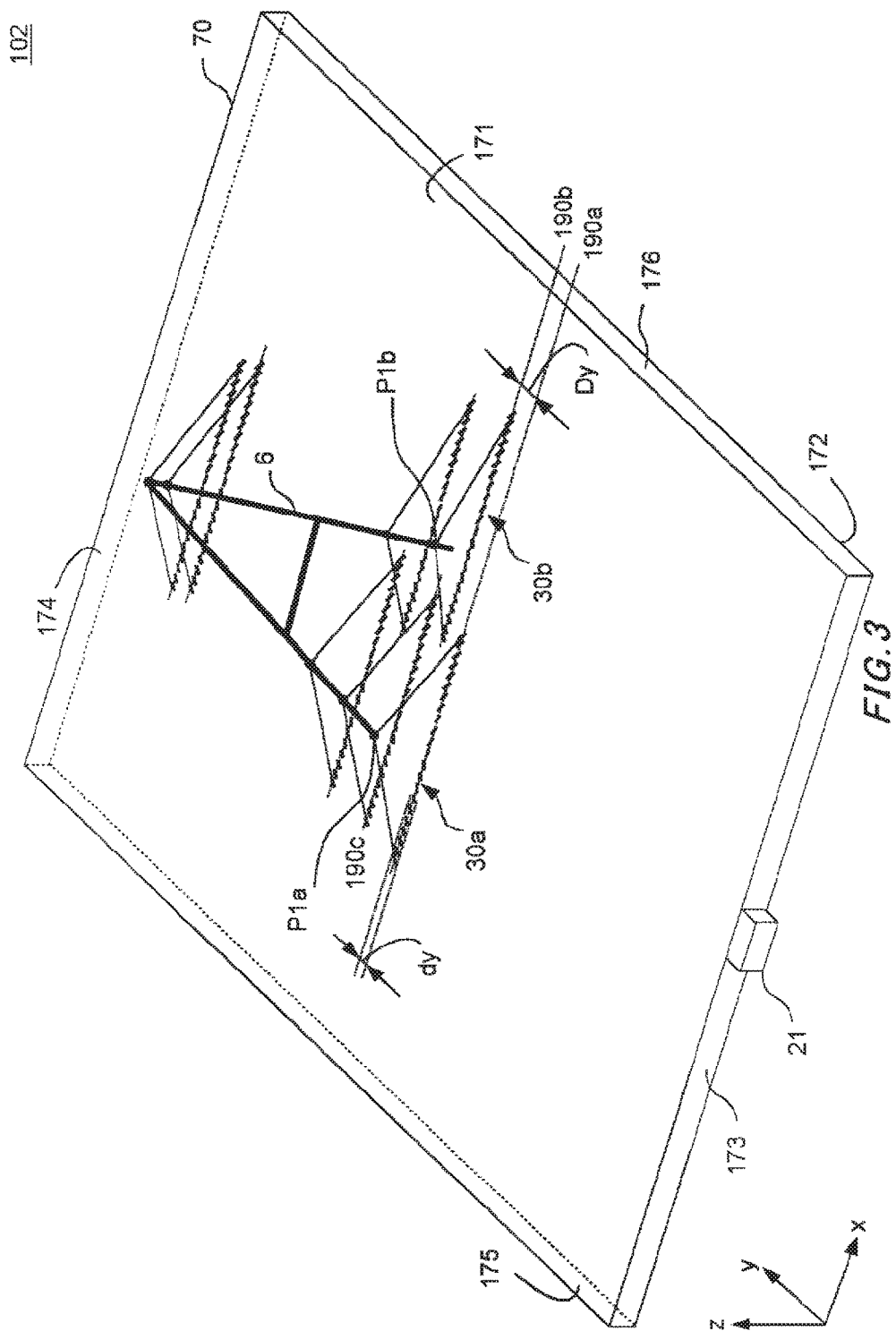
FIG. 3 schematically shows a display apparatus 102 as a variation of the display apparatus 700.

FIG. 3 schematically shows a display apparatus 102 as a variation of the display apparatus 700. The display apparatus 102 forms an image 6 of a letter "A" in space, similar to the display apparatus 700.

The display apparatus 102 includes a light guiding plate 70 and a light source 21. The light guiding plate 70 includes a main surface 171 and a main surface 172. The main surface 171 is a light emission surface of the light guiding plate 70. The main surface 172 is a surface on the opposite side of the main surface 172. The light guiding plate 70 corresponds to the light guiding plate 707. The main surface 171 corresponds to the main surface 771, and the main surface 172 corresponds to the main surface 772.

On the main surface 172 of the light guiding plate 70, a plurality of light converging sections 30 including a light converging section 30a and a light converging section 30b have been formed. The light converging section 30a is a light converging section corresponding to a fixed point P1a on the image 6.

The light converging sections 30 respectively have numerous reflection surfaces. The light converging sections 30 correspond to those forming the light converging sections 730 on the numerous reflection surfaces. Light rays of a plurality of reflected lights by the reflection surfaces included in the light converging section 30a are converged on the fixed point P1a. The light converging section 30b is a light converging section corresponding to a fixed point P1b on the image 6. Light rays of a plurality of reflected lights of the reflection surfaces included in the light converging section 30b are converged on the fixed point P1b. In this way, the reflected lights of the reflection surfaces respectively included in any of the light converging sections 30 are converged on the fixed point corresponding to the light converging section 30. To cause the lights from the respective light converging sections 30 to be converged on the respective corresponding fixed points, on the reflection surfaces included in the respective light converging section 30, a direction of normal line projected onto a surface parallel to the main surface 171 intermittently changes along the lengthwise direction of each of the light converging sections 30. The fixed points P1 to which the respective light converging sections 30 correspond are different from each other, and the image 6 is formed in space by an aggregation of the plurality of fixed points P1.

It should be noted that in a case where the spread of the lights incident onto the reflection surfaces of the light converging sections 30 exists in the z direction, as described later, the reflected lights by the reflection surfaces of the light converging sections 30 are converged on the line along the y axis, the line including the fixed points P1 in space. Here, in particular, since the spread of light within the xy plane of the light incident onto the reflection surfaces and a convergence within the xz plane of the reflected lights will be described, the reflected lights will be described as being converged on the fixed points P1.

As illustrated, the light converging section 30a has been formed along a line 190a. For example, the light converging section 30a is formed with a plurality of reflection surfaces continuously arranged along the line 190a. Here, the line 190 is a straight line parallel to the x axis. Any of the light converging sections 30 is formed with the plurality of reflection surfaces continuously arranged along the straight line parallel to the x axis. In this way, the light converging sections 30 have been formed respectively with a length in a direction perpendicular to the light guiding direction of the light guiding plate 70 within the surface parallel to the main surface 171.

In this way, the light converging section 30 has been formed along the lines respectively predetermined within the surface parallel to the main surface 171. Then, each of the light converging sections 30, onto which the lights guided by the light guiding plate 70 are incident, has a reflection surface which allows an emitted light to be emitted from the main surface 171 in a direction where the emitted light is to be substantially converged on one convergence point in space. It should be noted that in a case where the fixed points P1 are on the main surface 172 side of the light guiding plate 70, the emitted light is to be diverged in a direction from the fixed points P1. Therefore, in a case where the fixed points P1 are on the main surface 172 side of the light guiding plate 70, the reflection surfaces included in the light converging sections 30 allow the emitted light to be emitted from the main surface 171 in a direction where the emitted light is to be substantially diverged from one convergence point in space.

It should be noted that it is preferable that a length dy in a direction orthogonal to the line 190 of each of the light converging sections 30 is not above ½ of a distance Dy between other light converging sections 30 adjacent to each other in the direction orthogonal to the line 190. For example, dy may be about ½ of Dy. Accordingly, it can suppress the convergence points which form the image 6 from looking like that they are in a step shape.

Figure 4:
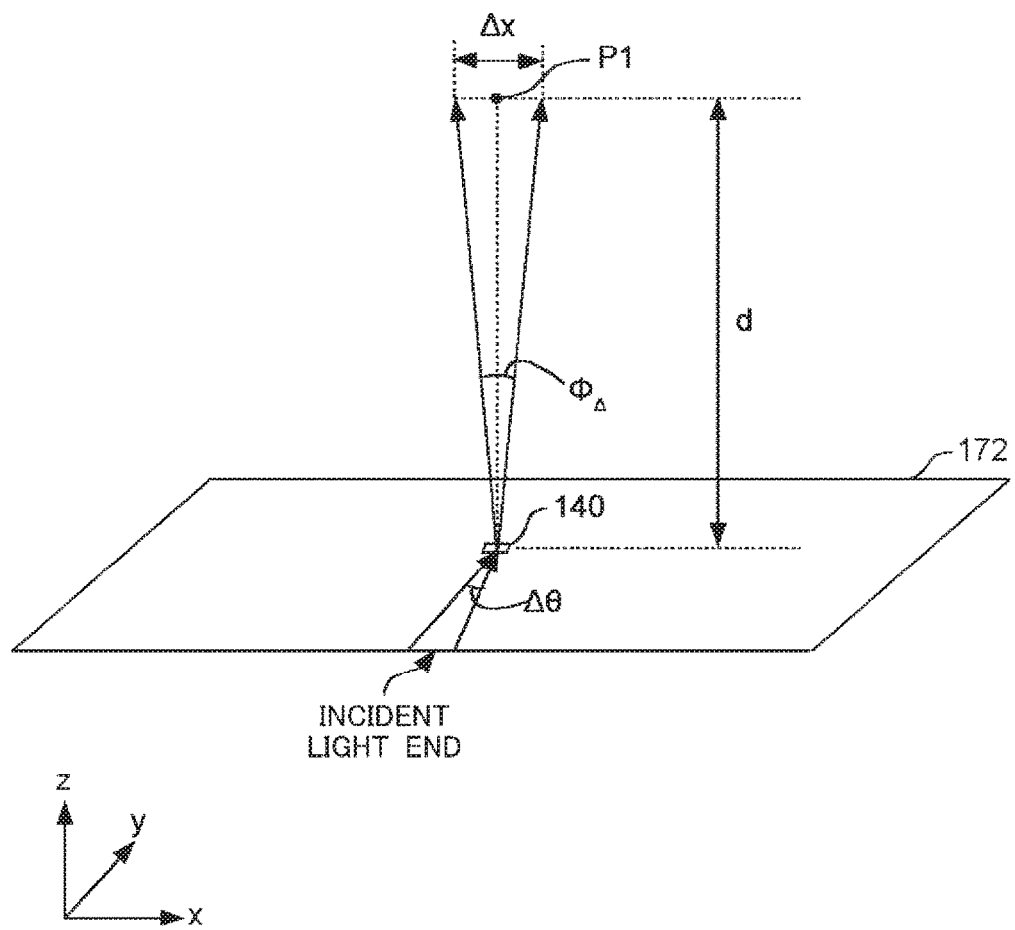
FIG. 4 schematically shows a relation between a spread angle $\Delta\theta$ of an incident light toward one reflection surface 140 and a divergence angle $\Phi_A$ of an emitted light.

FIG. 4 schematically shows a relation between a spread angle $\Delta\theta$ of an incident light toward one reflection surface 140 and a divergence angle $\Phi_A$ of the emitted light. $\Delta\theta$ is a spread angle of the lights guided by the light guiding plate 70 on the reflection surface 140. Specifically, $\Delta\theta$ is a spread angle within the xy plane, i.e. a spread angle within the surface parallel to the main surface 171. $\Delta\theta$ may be a width (a full width at half maximum) in a position where the light intensity is half of the maximum value in the light intensity distribution in the angle direction.

In FIG. 4, $\Delta x$ indicates a spread in the x-axis direction of the emitted light by the reflection surface 140 on the fixed point P1. d indicates a distance from the main surface 172 to the fixed point P1. Here, the spreads of lights of the incident light toward the reflection surface 140 and the emitted light by the reflection surface 140 are smaller than a predetermined value. Specifically, $\Delta x$ and $\Delta\theta$ are set as minute values. In this case, $\Phi_{Ax}=\Delta x/d$ is approximately satisfied.

Actually, since the emitted light are influenced by the refraction and the like on the main surface 171, the divergence angle $\Phi_{Ax}$ becomes larger than $\Delta\theta$. Here, the divergence angle $\Phi_{Ax}$ is set as $C\alpha$ times as much as $\Delta\theta$. $C\alpha$ is a value larger than 1. As one example, 1.5 may be applied as $C\alpha$.

Here, in a case where the fixed points P1 are on the main surface 171 side, that is, in a case where the fixed points P1 are on the observer side, it is preferable that d is 8 mm or more. It is because that if d is less than 8 mm, the image may not be recognized as a stereoscopic image in some cases. Also, it is preferable that $\Delta x$ is 1 mm or less. It is because that if $\Delta x$ is larger than 1 mm, the image such as a logo cannot be formed with a sufficient resolution in some cases.

Therefore, it is preferable to set $\Phi_{Ax}$ as a tan (⅛) or less. That is, it is preferable that $\Delta\theta$ satisfies: $C\alpha\times\Delta\theta\leq a\tan(⅛)$. Considering $C\alpha$, it is preferable that $\Delta\theta$ is 5° or less.

Figure 5:
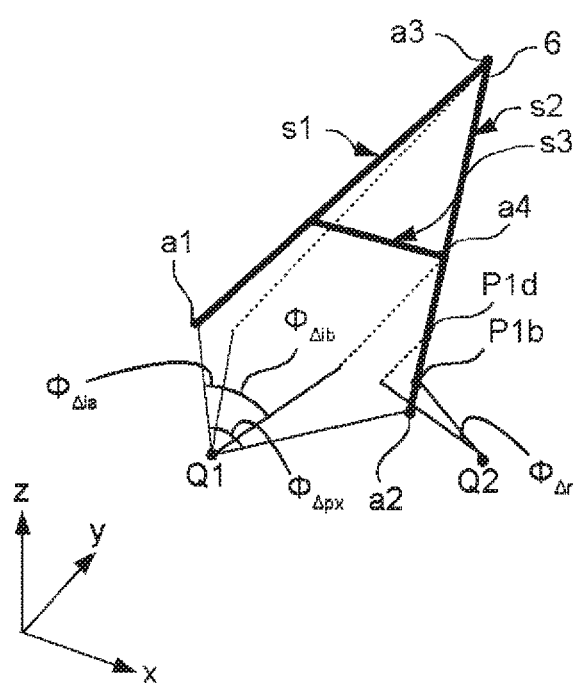
FIG. 5 shows a schematic view for describing feature points of an image 6.

FIG. 5 is a schematic view for describing feature points of the image 6. As examples of the feature points, an end point of the image in a predetermined direction, at least one end point of a straight line configuring the image, an intersection point of two lines configuring the image, an inflection point of lines configuring the image and the like can be listed. An end point a1, an end point a2, an end point a3, and an intersection point a4 are the feature points of the image 6.

The end point a1 is positioned on the most minus side in the x-axis direction among the points on the image 6. The end point a2 is positioned on the most plus side in the x-axis direction among the points on the image 6. $\Phi_{Ax}$ is an angle formed by a straight line connecting the end point a1 with an point Q1 on the main surface 172 and a straight line connecting the end point a2 with the point Q1 on the main surface 172 when the lines are projected onto the xz plane. In this case, it is preferable that $\Delta\theta$ satisfies: $C\alpha\times\Delta\theta<(\Phi_{Ap}/10)\times C\beta$. Here, $C\beta$ is a constant larger than 1. Specifically, it is preferable to apply 2 as $C\beta$. In this way, it is preferable to satisfy $1.5\Delta\theta<\Phi_{Ap}/5$, where $\Delta\theta$ is the spread angle of the light guided by the light guiding plate 70, and $\Phi_{Ap}$ is an angle formed by lines connecting two end points of the image in a direction along a predetermined line with each of the plurality of light converging sections 30 when the lines are projected onto the xz plane. In this way, an observer can clearly recognize the image 6. It should be noted that if it is necessary to form the image 6 on the convergence points which are at least divided into N pieces, it is preferable to set $\Delta\theta$ to satisfy $C\alpha\times\Delta\theta<(\Phi_{Ap}/N)\times C\beta$.

The end point a1 is one end point of a side s1 and the end point a3 is the other end point of the side s1. The intersection point a4 is an intersection point of a side s2 and a side s3. $\Phi_{Aia}$ is an angle formed by a straight line connecting the point Q1 with the end point a1 and a straight line connecting the point Q1 with the end point a3. $\Phi_{Aib}$ is an angle formed by a straight line connecting the end point a3 with the point Q1 and a straight line connecting the intersection point a4 with the point Q1. $\Phi_{Aia}$ and $\Phi_{Aib}$ are the angles within the xz plane. In this case, it is preferable $\Delta\theta$ satisfies: $C\alpha\times\Delta\theta<C\beta\times\Phi_{Aia}$. Also, it is preferable that $\Delta\theta$ satisfies: $C\alpha\times\Delta\theta<C\beta\times\Phi_{Aib}$. In this way, it is preferable that $\Delta\theta$ satisfies: $C\alpha\times\Delta\theta<C\beta\times\Phi_{Ai}$, where $\Phi_{Ai}$ is an angle formed by lines connecting two feature points included in the image with each of the plurality of light converging sections 30 when the lines are projected onto the xz plane. Specifically, it is preferable that $\Delta\theta$ satisfies: $1.5\Delta\theta<2\Phi_{Ai}$. By satisfying this condition, it is easy for an observer to recognize the feature portions of the image 6; therefore, the observer easily recognizes the image 6 as a stereoscopic image.

The fixed point P1d is a fixed point on the side s2, adjacent to the fixed point P1b in the y-axis direction. $\Phi_{Ar}$ is an angle formed by a straight line connecting the point Q2 with the fixed point p2 and a straight line connecting the point Q2 with the fixed point p4. $\Phi_{Ar}$ is also an angle within the xz plane. In this case, it is preferable that $\Delta\theta$ satisfies: $C\alpha\times\Delta\theta<C\beta\times\Phi_{Ar}$. In this way, it is preferable to satisfy: $C\alpha\times\Delta\theta<C\beta\times\Phi_{Ar}$, where $\Phi_{Ar}$ is an angle formed by lines connecting two adjacent convergence points in the direction along the lines where the light converging sections 30 are formed with each of the plurality of light converging sections 30. Specifically, it is preferable that $\Delta\theta$ satisfies: $1.5\Delta\theta<2\Phi_{Ar}$. By satisfying this condition, the observer can recognize the image 6 more clearly.

Figure 6:
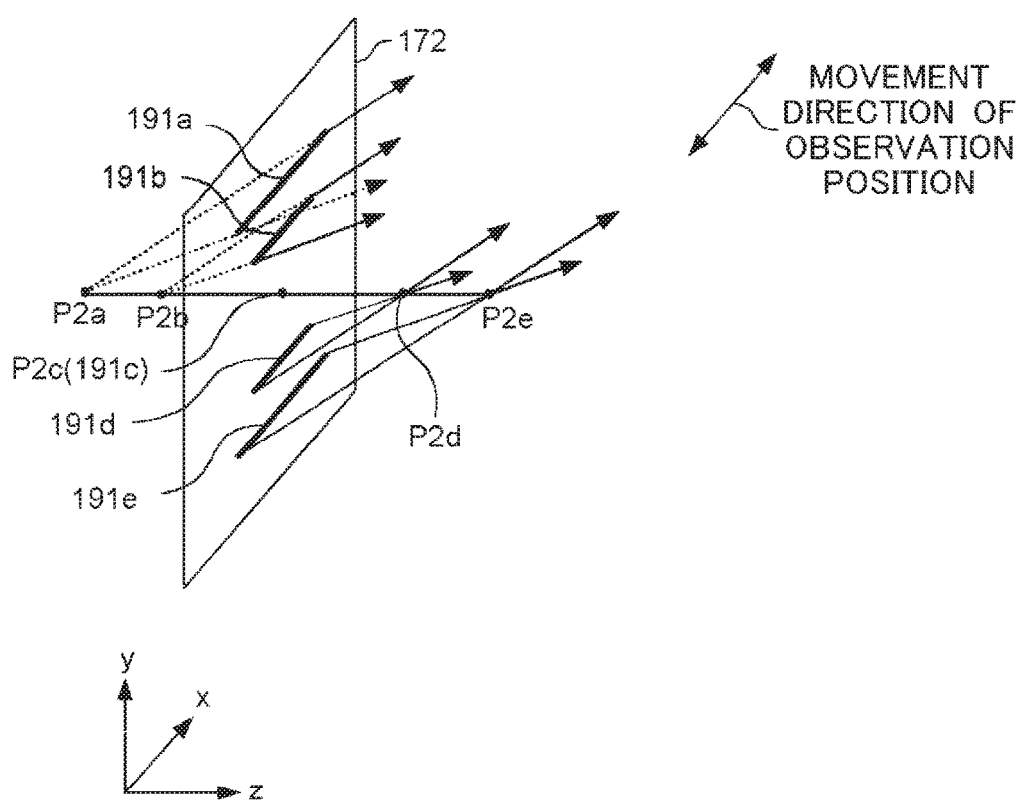
FIG. 6 schematically shows a shape of lines along which fixed points and light converging sections are to be.

FIG. 6 schematically shows a shape of lines along which the fixed points and the light converging sections 30 are to be. FIG. 6 is a perspective view for schematically showing four fixed points P2 and the main surface 172 together with a moving direction of an observer assumed in designing.

A fixed point P2a is in a position from the main surface 172 by a distance d2 in the z-axis minus direction. A fixed point P2b is in a position from the main surface 172 by a distance d1 in the z-axis minus direction. A fixed point P2c is on the main surface 172. A fixed point P2d is in a position from the main surface 172 by a distance d1 in the z-axis plus direction. A fixed point P2e is in a position from the main surface 172 by a distance d2 in the z-axis plus direction. It should be noted that 0<d1<d2.

As shown in FIG. 6, in a case where the moving direction of the observer assumed in designing is parallel to the x axis, the lines 191 along which the light converging sections are to be become straight lines parallel to the x axis. Specifically, a straight line 191a, a straight line 191b, a point 191c, a straight line 191d, and a line 191e are the respective lines or point along which the light converging sections 30 corresponding to the fixed points P2a, P2b, P2c, P2d, and P2e are to be.

Also, in a case where a viewing angle is fixed, the lengths of the straight lines 191 are proportional to the respective distances between the fixed points corresponding to the light converging sections 30 and the light guiding plate 70. In this way, the light converging sections 30 are formed longer in the direction along the predetermined lines 191 as the distances between the respective convergence points and the light guiding plate 70 is longer.

Figure 7:
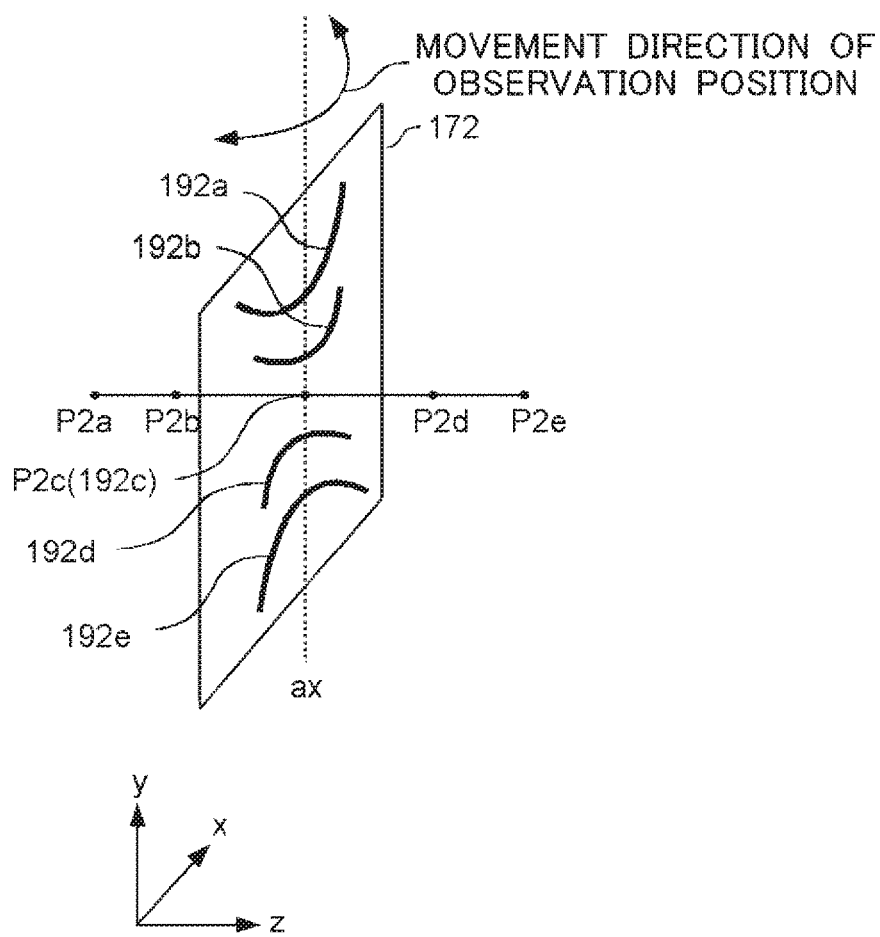
FIG. 7 schematically shows another shape of lines along which the fixed points and the light converging sections are to be.

FIG. 7 schematically shows another shape of lines along which the fixed points and the light converging sections 30 are to be. FIG. 7 is a perspective view for schematically showing four fixed points P2 and the main surface 172 together with a moving direction of an observer assumed in designing.

In the example of FIG. 7, the moving direction assumed in designing is a direction of a rotational movement surrounding an axis ax parallel to the y axis. A concave curve 192a, a concave curve 192b, a point 192c, a convex curve 192d, and a convex curve 192e are the respective lines or point along which the light converging sections 30 corresponding to the fixed points P2a, P2b, P2c, P2d, and P2e are to be.

In the example of FIG. 7, the light converging sections 30 corresponding to the convergence points outside of the light guiding plate 70 are formed along a concave curve or convex curve. Specifically, the light converging sections 30 having convergence points on the emission surface side of the light guiding plate 70 are formed along the convex curve, and the light converging sections 30 having convergence points on the opposite side to the emission surface of the light guiding plate 70 are formed along the concave curve. As described later with reference to FIG. 32, the light converging sections 30 are formed along the intersection lines of a conical surface having a predetermined solid angle to a predetermined axis and the light guiding plate 70 with each of the convergence points as a vertex. It should be noted that a conical surface in the same shape may be applied to any of the convergence points. That is, the solid angle of the conical surface applied to each convergence point may be constant. The solid angle of the conical surface is determined by an angle formed by a straight line connecting a position within a range of movement assumed in designing with the convergence point and an axis parallel to the y axis through the convergence point.

Figure 8:
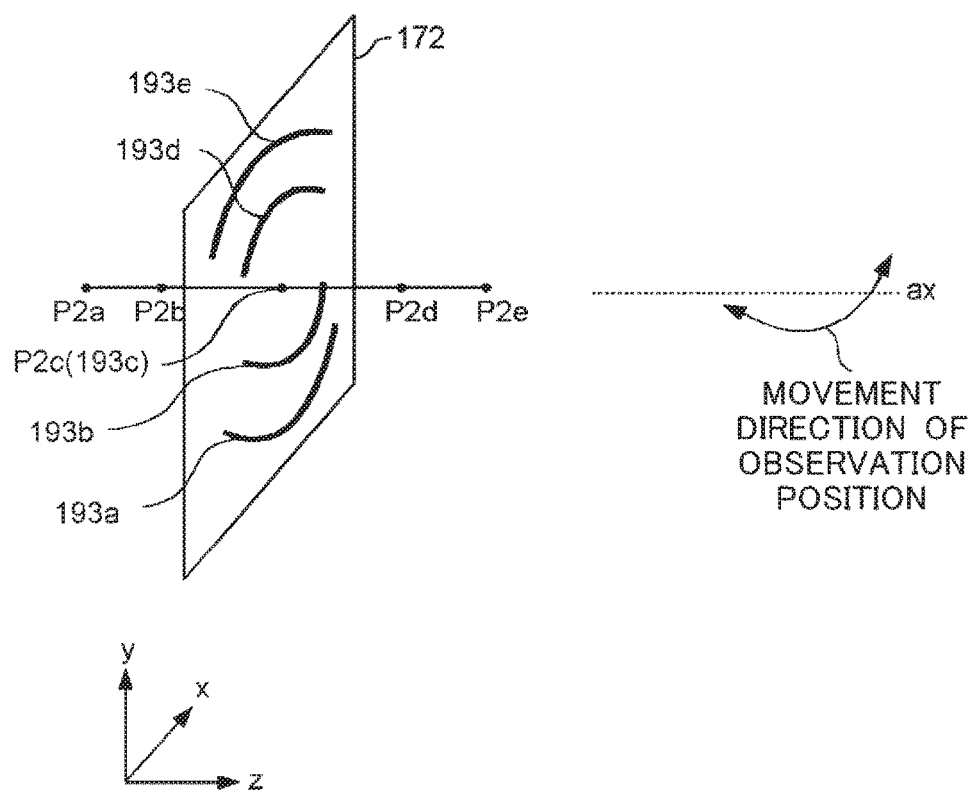
FIG. 8 schematically shows another shape of lines along which the fixed points and the light converging sections are to be.

FIG. 8 schematically shows another shape of lines along which the fixed points and the light converging sections 30 are to be. FIG. 8 is a perspective view for schematically showing four fixed points P2 and the main surface 172 together with a moving direction of an observer assumed in designing.

In the example of FIG. 8, the moving direction assumed in designing is a direction of rotational movement surrounding an axis parallel to the z axis. A concave curve 193a, a concave curve 193b, a point 193c, a convex curve 193d, and a convex curve 193e respectively correspond to the fixed points P2a, P2b, P2c, P2d, and P2e. In this way, the light converging sections 30 having the convergence points on the emission surface side of the light guiding plate 70 are formed along the convex curve, and the light converging sections 30 having the convergence points on the opposite side to the emission surface of the light guiding plate 70 are formed along the concave curve. It should be noted that whether the line along which the light converging sections 30 are is to be a concave curve or convex curve changes depending on whether the range of movement of the observer belongs to the y axis plus side of the center of the light guiding plate 70 or belongs to the minus side of the center of the light guiding plate 70.

Figure 9:
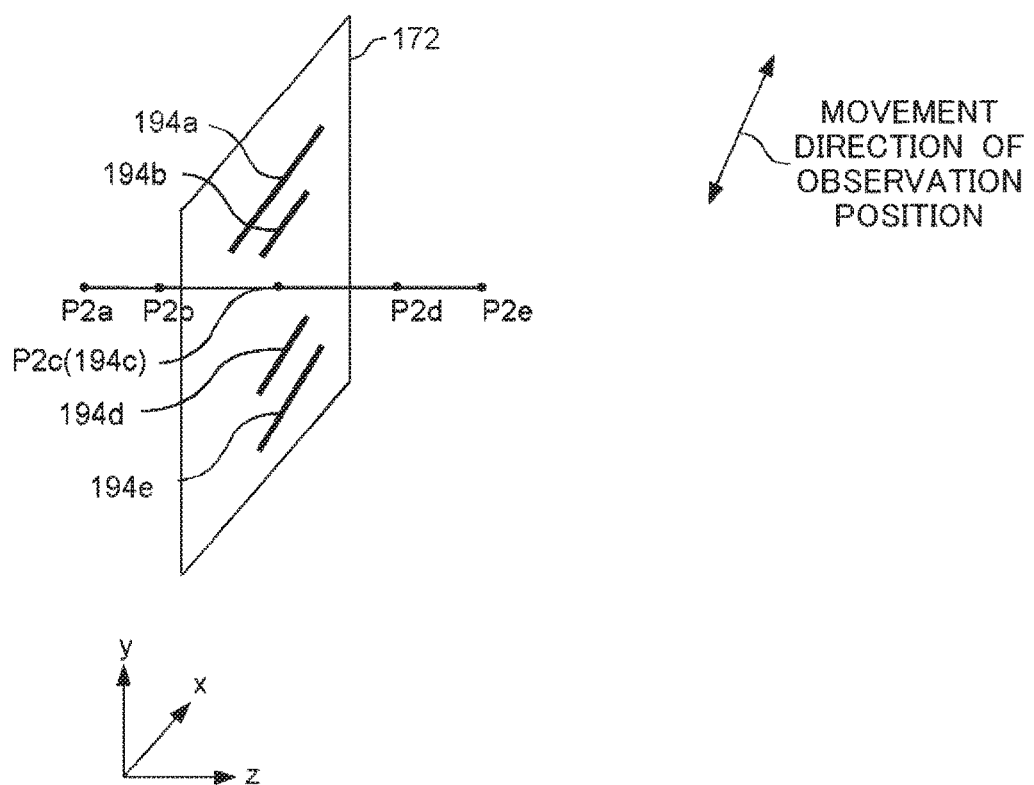
FIG. 9 schematically shows another shape of lines along which the fixed points and the light converging sections are to be.

FIG. 9 schematically shows another shape of lines along which the fixed points and the light converging sections 30 are to be. FIG. 9 is a perspective view for schematically showing four fixed points P2 and the main surface 172 together with a moving direction of an observer assumed in designing.

In the example of FIG. 9, the moving direction of the observer assumed in designing is inclined to the x axis. In this case, lines 194 along which the light converging sections 30 are to be become straight lines inclined to the x axis. Specifically, a straight line 194a, a straight line 194b, a point 194c, a straight line 194d, and a straight line 194e respectively correspond to the fixed points P2a, P2b, P2c, P2d, and P2e.

As shown in FIG. 6 to FIG. 9, the shapes of the lines along which the light converging sections 30 are to be are approximately similar to those among the light converging sections 30. Also, as the distances between the respective convergence points of the light converging sections 30 and the light guiding plate 70 are longer, the lines along which the light converging sections 30 are to be become longer.

It should be noted that some reflection surfaces of the plurality of reflection surfaces of the light converging section 30 may be arranged shifted from the lines where the light converging section 30 is formed. For example, the reflection surfaces of some of the light converging section 30 may be arranged shifted from the lines along which the other reflection surfaces of the light converging section 30 are to be to the y-axis direction. Also, some reflection surfaces of the light converging sections 30 may be arranged shifted from the lines along which the other reflection surfaces of the light converging sections 30 are to be to the x-axis direction. Also, some reflection surfaces of the light converging sections 30 may be arranged shifted from the lines, along which the other reflection surfaces of the light converging sections 30 are to be, to the x-axis direction and the y-axis direction. The direction to which some reflection surfaces are shifted may be any of the y-axis plus direction, the y-axis minus direction, the x-axis plus direction, and the x-axis minus direction, or may be any combination of those directions.

In this way, some reflection surfaces of the plurality of reflection surfaces forming one light converging section 30 may be formed in a position shifted from the lines along which the other reflection surfaces are to be by a predetermined value or more. The positions of at least some reflection surfaces can be shifted from the lines along which the reflection surfaces are to be within the range where the shape or direction of the image does not substantially change. It should be noted that an interval between adjacent convergence points can be applied as an upper limit value of the shifted width of the position of the reflection surfaces. A specific example where some reflection surfaces are arranged shifted will be described later.

Figure 10A:
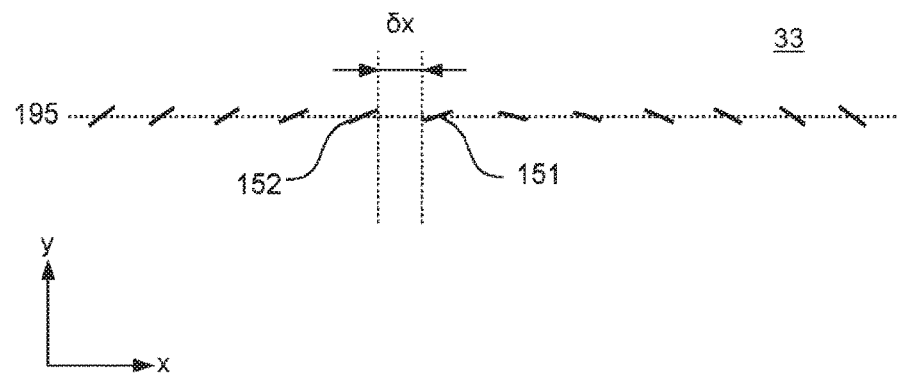
FIG. 10A schematically shows reflection surfaces dividedly arranged.
Figure 10B:
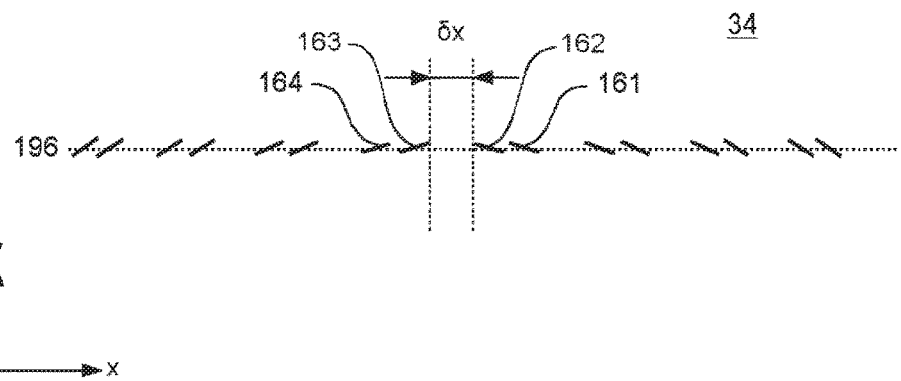
FIG. 10B schematically shows reflection surfaces dividedly arranged.

FIGS. 10A and 10B schematically show a light converging section 33 having reflection surfaces which are dividedly arranged. FIG. 10A shows a case where the reflection surfaces are arranged apart one by one. In one light converging section 33, a plurality of reflection surfaces including a reflection surface 151 and reflection surface 152 are arranged along a line 195. The reflection surface 151 and the reflection surface 152 are the reflection surfaces adjacent to each other. The reflection surface 151 and the reflection surface 152 are spaced from each other by a predetermined distance δx in a direction along the line 195. Similarly, any reflection surfaces adjacent to each other of the light converging section 33 are provided spaced by the predetermined distance δx between thereof. The plurality of reflection surfaces included in each of the light converging sections 30 are provided at substantially equal pitches along the forming direction of each of the light converging sections 30.

FIG. 10B schematically shows a light converging section 34 in which the reflection surfaces are arranged apart by twos. In one light converging section 34, a plurality of reflection surfaces including a reflection surface 161, a reflection surface 162, a reflection surface 163, and a reflection surface 164 are arranged along a line 196. Along the line 196, a reflection surface 161, a reflection surface 162, a reflection surface 163, and a reflection surface 164 are aligned in this order in the x-axis minus direction. The reflection surface 162 and the reflection surface 163 are spaced from each other by the predetermined distance δx between thereof in a direction along the line 196. It should be noted that although the reflection surface 161 and the reflection surface 162 are also spaced from each other, the spaced distance is less than δx. FIG. 10B, although the example where the reflection surfaces are arranged apart by two has been described, generally, the reflection surfaces may be arranged apart by n pieces (n≥2). In this way, the light converging section 30 may be formed from a plurality of sets of n pieces of continuous reflection surfaces in the forming direction of the light converging section 30 and the plurality of sets of the n pieces of the reflection surfaces may be provided at the substantially equal pitches along the forming direction of the light converging section 30. As shown in FIG. 10A and FIG. 10B, on each reflection surface, the direction of the normal line projected onto the xy plane intermittently changes along the lengthwise direction of the light converging section, such that the light from each reflection surface is converged on the fixed point.

As described with reference to the light converging section 33 and the light converging section 34, any light converging section may be divided into a plurality of portions along a predetermined line along which the light converging section is to be formed. In this way, by dividing the light converging section into a plurality of portions, the so-called black matrix effect may occur and the contrast of the image may be increased in some cases.

Figure 11:
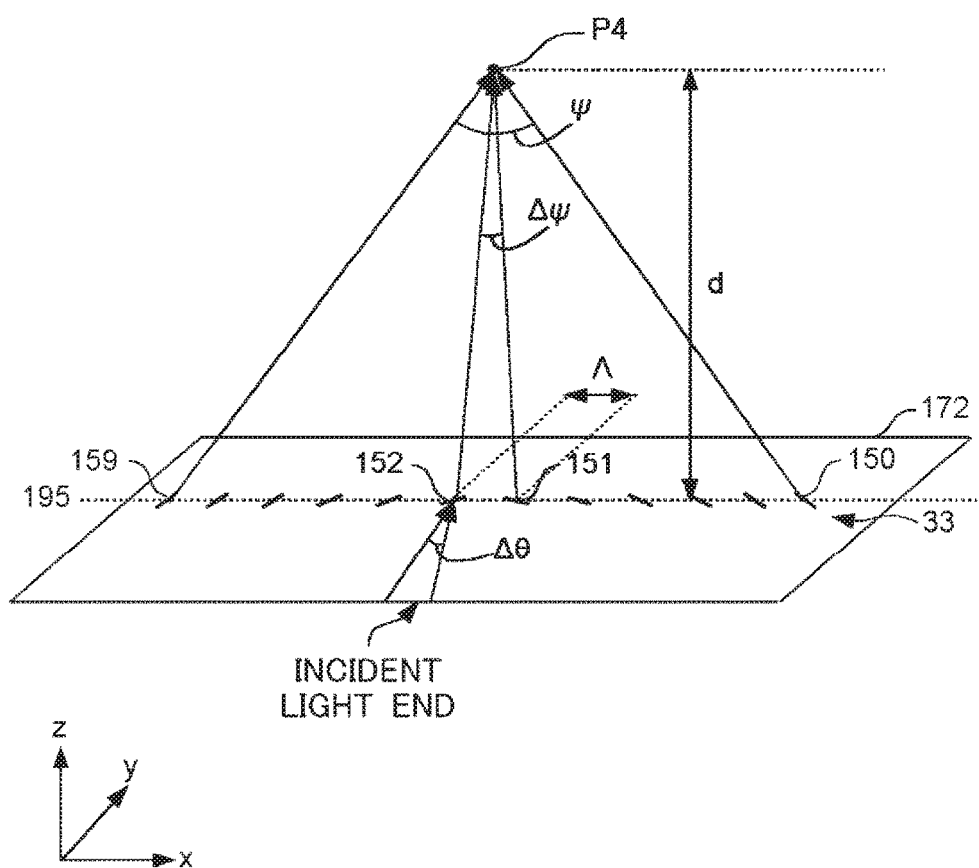
FIG. 11 schematically shows a relation between pitches of the reflection surfaces and the spread angle $\Delta\theta$ of an incident light.

FIG. 11 schematically shows a relation of the pitches of the reflection surfaces and the spread angle Δθ of the incident light. Here, the light converging section 33 including the reflection surface 151 and the reflection surface 152 shown in FIG. 10A will be described shown as examples.

Δψ is an angle formed by a straight line connecting the reflection surface 151 with the fixed point P4 and a straight line connecting the reflection surface 152 with the fixed point P4. It is preferable that Δψ is less than 5°. That is, even if a case where the reflection surface 151 and the reflection surface 152 are provided spaced from each other, it is preferable that Δψ is not 5° or more. By setting Δψ to be less than 5°, the wavefront of the emitted light from one light converging section can be uniformed.

It should be noted that Λ is a position difference in central positions between the reflection surfaces adjacent to each other in the direction along the line 195. Λ indicates the pitch at which the reflection surfaces are aligned. In a case where Λ is sufficiently smaller than the distance d from the main surface 172 to the fixed point P4, Δψ=Λ/d can be approximately satisfied.

Also, it is preferable that Δψ<Cα×Δθ is satisfied. Specifically, if 1.5 is applied as Cα, it is preferable that Δψ<1.5Δθ is satisfied. Accordingly, it can suppress the direction where the intensity of the emitted light becomes extremely small from occurring.

Also, it is preferable that Δψ>θ/5 is satisfied. Accordingly, the emitted light can be separated to some degree. For that reason, according to the so-called black matrix effect, the contrast of the image may be increased in some cases.

It should be noted that it is preferable that Dy shown in FIG. 3 (the distance between the light converging sections 30 adjacent to each other in the direction orthogonal to the line 190) and Λ satisfy: Dy<5Λ.

In FIG. 11, the reflection surface 150 and the reflection surface 159 included in the light converging section 33 are the reflection surfaces positioned at both ends in the direction along the line 195. The reflection surface 150 is positioned in an end portion on the x-axis plus side. The reflection surface 159 is positioned in an end portion on the x-axis minus side. ψ is an angle formed by a straight line connecting the reflection surface 150 with the fixed point P4 and a straight line connecting the reflection surface 159 with the fixed point P4. It is preferable that ψ is 20° or more. In this way, it is preferable to set the angle formed by straight lines connecting two end points in the direction along the lines where the light converging section is formed with the convergence points as 20° or more.

In a case where the image is displayed by a transparent display apparatus, not only the image but also the background of the display apparatus are viewed by the observer. In this case, the observer often recognizes the presence of the image over there by shaking the head to make sure that the position of the image does not change. An amount for moving the head in a lateral direction is generally approximately 150 mm. If the face of the observer is in a position by approximately 400 mm from the light guiding plate, the angle becomes about 21 degrees. Therefore, if ψ is less than 20°, the observer may not be able to view the image if the observer shakes the head in some cases.

Figures 12, 13:
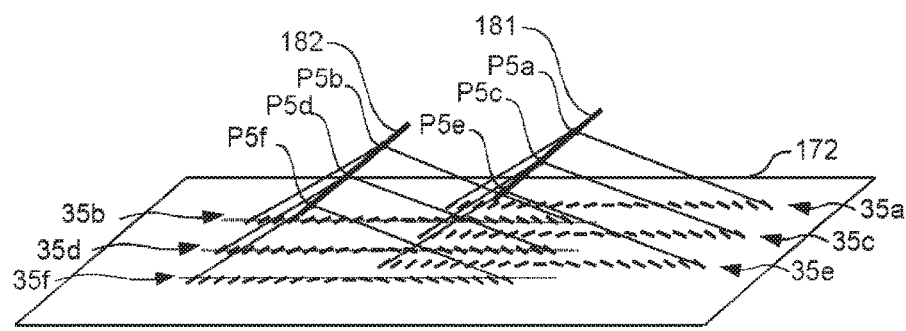
FIG. 12 shows an experimental result of image recognition degrees.
FIG. 13 schematically shows an arrangement example for avoiding an overlapping of the light converging sections.

FIG. 12 shows an experimental result relating to whether or not the image can be recognized. An experimental result was performed relating to whether or not five adult males as subjects can recognize an image when shaking their heads, the image of a figure made up of points and lines formed by using a transparent light guiding plate. "x" indicates that the image disappeared if shaking the head or that the image cannot be stereoscopically recognized. "○" indicates that the image can be stereoscopically recognized even if shaking the head. Also from this experimental result, it has been seen that if ψ is set as 20° or more, the observer can recognize the image even if the observer shakes the head.

FIG. 13 shows an arrangement example for avoiding overlapping of the light converging sections 35. Here, the image formed on the convergence points of the light converging sections 35 is set to include two lines 181 and 182 parallel to and spaced from each other in the x-axis direction. The line 181 and the line 182 are the lines extending in the y-axis direction.

As illustrated, in a direction (y-axis direction) orthogonal to a direction along which the reflection surfaces of the light converging sections 35 are to be, a light converging section 35a, a light converging section 35b, a light converging section 35c, a light converging section 35d, a light converging section 35e, and a light converging section 35f are aligned in this order. Among these, the light converging section 35a is positioned in the y-axis plus direction and the light converging section 35f is positioned in the y-axis minus direction.

The light converging section 35a is converged on the adjacent fixed point P5a on the line 181. The light converging section 35c is converged on the fixed point P5c on the line 181. The light converging section 35e is converged on the fixed point P5e on the line 181. Along the line 181, the fixed point P5a is adjacent to the fixed point P5c and the fixed point P5c is adjacent to the fixed point P5e.

The light converging section 35b is converged on the adjacent fixed point P5b on the line 182. The light converging section 35d is converged on the fixed point P5d on the line 182. The light converging section 35f is converged on the fixed point P5f on the line 182. Along the line 182, the fixed point P5b is adjacent to the fixed point P5d and the fixed point P5d is adjacent to the fixed point P5f.

In this case, along the y-axis direction, the light converging section 35b is arranged between the light converging section 35a and the light converging section 35c, and the light converging section 35d is arranged between the light converging section 35c and the light converging section 35e. In this way, by arranging shifting to the y-axis direction, it can prevent the portion of the light converging section 35a on the x-axis minus side and the portion of the light converging section 35b on the x-axis plus side from overlapping each other.

Figure 14:
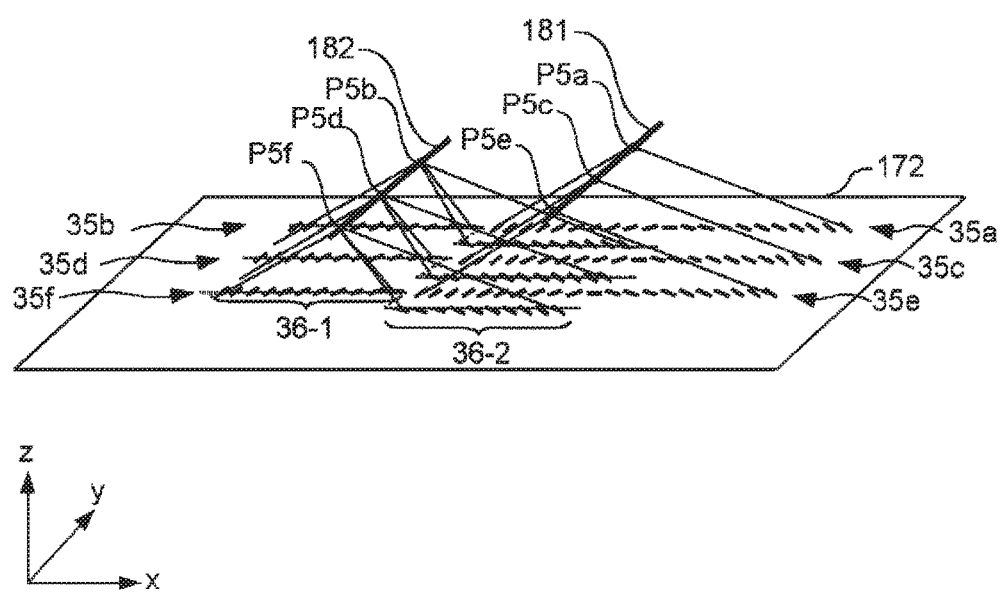
FIG. 14 schematically shows another arrangement example for avoiding the overlapping the light converging sections.

FIG. 14 shows another arrangement example for avoiding the overlapping of the light converging sections 35. FIG. 14 is different from the arrangement example shown in FIG. 13, where some reflection surfaces of the light converging section 35b, some reflection surfaces of the light converging section 35d, and some reflection surfaces of the light converging section 35f are arranged shifted to the y-axis direction so as not to overlap the other light converging section 35a, the other light converging section 35c, and the other light converging section 35e.

To describe for the light converging section 35f, a subset 36-1 of the reflection surface of the light converging section 35f in the x-axis minus direction is in the same position in the y-axis direction as the light converging section 35e and is positioned in the x-axis minus direction of the light converging section 35e. On the other hand, a subset 36-2 of the reflection surface of the light converging section 35f in the x-axis plus direction is arranged by shifting the position in the y-axis direction to the y-axis minus direction than the subset 36-1. Accordingly, the subset 36-2 can be set so as not to overlap the light converging section 35e.

Similarly, for the light converging section 35d and the light converging section 35b, they are arranged by shifting a subset of a part on the x-axis plus side to the y-axis minus direction so as not to overlap the light converging section 35a and the light converging section 35c.

In this way, by arranging shifting some reflection surfaces included in the light converging sections 35, it can prevent the reflection surfaces included in the different light converging sections 35 from overlapping each other. Also, by shifting and arranging some reflection surfaces, a plurality of reflection surfaces can be set not to be concentrated in one place. For example, if the plurality of reflection surfaces are overlapped or closely contacted with each other, an ambient light may be generated due to a form shear droop of the reflection surface and the like, and an image blur may become large in some cases. As described above, by shifting some reflection surfaces within the range of the upper limit value of the predetermined shifted width, it can prevent the plurality of reflection surfaces from overlapping or closely contacting with each other and can further suppress the image blur.

Figure 15A:
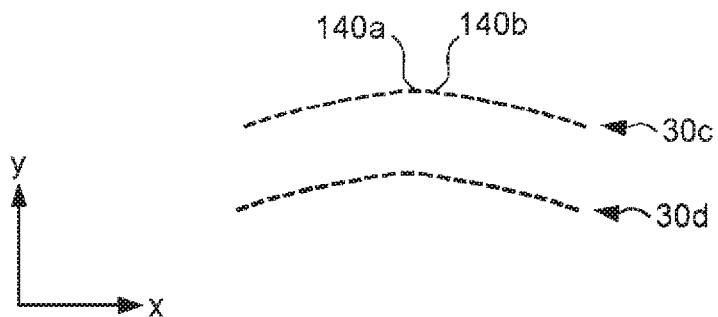
FIG. 15A schematically shows one optical element which provides a plurality of reflection surfaces.
Figure 15B:
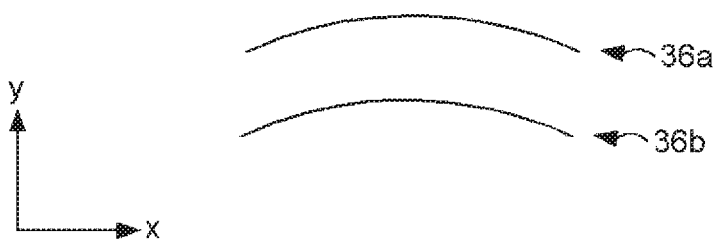
FIG. 15B schematically shows one optical element which provides a plurality of reflection surfaces.

FIGS. 15A to 15D schematically show one optical element providing a plurality of reflection surfaces. FIG. 15A shows a light converging section 30c and a light converging section 30d which are respectively have a plurality of reflection surfaces. FIG. 15B shows a case where the light converging section 30c is formed by a light converging section 36a being one continuous optical component. The light converging section 36a has reflection surfaces connecting between the plurality of the respective reflection surfaces included in the light converging section 30c. Similarly, as shown in FIG. 15B, the light converging section 30d is formed by a light converging section 36b being one optical component substantially extending in the x direction. On the reflection surfaces of the light converging section 36b, the direction of the normal line projected onto the xy plane continuously changes along the lengthwise direction of the light converging section 36b.

It should be noted that in a case where a reflection surface 140a and reflection surface 140b adjacent to each other included in the light converging section 30c are to be connected with each other, both ends may be connected by changing the position (the position within the xy plane) of at least one of the reflection surface 140a and the reflection surface 140b, without changing the sizes and the directions of the reflection surface 140a and the reflection surface 140b. Also, only some of the reflection surfaces 140 may be connected with each other without connecting all of the reflection surfaces 140 included in the light converging section 30c. Also, not only the reflection surfaces included in the same light converging sections 30 but also the reflection surfaces close to each other and included in the different light converging sections 30 may be connected with each other.

Figure 15C:
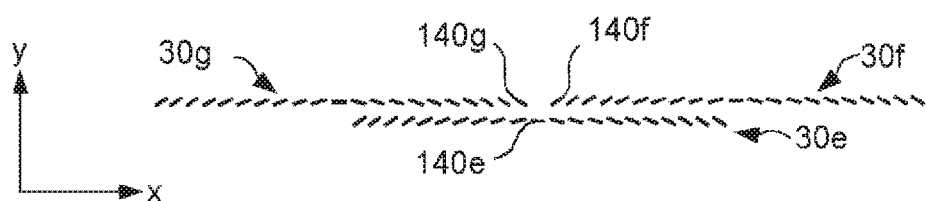
FIG. 15C schematically shows one optical element which provides a plurality of reflection surfaces.
Figure 15D:
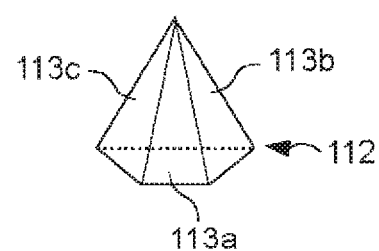
FIG. 15D schematically shows one optical element which provides a plurality of reflection surfaces.

FIG. 15C shows a light converging section 30*e*, a light converging section 30*f*, and a light converging section 30*g*, which respectively have a plurality of reflection surfaces. FIG. 15D shows a case where a reflection surface 140*e* included in the light converging section 30*e*, a reflection surface 140*f* included in the light converging section 30*f*, a reflection surface 140*g* included in the light converging section 30*g* are formed by one optical component 112. The optical component 112 has three reflection surfaces, i. e. a reflection surface 113*a*, a reflection surface 113*b*, and a reflection surface 113*c*. The direction of the reflection surface 113*a* approximately matches the direction of the reflection surface 140*e*, the direction of the reflection surface 113*b* approximately matches the direction of the reflection surface 140*f*, and the direction of the reflection surface 113*c* approximately matches the direction of the reflection surface 140*g*. In this way, if it is necessary to provide the plurality of reflection surfaces close to each other, one optical component having reflection surfaces where the direction is approximately matches the direction of the plurality of reflection surfaces may be formed.

It should be noted that similar to the description in FIG. 15A and FIG. 15B, by changing the positions (the positions within the xy plane) of at least two of the reflection surface 140*e* and the reflection surface 140*f* and the reflection surface 140*g*, the respective both ends of them may be connected with each other, without changing the sizes and the directions of the reflection surface 140*e* and the reflection surface 140*f* and the reflection surface 140*g*.

Figure 16:
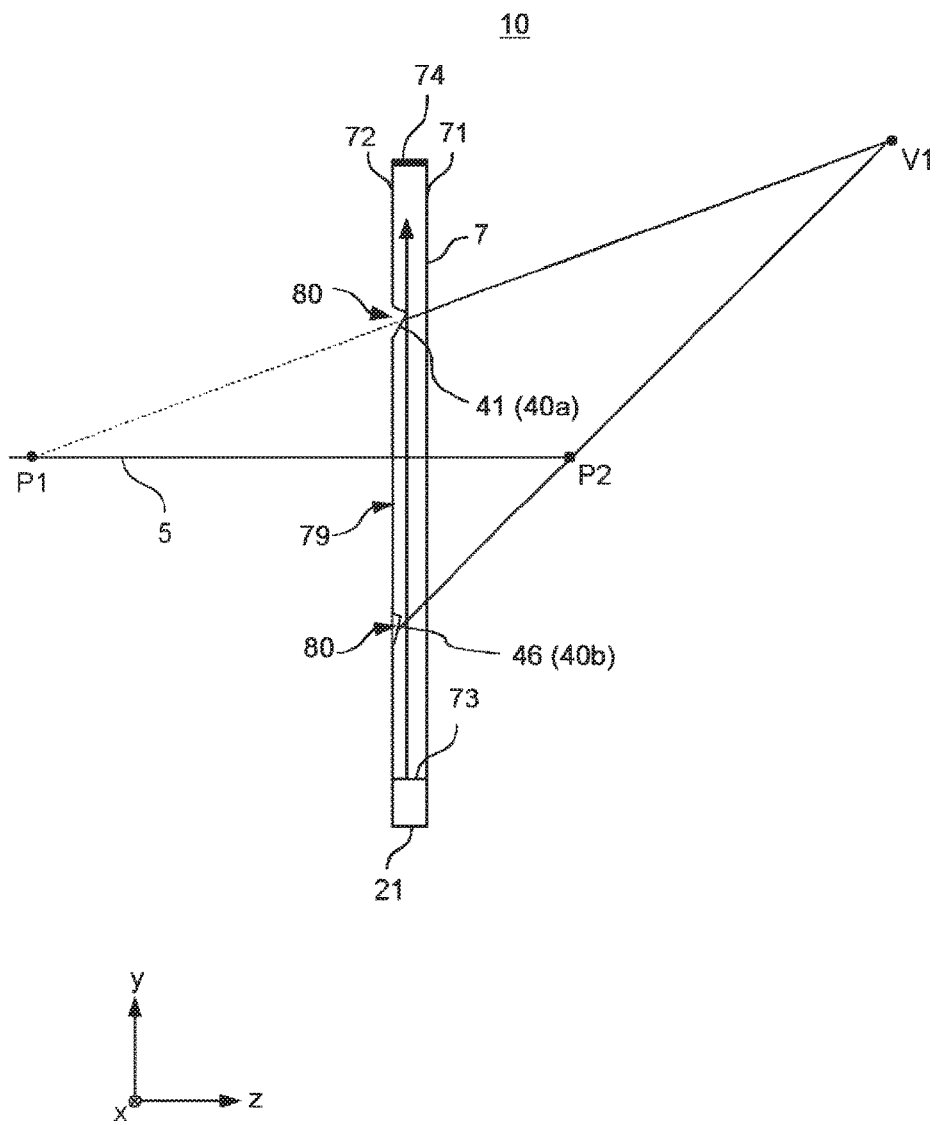
FIG. 16 schematically shows a cross section parallel to the yz plane of the display apparatus 10.
Figure 17:
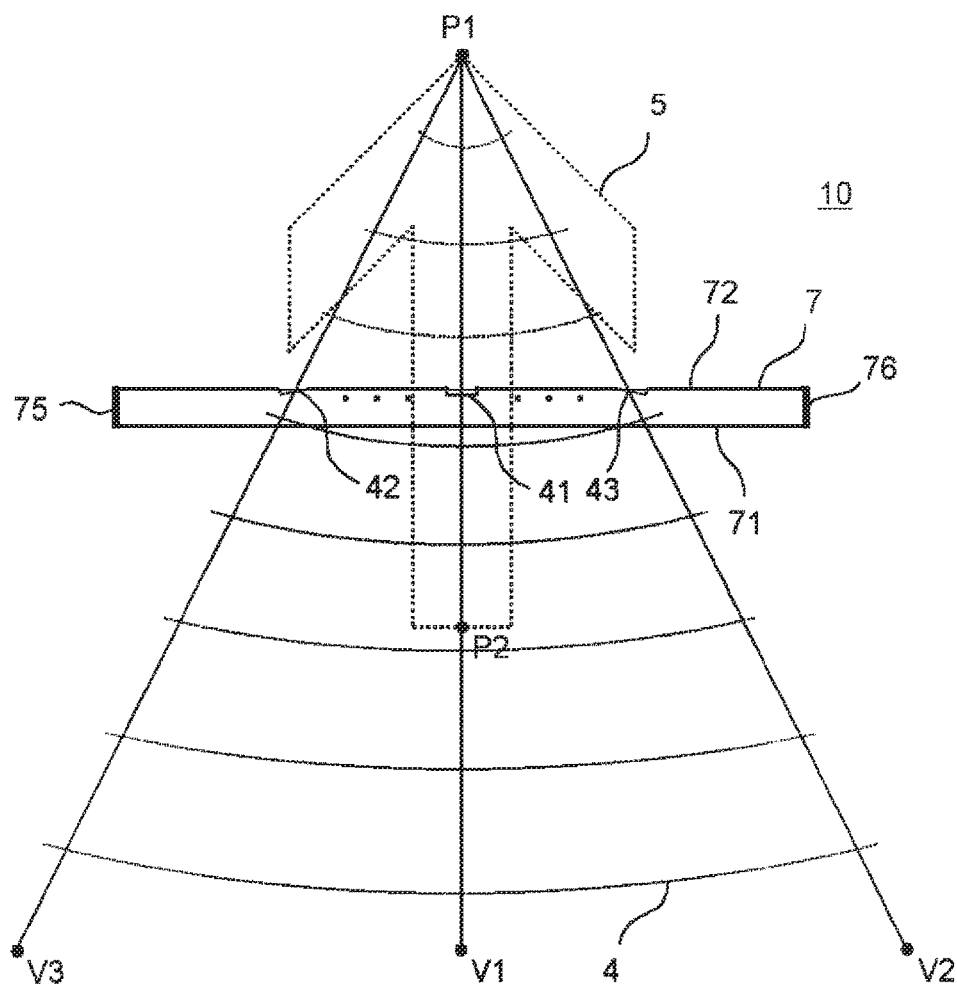

FIG. 16 schematically shows a cross section of the display apparatus 10. FIG. 17 schematically shows the other cross section of the display apparatus 10 together with an image 5 visually recognizable by an observer. The display apparatus 10 is a display apparatus as a variation of the display apparatus 700 and the display apparatus 102.

The display apparatus 10 has a light guiding plate 7 and a light source 21. The light guiding plate 7 corresponds to the light guiding plate 707 and the light guiding plate 70.

The light guiding plate 7 has the main surface 71 being an emission surface to emit lights and the main surface 72 on the opposite side to the main surface 71. Also, the light guiding plate 7 has an end surface 73, an end surface 74, an end surface 75, and an end surface 76, which are the end surfaces on all four sides of the light guiding plate 7. The end surface 73 is an incident light end surface of the light guiding plate 7. A light source 21 is provided to the end surface 73 and the lights from the light source 21 are incident from the end surface 73 to the light guiding plate 7. The end surface 74 is a surface on the opposite side to the end surface 73. The end surface 76 is a surface on the opposite side to the end surface 75. The light guiding plate 7 guides the lights within the surface parallel to the main surface 71. A spread angle of the lights guided by the light guiding plate 7 is at least smaller than a predetermined value within the surface parallel to the main surface 71.

In FIG. 16, a cross section parallel to the yz plane of the display apparatus 10 is shown. In FIG. 17, a cross section parallel to the xz plane of the display apparatus 10 is shown.

The light converging section 40*a* includes a plurality of reflection surfaces including a reflection surface 41, a reflection surface 42, and a reflection surface 43. The reflection surface 41 allows the lights from the light source 21 to be reflected in a direction along straight lines connecting the points on the reflection surface 41 with the fixed point P1.

The reflection surface 42 allows the lights from the light source 21 to be reflected in a direction along straight lines connecting the points on the reflection surface 42 with the fixed point P1. The reflection surface 43 allows the lights from the light source 21 to be reflected in a direction along straight lines connecting the points on the reflection surface 43 with the fixed point P1. Each of the light rays reflected by the reflection surface 41, the light rays reflected by the reflection surface 42, and the light rays reflected by the reflection surface 43 is converged on the fixed point P1 when extended in a direction opposite to the proceeding direction of the light rays.

In this way, the plurality of reflection surfaces included in the light converging section 40*a* allow the lights from the light source 21 to be reflected in the directions along the straight lines connecting the point on each of the reflection surfaces with the fixed point P1. Each of the light rays reflected by the plurality of reflection surfaces included in the light converging section 40*a* is converged on the fixed point P1 when extended in the direction opposite to each of the proceeding directions of the light rays. Therefore, according to the display apparatus 10, the lights toward any position within the range from a position V2 to a position V3 can be provided from the fixed point P1.

The light converging section 40*b* includes a plurality of reflection surfaces including the reflection surface 46. The reflection surface 46 allows the lights from the light source 21 to be reflected in a direction along a straight line connecting a point on the reflection surface 46 with the fixed point P2. Similarly, the plurality of reflection surfaces included in the light converging section 40*b* allow the lights from the light source 21 to be reflected in the direction along the straight line connecting the point on each of the reflection surfaces with the fixed point P2. In the light converging section 40*b*, the light rays reflected by the plurality of reflection surfaces included in the light converging section 40*b* are converged on the fixed point P2.

The main surface 72 includes a plurality of light converging sections to emit the reflected lights to be converged on the fixed points different from each other, similar to the light converging section 40*a* and the light converging section 40*b*. In this way, the display apparatus 10 forms the stereoscopic image 5 by an aggregation of the plurality of convergence points including the fixed point P1 and the fixed point P2. It should be noted that each reflection surface including the reflection surface 41, the reflection surface 42, the reflection surface 43, and the reflection surface 46 is one example of the optical surface.

In the present embodiment, in order to avoid a complicated description, it will be described that the proceeding direction of the reflected lights by the reflection surfaces included in the light converging section 40 is considered to match the proceeding direction of the emitted light emitted from the light guiding plate 7, unless otherwise stated in particular. Actually, depending on the angle at which the reflected light is incident onto the main surface 71, the refraction may substantially occur on the main surface 71 in some cases. Therefore, the proceeding direction of the reflected lights may not exactly match the proceeding direction of the emitted light in some cases. Therefore, for example, the description that "the reflection surface 41 allows the lights from the light source 21 to be reflected in a direction along the straight line connecting the point on the reflection surface 41 with the fixed point P1" should not be interpreted to be limited to that the reflection surface 41 allows the lights from the light source 21 to be reflected in a direction exactly along the straight line connecting the point on the reflection surface 41 with the fixed point P1. The above description is a concept including that the reflection surface 41 allows the lights from the light source 21 to be reflected such that the direction of the emitted light is to be substantially along the straight line connecting the emitting point of the emitted light from the main surface 71 with the fixed point P1, taking account of the angle formed by the proceeding direction of the reflected light by the reflection surface 41 and the main surface 72, for example, the refractive index of the main surface 71, the refractive index of space outside of the light guiding plate 7 and the like. This is also similar for the other reflection surfaces.

The end surface 73 is a surface approximately orthogonal to the main surface 71 and along the straight line connecting the reflection surface 41 with the reflection surface 42. The end surface 73 is an incident light end surface of the light guiding plate 7. The light source 21 is provided on the end surface 73 and allows the emitted lights to be incident from the end surface 73 onto the light guiding plate 7.

The light guiding plate 7 is one example of the light guide body guiding the lights from the light source 21. The light guiding plate 7 guides the lights from the light source 21 along the main surface 71. As shown in FIG. 16 and the like, the main surface 72 includes a pattern section 80, which forms the reflection surfaces such as the reflection surface 46, and the flat surface 79. The flat surface 79 is an area where the lights incident into the light guiding plate 7 from the end surface 73 are reflected and guided, the area having a function of spreading the lights within the light guiding plate 7 in a planar shape. A total reflection of the light incident onto inside the light guiding plate 7 through the end surface 73 from the light source 21 is repeated between the main surface 71 of the light guiding plate 7 and the flat surface 79 of the main surface 72 of the light guiding plate 7. Accordingly, the light incident onto inside the light guiding plate 7 through the end surface 73 is confined by the light guiding plate 7, spreads in a planar shape, and propagates within the light guiding plate 7 toward a direction away from the end surface 73.

Each reflection surface included by the light converging section 40 allows the lights from the light source 21 guided by the light guiding plate 7 to be reflected and to be emitted from the main surface 71 of the light guiding plate 7. Specifically, before the lights incident into the light guiding plate 7 from the end surface 73 are guided by the light guiding plate 7 and reach the end surface 74, the end surface 75, and the end surface 76, some lights of the lights are incident onto the reflection surfaces included in the light converging section 40. Each reflection surface included in the light converging section 40 allows the incident lights to be reflected and to be emitted from the main surface 71 of the light guiding plate 7. In this way, each reflection surface included in the light converging section 40 allows the lights guided by the light guiding plate 7 to be reflected and to be emitted from the main surface 71 of the light guiding plate 7.

It should be noted that a reflection processing has been performed to the inner side of the end surface 74, the inner side of the end surface 75, and the inner side of the end surface 76 of the light guiding plate 7. For example, a blackening processing has been performed to the inner side of the end surface 74, the inner side of the end surface 75, and the inner side of the end surface 76.

Table 1 shows an experimental result of relevancy between various pattern densities and transparency/non-transparency for the reflection surfaces. The term "OK" indicates that a subject determines that the reflection surface has transparency. The term "NG" indicates that a subject determines that the reflection surface has no transparency. It should be noted that the pattern density indicates the density of the area occupied by the pattern section 80 in the main surface 72.

TABLE 1

| Pattern Density | Transparency |
|---|---|
| 1.9 | OK |
| 3.9 | OK |
| 5.8 | OK |
| 6.4 | OK |
| 7.7 | OK |
| 12.8 | OK |
| 15.5 | OK |
| 16.4 | OK |
| 30.9 | NG |

As shown in this experimental result, it is preferable that the pattern density in the most of the areas within the main surface 72 is 30% or less.

Figure 18:
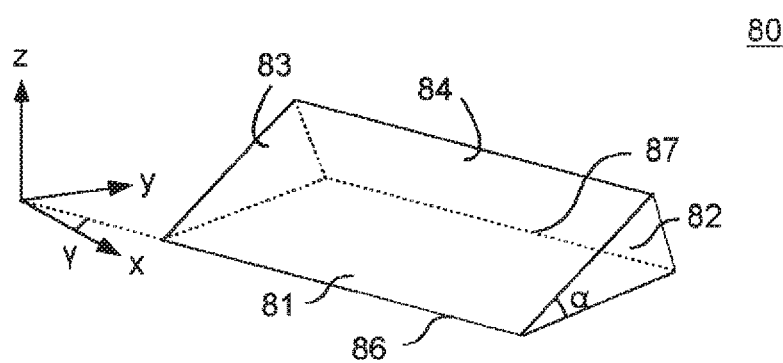
FIG. 18 schematically shows a pattern section 80.

FIG. 18 schematically shows the pattern section 80. The pattern section 80 is formed on the main surface 72 of the light guiding plate 7. The pattern section 80 is a recessed triangular portion formed in the main surface 72 of the light guiding plate 7. The pattern section 80 has a reflection surface 81, a side surface 82, a side surface 83, and a rear surface 84. A front edge 86 is a border line between the reflection surface 81 and the main surface 72. A rear edge 87 is a border line between the rear surface 84 and the main surface 72.

The pattern section 80 has a substantially triangular prism shape. For example, a cross-section shape of the pattern section 80 when cut in a plane perpendicular to the reflection surface 81 is a triangle. The cross-section shape of the pattern section 80 may be a right-angle triangle. The reflection surface 81 and the rear surface 84 have a square shape.

The reflection surface 81 faces the light source 21 and reflects the incident lights from the light source 21. Specifically, the reflection surface 81 is a smooth plane and reflects the incident lights in a specular manner. The reflection surface 81 substantially totally reflects the incident lights. The reflection surface 81 provides the reflection surfaces such as the reflection surface 41, the reflection surface 42, the reflection surface 43, and the reflection surface 46.

The proceeding direction of the reflected lights by the reflection surface 81 is mainly determined according to a positional relation between the reflection surface 81 and the light source 21, and an angle of the reflection surface 81. The angle of the reflection surface 81 is determined according to an angle γ formed by the front edge 86 of the pattern section 80 and the x axis, and an angle α formed by the reflection surface 81 and the main surface 72 (that is, an acute angle of an angle formed by a surface parallel to the main surface 72, and the reflection surface 81), for example.

The position of the pattern section 80, the angle α, and the angle γ are designed as the followings, for example. The position of the pattern section 80 within the main surface 72 is determined based on a fixed point Pi within a stereoscopic image shown by the pattern section 80, and a visual recognition direction in designing to allow the pattern section 80 to be visually recognizable. Based on the determined position of the pattern section 80 and position of the light source 21, the angle α and the angle γ are determined such that the reflected lights by the reflection surface 81 are along the straight line connecting the fixed point Pi with the position (for example, the central position) within the reflection surface 81.

As described above, actually, depending on the angle at which the reflected lights are incident onto the main surface 71, the refraction may occur on the main surface 71 in some cases. Therefore, actually, the angle α and the angle γ are determined by further based on the refractive index of the light guiding plate 7, the refractive index of space outside of the light guiding plate 7 and the like, for example, and by further taking account of the refraction of the reflected lights on the main surface 71.

Next, the lights guided within the light guiding plate 7 and the spread of light of the reflected lights by each reflection surface included in the light converging section 40 will be described. At each point within the light guiding plate 7, the lights guided by the light guiding plate 7 have a small spread angle in a direction, as the center along a straight line connecting the light source 21 with each point within the light guiding plate 7 in the surface parallel to the main surface 71. Specifically, at any point within the light guiding plate 7, in a case where an angle profile of the light intensity guided by the light guiding plate 7 has been projected onto the xy plane, the profile has a strong directivity in a direction, as the center along the straight line connecting the light source 21 with the point.

As shown in FIG. 16 and the like, the light reflected by the reflection surface 41 has a spread angle smaller than a predetermined value in a direction, as the center along the straight line connecting the point on the reflection surface 41 with the fixed point P1. In particular, in a case where the angle profile of the reflected light intensity by the reflection surface 41 is projected onto the xz plane, the profile has a strong directivity. Similarly, the light reflected on the reflection surface 42 has a spread angle smaller than the predetermined value in a direction, as the center along the straight line connecting the point on the reflection surface 42 with the fixed point P1. Also, the light reflected by the reflection surface 43 has a spread angle smaller than the predetermined value in a direction along the straight line connecting the point on the reflection surface 43 with the fixed point P1.

In this way, the light within the light guiding plate 7 has a spread angle smaller than the predetermined value within the xy plane. Accordingly, the reflected light by the reflection surface 41, the reflected light by the reflection surface 42, and the reflected light by the reflection surface 43 also have spread angles smaller than the predetermined value at least within the xz plane. For that reason, the reflected lights of the reflection surface 41 do not pass through the position substantially shifted from the position V1 to the x direction. Also, the reflected lights of the reflection surface 42 do not pass through the position substantially shifted from the position V2 to the x direction, and the reflected lights of the reflection surface 43 do not pass through the position substantially shifted from the position V3 to the x direction. Then, the plurality of reflection surfaces included in the light converging section 40a achieve a wavefront 4 of light as generated from the P1 by an aggregation of the wavefront of each reflection light. Similarly, the plurality of reflection surfaces included in the light converging section 40b also achieve a wavefront of light as generated from P2 by an aggregation of the wavefront of each reflection light. For that reason, regardless of any position where an observer is within the range from the position V2 to the position V3, the image is recognized as the stereoscopic image 5 by the observer.

Figure 19:
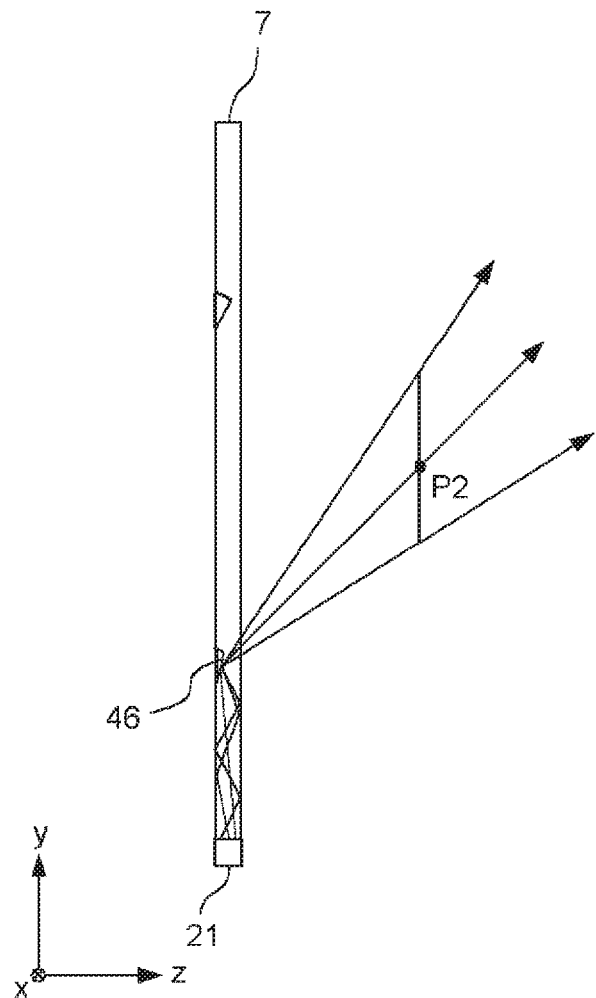
FIG. 19 schematically shows behaviors of a light within the light guiding plate 7 and a reflected light by a reflection surface 46.
Figure 20:
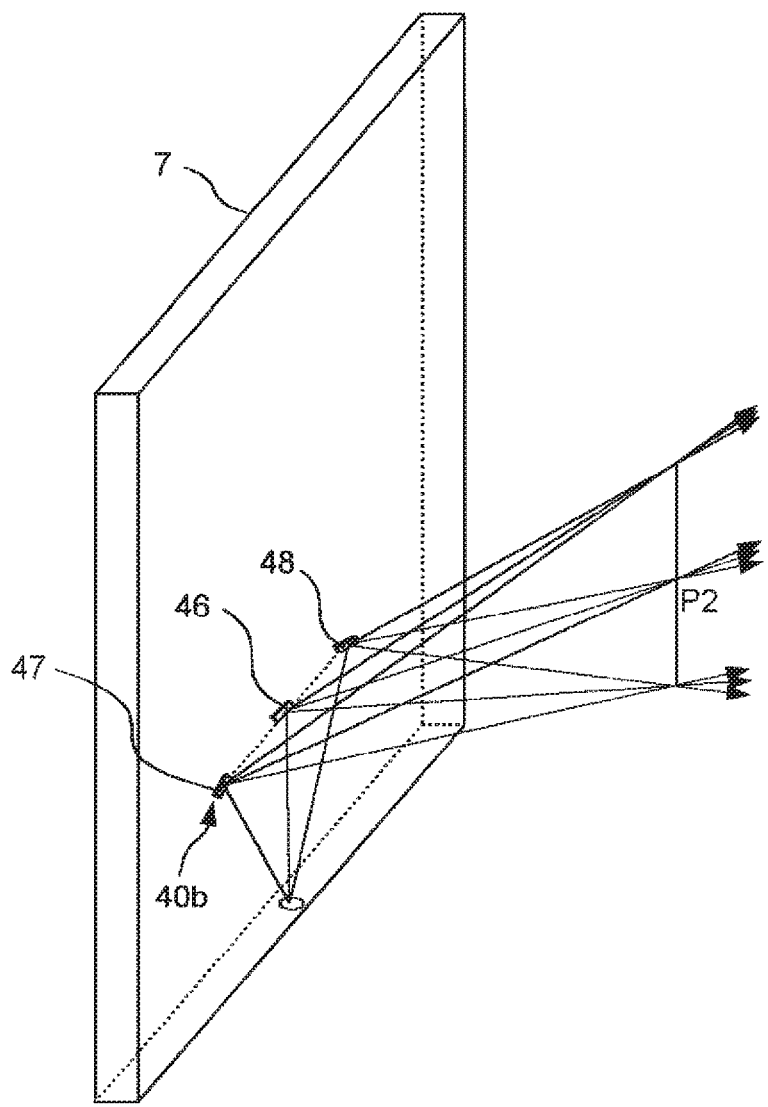
FIG. 20 schematically shows behaviors of reflected lights by each of the reflection surface 46, a reflection surface 47, and a reflection surface 48.

FIG. 19 schematically shows behaviors of the light within the light guiding plate 7 and the reflected light by the reflection surface 46. FIG. 20 schematically shows behaviors of the reflected lights by each of the reflection surface 46, the reflection surface 47, and the reflection surface 48 included in the light converging section 40b.

As shown in FIG. 19, some light rays of the light rays incident from the light source 21 onto the end surface 73 are incident onto the reflection surface 46. That is, the distribution of the incident angle of the lights incident toward the reflection surface 46 has a certain spread in the z direction. For that reason, the reflected light by the reflection surface 46 has a certain spread in the y-axis direction.

The reflection surface 47 and the reflection surface 48 are also similar to the reflection surface 46. That is, the reflected light by the reflection surface 47 and the reflected light by the reflection surface 48 respectively have certain distributions in the y-axis direction. Therefore, as shown in FIG. 20, the reflected light by the reflection surface 46, the reflected light by the reflection surface 47, and the reflected light by the reflection surface 48 aggregate on the straight line parallel to the y axis, including the fixed point P2. In this way, the reflected light by each reflection surface included in the light converging section 40b is substantially converged on substantially one convergence line. Even if the reflected light is converged in a linear manner, among all light fluxes of the reflected light, only a small part of light fluxes proceeding in a direction where an observer is can be seen by the observer. For that reason, a stereoscopic image can be recognized by the observer without problems. It should be noted that each reflection light by the reflection surface 46, the reflection surface 47, and the reflection surface 48 may not be exactly converged on one line, and a slight shift in a direction in which each reflection light proceeds may occur in some cases. In this case, as the observation position of the observer is moved, the stereoscopic image may look like deformed in some cases.

Figure 21:
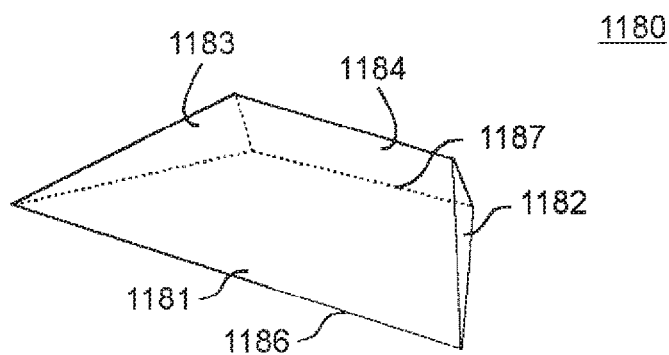
FIG. 21 is a perspective view schematically showing a pattern section 1180 as a variation of the pattern section 80.

FIG. 21 is a perspective view schematically showing a pattern section 1180 which is a variation of the pattern section 80. The pattern section 1180 has a reflection surface 1181, a side surface 1182, a side surface 1183, and a rear surface 1184. A front edge 1186 is a border line between the reflection surface 1181 and the main surface 72. The reflection surface 1181 is a surface on the light source 21 side among the plurality of surfaces included in the pattern section 1180.

A rear edge 1187 is a border line between the rear surface 1184 and the main surface 72. The front edge 1186 is longer than the rear edge 1187. The reflection surface 1181 has a trapezoid shape. The rear surface 1184 has a square shape. Also, the shape of the cross section of the pattern section 1180 when cut in the xy plane is a trapezoid.

In a case of viewing in an incident direction where the lights from the light source 21 are incident onto the reflection surface 1181, the side surface 1182, the side surface 1183, and the rear surface 1184 are hidden by the reflection surface 1181. That is, if projecting surfaces other than the reflection surface 1181 among the plurality of surfaces included in the pattern section 1180 onto the reflection surface 1181 along a straight line connecting the light source 21 with the reflection surface 1181, the entire surface other than the reflection surface 1181 is projected onto inside the reflection surface 1181. Accordingly, it can suppress the lights from the light source 21 from being incident onto the side surface 1182 and the side surface 1183. Also, even if a spread occurs due to the form shear droop and the like on the side surface 1182, the side surface 1183, and the rear surface 1184, an influence from the spread portion on the reflected lights can be suppressed.

Figure 22:
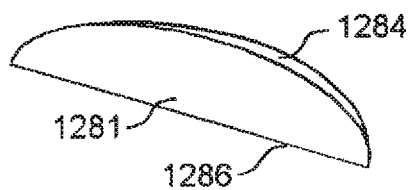
FIG. 22 is a perspective view schematically showing a pattern section 1280 as a variation of the pattern section 80.

FIG. 22 is a perspective view for schematically showing a pattern section 1280 as a variation of the pattern section 80. The pattern section 1280 has a reflection surface 1281 and a rear surface 1284. A front edge 1286 is a border line between a reflection surface 1281 and a main surface 72.

The reflection surface 1281 is a surface on the light source 21 side among the plurality of surfaces included in the pattern section 1280. The reflection surface 1281 approximately has a semi-circular or a semi-ellipse shape. The rear surface 1284 is a curved surface.

In a case of viewing in an incident direction where the lights from the light source 21 are incident onto the reflection surface 1281, the rear surface 1284 is hidden by the reflection surface 1281. For example, if projecting surfaces, which are other than the reflection surface 1281 among the plurality of surfaces included in the pattern section 1280, onto the reflection surface 1281 along a straight line connecting the light source 21 with the reflection surface 1281, the entire surface other than the reflection surface 1281 is projected onto inside the reflection surface 1281. Accordingly, it can suppress the lights from the light source 21 from being incident onto the rear surface 1284. Also, even if the spread occurs due to the form shear droop and the like on the rear surface 1284, the influence from the spread portion on the reflected lights can be suppressed.

Figure 23:
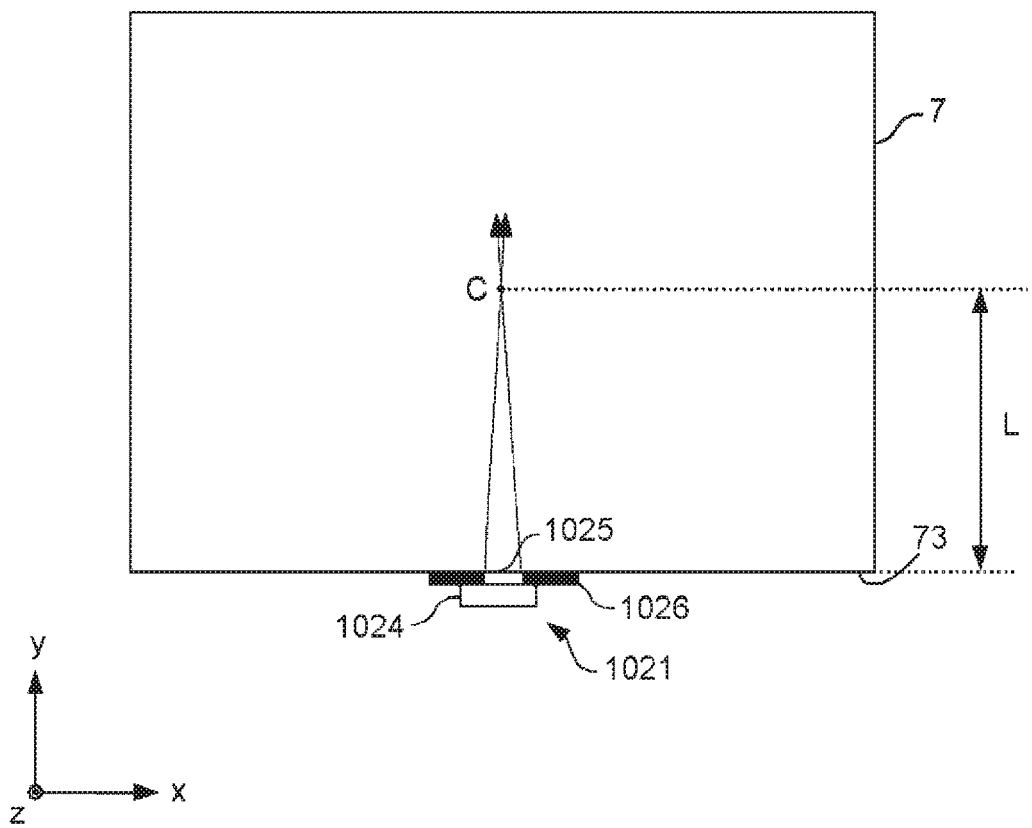
FIG. 23 schematically shows a display apparatus 1000 as a variation of the display apparatus 10.

FIG. 23 schematically shows a display apparatus 1000 as a variation of the display apparatus 10. The display apparatus 1000 has a light source 1021 as one example of the light source 21. The light source 1021 allows the lights having a relatively small spread in the x-axis direction to be incident onto the light guiding plate 7.

The light source 1021 has a light emitting section 1024 and a light shielding section 1026. The light shielding section 1026 has an aperture 1025. The aperture 1025 may be a slit for condensing lights in the x-axis direction. Among the lights emitted from the light emitting section 1024, only the lights passing through the aperture 1025 of the light shielding section 1026 are incident onto the end surface 73 of the light guiding plate 7. Accordingly, the spread angle of the incident light toward the inside of the light guiding plate 7 can be set smaller than the predetermined value. In particular, the spread of the incident light in the x-axis direction can be set small.

In a case where the light source 1021 is applied, it is preferable that W≤L/10 is satisfied, where L indicates a distance between the end surface 73 of the light guiding plate 7 and a position C of the center of the main surface 71, and W indicates a spread width of the light incident from the end surface 73. Here, the width in the x-axis direction of the aperture 1025 may be applied as W. Also, in addition, the spread width of the intensity distribution of the light incident from the end surface 73 may be applied as W. For example, in the intensity distribution of the light where the horizontal axis indicates the position of the x-axis direction and the vertical axis indicates the intensity of the light incident from the end surface 73, the full width of a position where the light intensity is half of the maximum value (full width at half maximum) may be applied as W.

Figure 24:
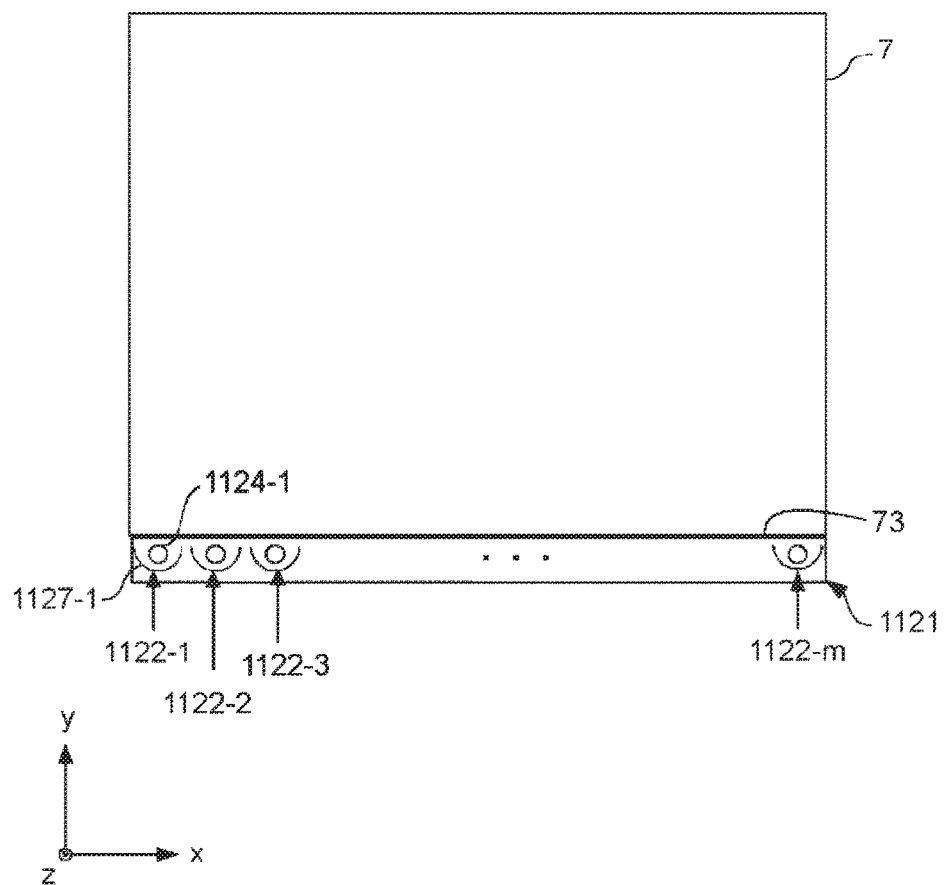
FIG. 24 schematically shows a display apparatus 1100 as a variation of the display apparatus 10.

FIG. 24 schematically shows a display apparatus 1100 as a variation of the display apparatus 10. The display apparatus 1100 has a light source 1121 as a variation of the light source 21. The light source 1121 is a collimating light source. Specifically, the light source 1121 allows the lights substantially parallel to the y axis to be incident onto the light guiding plate 7.

The light source 1121 has m pieces of light source sections, i. e. a light source section 1122-1 to a light source section 1122-*m*. Here, m is an integer of 2 or more. Each of the light source section 1122-1 to the light source section 1122-*m* is a parallel light source for emitting lights substantially parallel to the y axis.

The light source section 1122-1 has a light emitting section 1124-1 and a concave mirror 1127-1. The concave mirror 1127-1 is provided on the opposite side to the end surface 73 with respective to the light emitting section 1124-1. The concave mirror 1127-1 reflects the lights emitted by the light emitting section 1124-1 and converts the same into the lights substantially parallel to the y axis. Accordingly, the light source section 1122-1 allows the substantially parallel lights substantially parallel to the y axis to be incident onto the end surface 73 of the light guiding plate 7. Each of the light source section 1122-2 to the light source section 1122-*m* has a similar configuration to the light source section 1122-1. For that reason, the descriptions for the configurations of the light source section 1122-2 to the light source section 1122-*m* are omitted.

On the end surface 73 of the light guiding plate 7, the light source section 1122-1 to the light source section 1122-*m* are provided aligned along the x-axis direction. Accordingly, the light source 1121 allows the lights substantially parallel to the y axis to be incident onto the light guiding plate 7 from an approximately entire surface of the end surface 73 of the light guiding plate 7.

Figure 25:
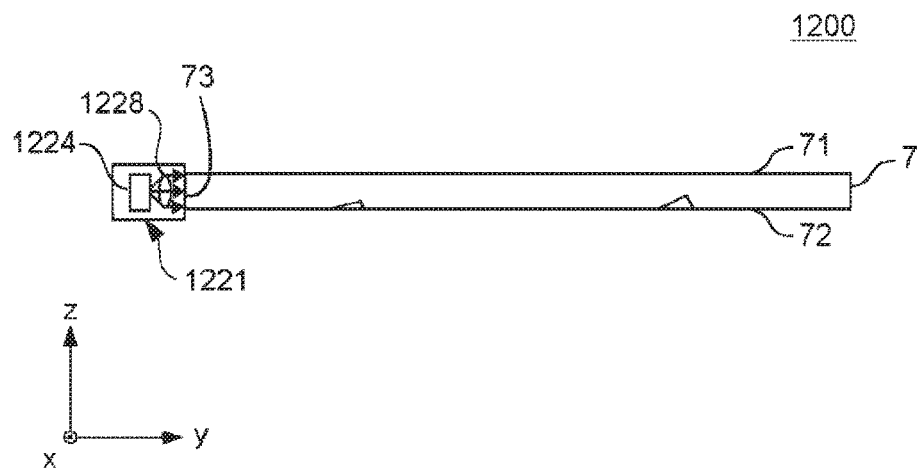
FIG. 25 schematically shows a display apparatus 1200 as a variation of the display apparatus 10.

FIG. 25 schematically shows a display apparatus 1200 as a variation of the display apparatus 10. The display apparatus 1200 has a light source 1221 as one example of the light source 21.

The light source 1221 has a light emitting section 1224 and a lens 1228. The lens 1228 collimates the lights emitted by the light emitting section 1224 and allows the lights to be incident onto the end surface 73 of the light guiding plate 7. The light emitting section 1224 may emit a diverged light.

It should be noted that, as the light source 21, any of the light source 1021 shown in FIG. 23, the light source 1121 shown in FIG. 24, and the light source 1221 shown in FIG. 25 may be applied so as to satisfy the conditions related to Δθ described above with reference to FIG. 4, FIG. 5 and the like.

Figure 26:
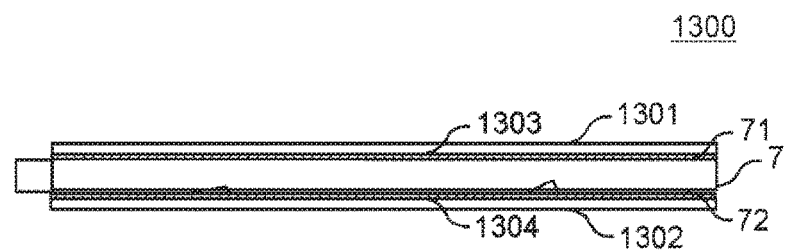
FIG. 26 schematically shows a display apparatus 1300 as a variation of the display apparatus 10.

FIG. 26 schematically shows a display apparatus 1300 as a variation of the display apparatus 10. The display apparatus 1300 further includes a cover film 1301 and a cover film 1302, in addition to the components included in the display apparatus 10.

The cover film 1301 is provided to the main surface 71. The cover film 1301 is adhered to the main surface 71 by an adhesive layer 1303 which has a lower refractive index than the refractive index of the light guiding plate 7. The cover film 1302 is provided to the main surface 72. The cover film 1302 is adhered to the main surface 72 by an adhesive layer 1304 which has a lower refractive index than the refractive index of the light guiding plate 7. It should be noted that the cover film 1302 is provided between the cover film 1302 and the main surface 72 such that the air enters a recessed portion forming the pattern section having the reflection surfaces.

By providing the cover film 1301 and the cover film 1302, it can prevent the front surface of the light guiding plate 7 from being scratched. For that reason, it can suppress the emitted lights in a direction different from the direction of the designed light flux from increasing.

The cover film 1301 and the cover film 1302 may have an antireflective layer. The cover film 1301 and the cover film 1302 may have an antireflective film (AR coating (reflection-reducing coating)). Accordingly, this can decrease the reflection on the front surface of the light guiding plate 7 and can increase the light transmittance. It should be noted that as a variation of the display apparatus 1300, a configuration where the cover film 1301 is provided but without the cover film 1302 can be adopted. Also, as another variation of the display apparatus 1300, a configuration where the cover film 1302 is provided but without the cover film 1301 can be adopted. It should be noted that the antireflective layer may be directly formed on at least one of the main surface 71 and the main surface 72.

Figure 27:
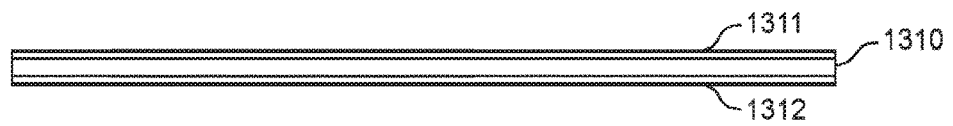
FIG. 27 schematically shows a cross sectional structure of a cover film 1301.

FIG. 27 schematically shows a cross sectional structure of the cover film 1301. The cover film 1301 includes a base material layer 1310, a front surface layer 1311, and a front surface layer 1312.

As one example, the refractive index of the base material layer 1310 is higher than the refractive index of the front surface layer 1311. Also, the refractive index of the base material layer 1310 is higher than the refractive index of the front surface layer 1312. The base material layer 1310 may be formed of polycarbonate. The front surface layer 1311 may be formed of acrylic resin such as polymethyl methacrylate (PMMA). It should be noted that the cover film 1302 may have a similar configuration to the cover film 1301.

Figure 28A:
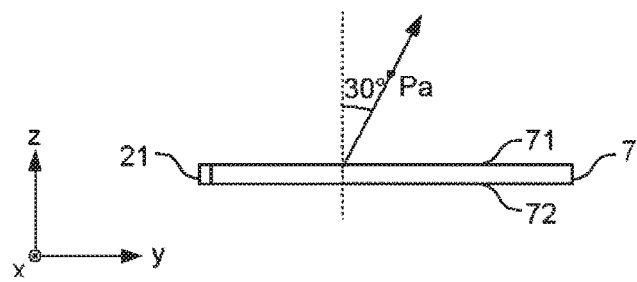
FIG. 28A schematically shows a design example of a reflection surface of a main surface 72.
Figure 28B:
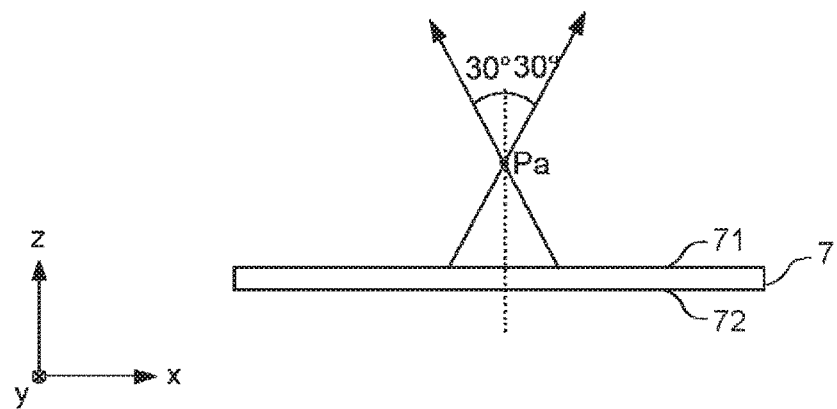
FIG. 28B schematically shows a design example of a reflection surface of the main surface 72.
Figure 28C:
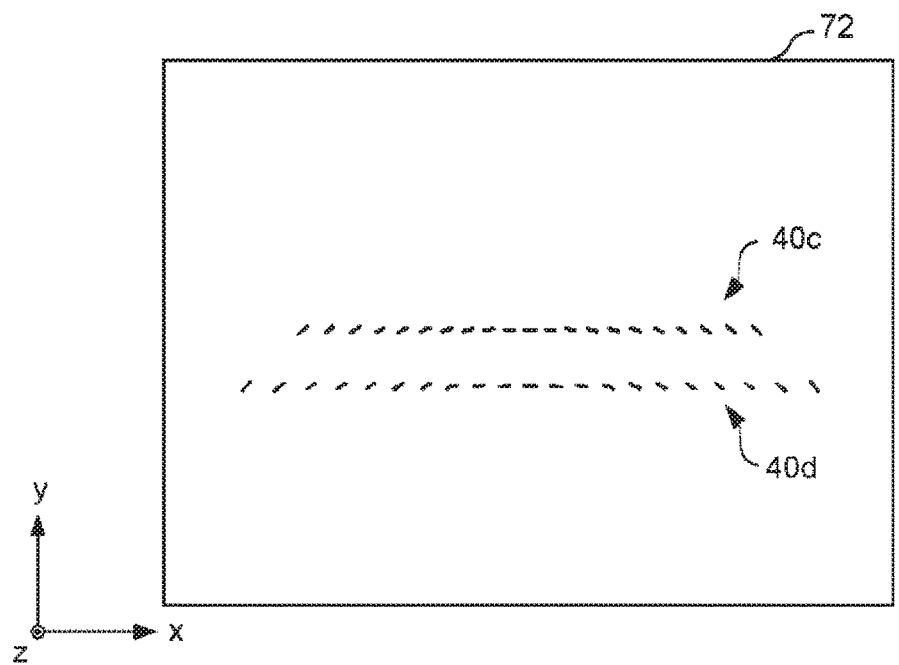
FIG. 28C schematically shows a design example of a reflection surface of the main surface 72.

FIGS. 28A to 28C schematically show design examples of the reflection surface of the main surface 72. FIG. 28A is a plan view on the yz plane schematically showing a convergence range of the fixed point Pa and the light flux in designing. The fixed point Pa is positioned in the z-axis plus direction (on the observer side) than the light guiding plate 7. The convergence range is 30° with respect to the normal line of the light guiding plate 7.

FIG. 28B is a plan view on the xy plane schematically showing the convergence range in designing. Within the xy plane, the direction of the converged light fluxes is set per 3° within the range of −30 or more and 30° or less. The number of the light fluxes in designing is 21.

For one fixed point Pa, the positions and directions of 21 reflection surfaces corresponding to the light fluxes in 21 directions are determined. The position and direction of each reflection surface are determined such that the direction of the reflected light faces the corresponding direction within the convergence range. In this way, by determining the position and the direction of each reflection surface, the reflected light by each reflection surface is aggregated on the fixed point Pa. Therefore, the reflected light by each reflection surface becomes to be along the straight line connecting the fixed point Pa with the point on each reflection surface.

FIG. 28C schematically shows the positions and directions of the reflection surfaces determined according to the above-described design example. In FIG. 28C, a light converging section 40c and a light converging section 40d on the main surface 72 are shown. The reflected lights by the reflection surfaces included in the light converging section 40c are aggregated on the fixed point apart from the light guiding plate 7 by a first distance in the z-axis plus direction. The reflected lights by the reflection surfaces included in the light converging section 40d are aggregated on the fixed point apart from the light guiding plate 7 by a second distance in the z-axis direction. Here, the first distance is a value larger than the second distance.

Figure 29A:
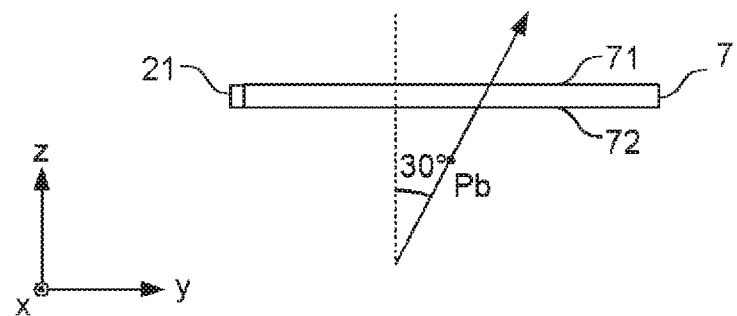
FIG. 29A schematically shows a design example of a reflection surface of a main surface 72.
Figure 29B:
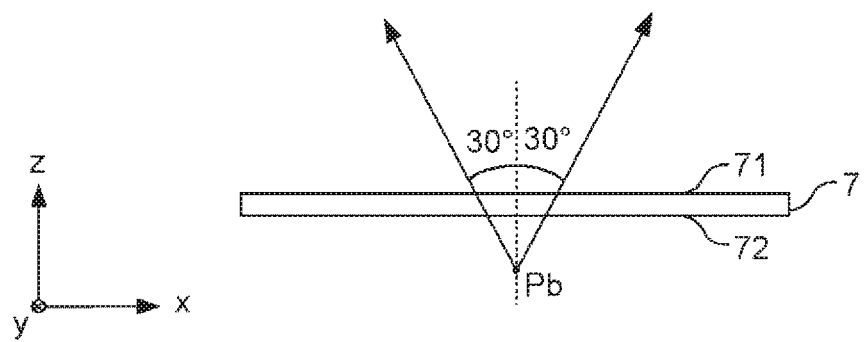
FIG. 29B schematically shows a design example of a reflection surface of the main surface 72.
Figure 29C:
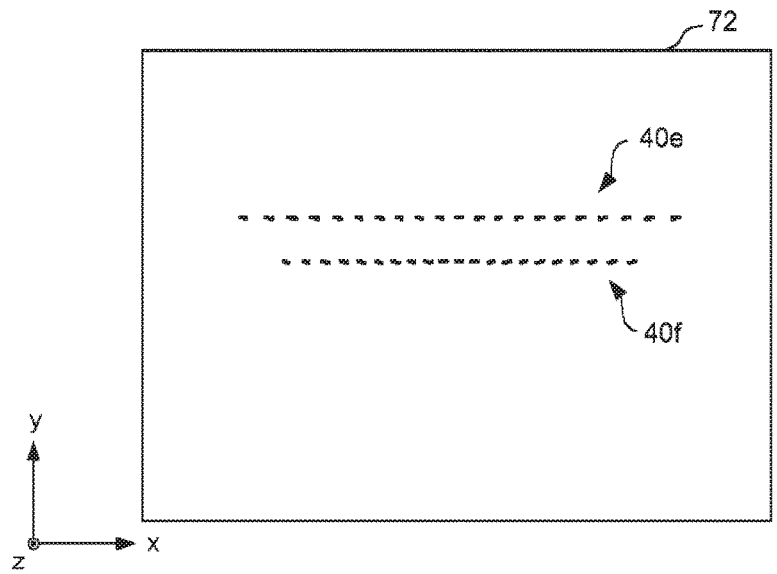
FIG. 29C schematically shows a design example of a reflection surface of the main surface 72.

FIGS. 29A to 29C schematically show design examples of the reflection surfaces of the main surface 72. FIG. 29A is a plan view on the yz plane schematically showing the fixed point Pb and a convergence range in designing. The fixed point Pb is positioned in the z-axis minus direction (on the opposite side to the observer) than the light guiding plate 7. The convergence range is 30° with respect to the normal line of the light guiding plate 7.

FIG. 29B is a plan view on the xy plane schematically showing a convergence range in designing. Within the xy plane, the direction of the converged light fluxes is set per 3° within the range of −30° or more and 30° or less. Therefore, the number of the light fluxes in designing is 21.

For one fixed point Pb, the positions and directions of 21 reflection surfaces corresponding to the light fluxes in 21 directions are determined. The position and the direction of each reflection surface are determined such that the direction of the reflected light faces the corresponding direction within the convergence range. In this way, by determining the position and the direction of each reflection surface, if the direction of the reflected light by each reflection surface is extended on the z-axis minus side, the lights are aggregated on the fixed point Pb. Therefore, similar to a case of the fixed point Pa on the observer side in FIGS. 28A to 28C, the reflected light by each reflection surface becomes to be along the straight line connecting the fixed point Pb with the point on each reflection surface.

FIG. 29C schematically shows the position and the direction of the reflection surface determined by the above-described design example. In FIG. 29C, a light converging section 40e and a light converging section 40f on the main surface 72 are shown. If the direction of the reflected lights by the reflection surface included in the light converging section 40e is extended on the z-axis minus side, the lights are aggregated on the fixed point apart from the light guiding plate 7 by a first distance in the z-axis direction. If the reflected lights by the reflection surfaces included in the light converging section 40f are extended on the z-axis minus side, the lights are aggregated on the fixed point apart from the light guiding plate 7 by a second distance in the z-axis minus direction. Here, the first distance is a value larger than the second distance.

The design method described with reference to FIGS. 28A to 28C, FIGS. 29A to 29C and the like is a design method in a case where the moving direction of the observer for each fixed point in designing is within a plane. In a utilization environment of the display apparatus 10, this design method is optimal for a case where a degree of freedom in movement of an observer is predicted to be high in the x-axis direction.

According to this design method, an angle formed by straight lines connecting the reflection surfaces adjacent to each other among the plurality of reflection surfaces included in one light converging section 40 with the fixed points forms a predetermined resolution angle (for example, 3°). Accordingly, while spacing the adjacent reflection surfaces from each other, a spread wavefront as occurring from the fixed points can be generated within the predetermined angle range (for example, from −30° to 30°). Accordingly, the so-called black matrix effect may occur and the contrast of the image may be increased in some cases. The relation among the resolution angle, the angle range, the spread of light and the like is the same as the descriptions with reference to FIG. 4, FIG. 5, and the like.

Figure 30:
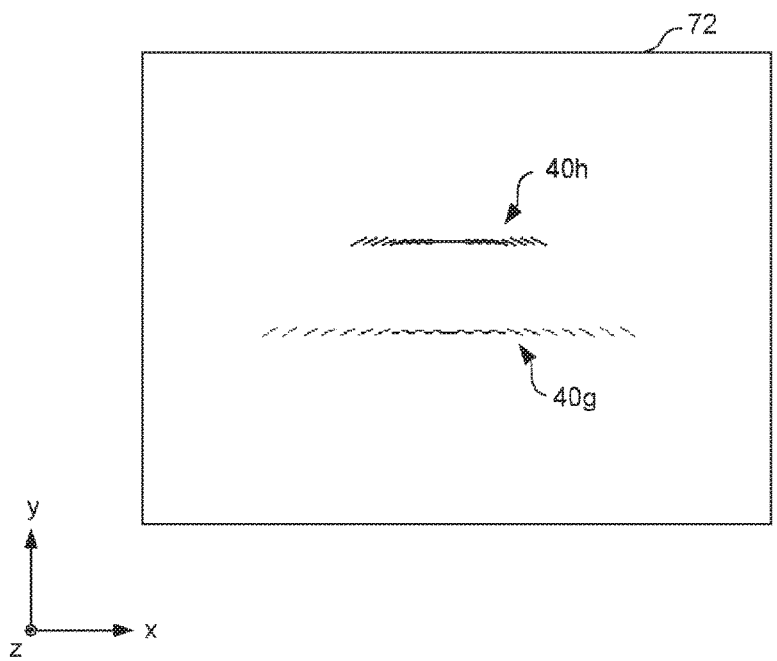
FIG. 30 schematically shows a design example of a reflection surface in a case where a fixed point Pa is set in the vicinity of the light guiding plate 7.

FIG. 30 schematically shows a design example of the reflection surfaces in a case where the fixed points Pa are set in the vicinity of the light guiding plate 7. In FIG. 30, a light converging section 40g and a light converging section 40h on the main surface 72 are shown. The reflection surfaces included in the light converging section 40g are the reflection surfaces determined with respect to the fixed point apart from the light guiding plate 7 by a third distance in the z-axis direction. The reflection surface to which the light converging section 40h belongs is a reflection surface determined with respect to the fixed points apart from the light guiding plate 7 by a fourth distance in the z-axis direction. Here, the following is satisfied: the second distance>the third distance>the fourth distance.

As shown in FIGS. 28A to 28C and FIG. 30, as the distance from the light guiding plate 7 to the fixed point Pa is smaller, the arrangement density of the reflection surfaces becomes higher. In particular, in a case of viewing along the proceeding direction of the lights from the light source 21, the reflection surfaces of the light converging section 40h in FIG. 30 partially overlap the adjacent reflection surface. For that reason, in a case where an observer views from the direction of the light fluxes in designing, not only the reflected light by the reflection surface intended in designing but also the reflected light by a reflection surface adjacent to the reflection surface may be seen by the observer in some cases. For that reason, a blur in the stereoscopic image recognized by the observer may occur in some cases.

FIGS. 31 A and B schematically show two design examples of the reflection surfaces with respect to the fixed points in the vicinity of the light guiding plate 7. FIG. 31A shows a first arrangement example of the reflection surface. FIG. 31B shows a second arrangement example of the reflection surface.

Figure 31A:
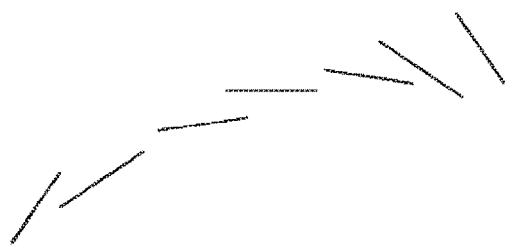
FIG. 31A schematically shows a design example of the reflection surface to the fixed point in the vicinity of the light guiding plate 7.
Figure 31A:
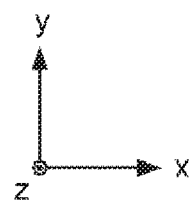

According to the design example of FIG. 31A, the y axis coordinate of the reflection surface becomes larger as the x coordinate of the reflection surface is larger. Accordingly, compared to a case where the arrangement direction of the reflection surfaces is substantially parallel to the x direction, it can suppress an influence due to a higher arrangement density of the reflection surfaces. It should be noted that the y coordinate of the reflection surfaces may be set smaller as the x coordinate of the reflection surfaces is larger.

According to the design example of FIG. 31A, in a case where the y coordinate of the reflection surfaces is aligned along the x axis, the y coordinate of the reflection surfaces are shifted alternately in the y-axis plus direction and the y-axis minus direction. In this way, the reflection surfaces are arranged shifted in a zigzag shape. Accordingly, compared to a case where the arrangement direction of the reflection surfaces is substantially parallel to the x direction, it can suppress an influence due to the higher arrangement density of the reflection surfaces.

Figure 31B:
FIG. 31B schematically shows another design example of the reflection surface to the fixed point in the vicinity of the light guiding plate 7.
Figure 31B:
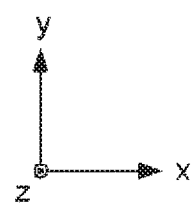

As shown in FIG. 31A and FIG. 31B, if the positions of the reflection surfaces are shifted, the angles of the reflection surfaces are determined based on the positions of the reflection surfaces after shifted and the fixed point Pa. For example, as the angle of the reflection surface, the angle γ and the angle α described in FIG. 18 are determined.

Figure 32:
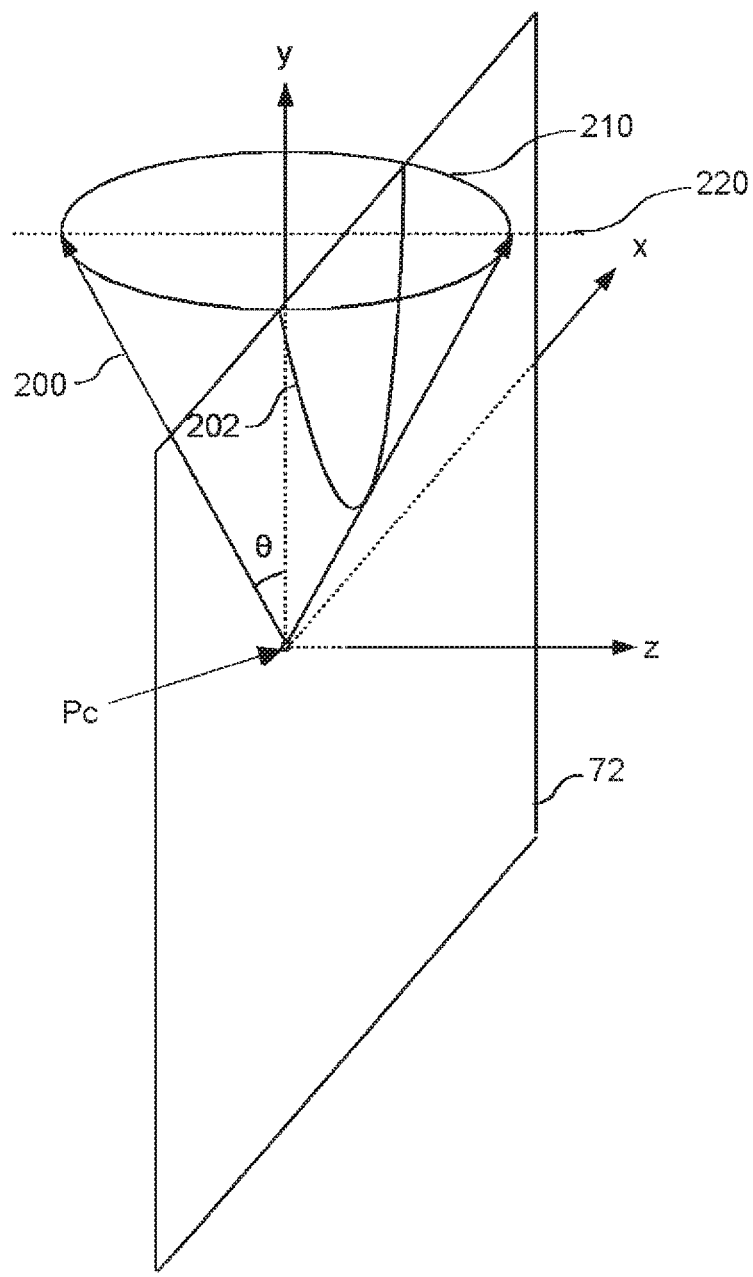
FIG. 32 schematically shows another design example of the arrangement of the reflection surface.

FIG. 32 schematically shows another design example of the arrangement of the reflection surfaces. A design method described in FIG. 32 describes a design method in a case where an angle θ is formed by the direction of the converged light fluxes and a reference direction. Here, the description will be made using a coordinate axis with a fixed point Pc as an origin.

The fixed point Pc is positioned in the z-axis minus direction than the main surface 72. Passing through the fixed point Pc, a cone 200 forming the angle θ with the y axis is considered. The reflection surfaces are arranged on an intersection line 202 of the cone 200 and the main surface 72. When the direction of the light fluxes is to be determined, the direction can be determined per predetermined angle on a circle of the cone 200 when cut within the xy plane. As one example, with respective to a projection axis 220 of the z axis on a circle 210, a predetermined angle range may be set and the direction of the light fluxes may be determined per predetermined angle resolution.

Figure 33A:
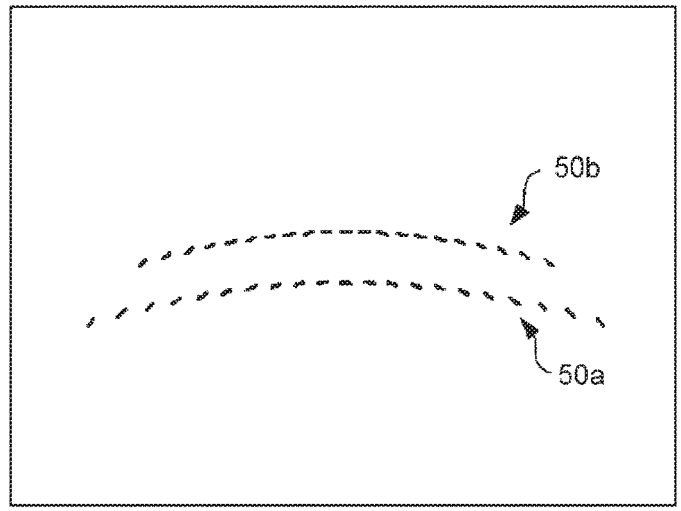
FIG. 33A schematically shows a design example of a position of the reflection surface in FIG. 32.
Figure 33B:
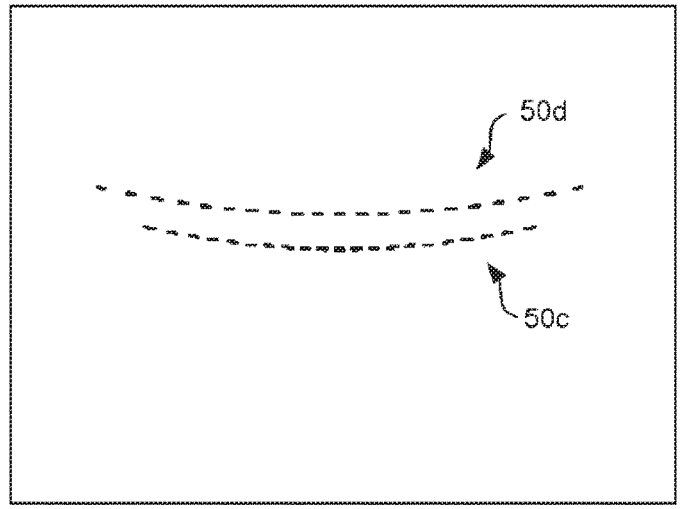
FIG. 33B schematically shows a design example of the position of the reflection surface in FIG. 32.

FIGS. 33A and 33B schematically show a design example of the positions of the reflection surfaces in FIG. 32. FIG. 33A schematically shows the positions and the directions of the reflection surfaces in a case where the fixed point Pc is set in the z-axis plus direction (on the observer side) than the light guiding plate 7. The directions of the light fluxes are determined per angle resolution of 3° within the angle range of −30° or more and 30° or less, where θ=30°.

In FIG. 33A, a light converging section 50a and a light converging section 50b on the main surface 72 are shown. The reflected lights by the reflection surfaces included in the light converging section 50a are aggregated on the fixed points apart from the light guiding plate 7 by a first distance in the z-axis plus direction. The reflected lights by the reflection surfaces included in the light converging section 50b are aggregated on the fixed point apart from the light guiding plate 7 by a second distance in the z-axis direction. Here, the first distance is a value larger than the second distance.

FIG. 33B schematically shows the positions and the directions of the reflection surfaces in a case where the fixed point Pc is set in the z-axis minus direction (on the opposite side to the observer). The directions of the converged lights are determined per angle resolution of 3° within the angle range of −30° or more and 30° or less, where θ=30°.

In FIG. 33B, a light converging section 50d and a light converging section 50c on the main surface 72 are shown. In a case where the directions of the reflected lights by the reflection surfaces included in the light converging section 50c are extended on the z-axis minus side, the lights are aggregated on the fixed point apart from the light guiding plate 7 by a first distance in the z-axis minus direction. In a case where the reflected lights by the reflection surfaces included in the light converging section 50d are extended on the z-axis minus side, the lights are aggregated on the fixed point apart from the light guiding plate 7 by a second distance in the z-axis direction. Here, the first distance is a value larger than the second distance.

In a utilization environment of the display apparatus 10, the design method described with reference to FIG. 32 and FIGS. 33A and 33B is optimal for a case where a degree of freedom in movement of an observer is predicted to be high in an angle direction surrounding a specific direction. Accordingly, a distortion of the stereoscopic image can be suppressed.

Figure 34A:
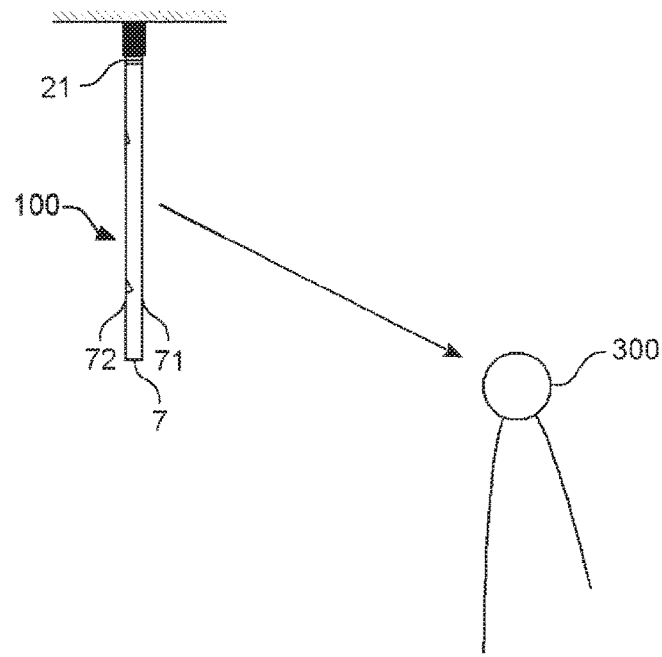
FIG. 34A schematically shows an arrangement example of the display apparatus 100.
Figure 34B:
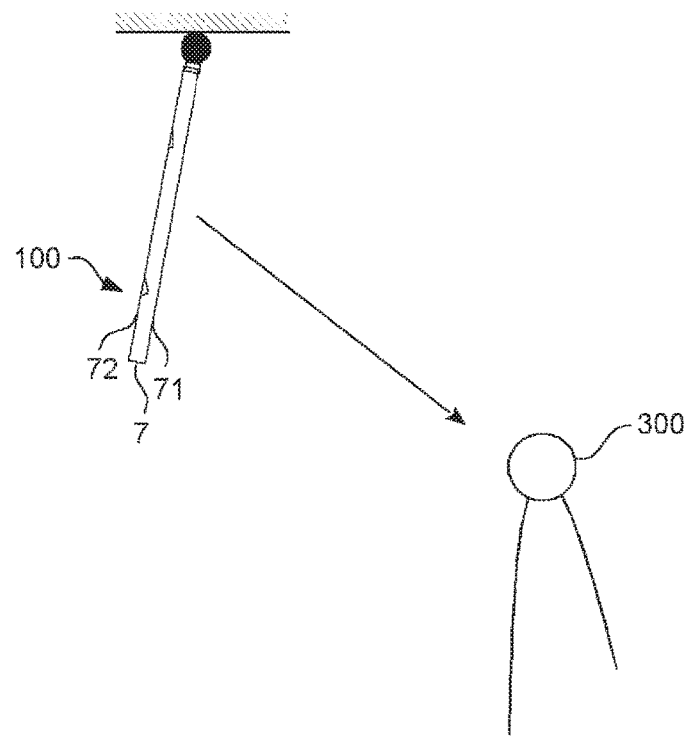
FIG. 34B schematically shows an arrangement example of the display apparatus 100.

FIGS. 34A and 34B schematically show arrangement examples of the display apparatus 100. Unless otherwise stated in particular, the display apparatus 100 is a general term for the display apparatus 10, the display apparatus 1000, the display apparatus 1100, the display apparatus 1200, the display apparatus 1300, and display apparatuses described later as variations of the display apparatus 10. That is, the display apparatus 100 can be replaced by the display apparatus 10, the display apparatus 1000, the display apparatus 1100, the display apparatus 1200, the display apparatus 1300, and any display apparatus of the display apparatuses described later as the variations of the display apparatus 10.

FIG. 34A shows a state where the display apparatus 100 is arranged vertically upward from the head of an observer 300. The display apparatus 100 is arranged such that the light source 21 is positioned vertically upward. The angle range within which the lights from the reflection surface can be emitted changes depending on the angle α shown in FIG. 18. As the angle α shown in FIG. 18 becomes larger, it becomes possible to emit the lights toward the light source 21 side. However, manufacturing of a reflection surface having a large angle α is not easy. For that reason, as shown in FIG. 34A, it is preferable to design the direction of the emitted light to be the direction apart from the light source 21. It is preferable that each of the light converging sections 40 allows the emitted light to be emitted from the main surface 71 toward the space on the side of the direction of the lights guided by the light guiding plate 7 than the position of each of the light converging sections 40. FIG. 34B shows a state where the display apparatus 100 is arranged with an adjusted inclination angle. The inclination angle of the display apparatus 100 has been adjusted such that the direction in which the observer 300 views the display apparatus 100 is along the observation direction in designing.

Figure 35A:
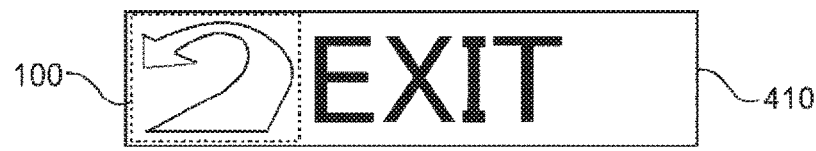
FIG. 35A schematically shows a utilization example of the display apparatus 100.
Figure 35B:
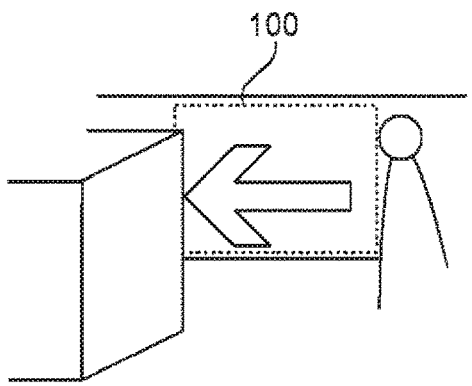
FIG. 35B schematically shows a utilization example of the display apparatus 100.
Figure 35C:
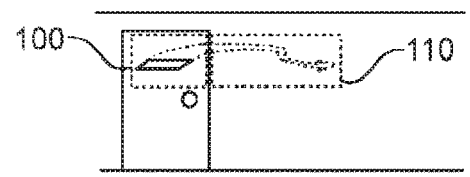
FIG. 35C schematically shows a utilization example of the display apparatus 100.

FIGS. 35A to 35C schematically show utilization examples of the display apparatus 100. FIG. 35A shows a state where the display apparatus 100 is applied to a signboard 410. Since the display apparatus 100 has translucency, even if the display apparatus 100 is additionally applied to the signboard 410, the observer will not feel a sense of incongruity.

FIG. 35B shows a state where the display apparatus 100 is applied to a wall. The display apparatus 100 can present a stereoscopic image recognized as if it is floating on a corridor, for example, apart from the wall.

FIG. 35C shows a state where the display apparatus 100 and the display apparatus 110 are applied to a door and a wall. Similar to the display apparatus 100, the display apparatus 110 is a general term for the display apparatus 10, the display apparatus 1000, the display apparatus 1100, the display apparatus 1200, the display apparatus 1300, and display apparatuses described later as variations of the display apparatus 10. The display apparatus 100 and the display apparatus 110 can understandably easily show a passage deeper than the door.

Figure 36A:
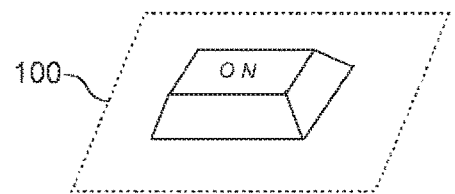
FIG. 36A schematically shows a utilization example of the display apparatus 100.

FIGS. 36A to 36D schematically show utilization examples of the display apparatus 100. FIG. 36A shows a state where the display apparatus 100 is applied to a virtual switch. The display apparatus 100 may have a detecting section which detects the presence of an object, and a control section which notifies that the virtual switch is pressed when the detecting section detected the presence of the object in a position of an ON surface of the virtual switch. For example, the control section may notify that the virtual switch is pressed by changing the color of the light emitted by the light source 21. Also, the control section may output, to outside, a signal showing that the virtual switch is pressed when the detecting section detected the presence of the object in the position of the ON surface of the virtual switch.

Figure 36B:
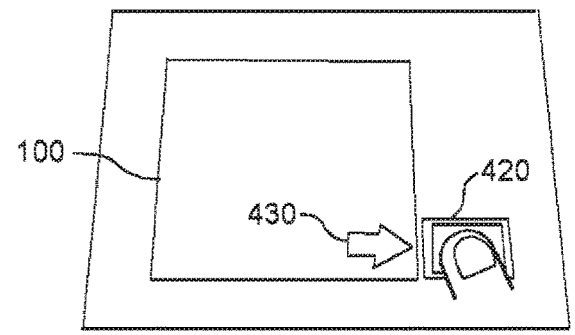
FIG. 36B schematically shows a utilization example of the display apparatus 100.

FIG. 36B shows a state where the display apparatus 100 is implemented along with a fingerprint authentication apparatus. The display apparatus 100 presents an image recognized as a stereoscopic image 430 of an arrow in the vicinity of the fingerprint detection apparatus 420. The stereoscopic image 430 may show a target position which is a position of a movement destination of a finger. The target position may be a position upward from the fingerprint detection apparatus 420. By setting the target position of the finger in a position upward from the fingerprint detection apparatus 420, the detection precision of the fingerprint detection apparatus 420 may be increased in some cases.

It should be noted that the display apparatus 100 may have a detecting section which detects the presence of an object, and a control section which notifies that the object is present in a predetermined position when the detecting section detected the presence of the object in a position shown by the stereoscopic image 430. For example, the control section may notify that the object is present in the predetermined position by changing the color of the light emitted by the light source 21. Accordingly, the detection precision of the fingerprint detection may be increased in some cases.

Figure 36C:
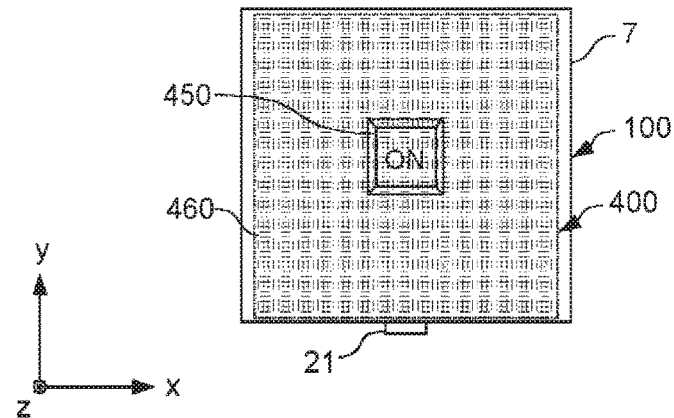
FIG. 36C schematically shows a utilization example of the display apparatus 100.
Figure 36D:
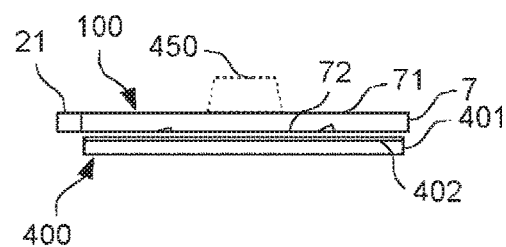
FIG. 36D schematically shows a utilization example of the display apparatus 100.

FIG. 36C and FIG. 36D schematically show utilization examples of the display apparatus 100. The display apparatus 100 is implemented along with a touch panel 400. FIG. 36C is a top view when viewing the display apparatus 100 from the position of the z-axis plus direction along the z axis. FIG. 36D is a cross-section view of the yz cross section of a display input system including the display apparatus 100 and the touch panel 400.

As shown in FIG. 36C and FIG. 36D, the display apparatus 100 displays a stereoscopic image 450 similar to the image of the virtual switch shown in FIG. 36A. The touch panel 400 includes a display section 401 such as a liquid crystal panel, and a touch sensor 402. The touch panel 400 is one example of the display input apparatus. The touch panel 400 is provided on the main surface 72 side of the display apparatus 100. The display surface of the touch panel 400 is opposite to the main surface 72 of the display apparatus 100. The display apparatus 100 forms the stereoscopic image 450 of the virtual switch overlapping a planar image 460 displayed by the display section 401 of the touch panel 400.

The touch sensor 402 is a touch sensor such as resistive film type and capacitance type. The touch panel 400 outputs, to outside, a position signal showing the touch position detected by the touch sensor 402. The position signal may be a signal showing the coordinate of the position within the touched xy plane. The touch panel 400 may output the position signal to the display apparatus 100. The display apparatus 100 may determine that the virtual switch is pressed when the touch position shown by the position signal acquired from the touch panel 400 is the position corresponding to the position within the xy plane in which the stereoscopic image 450 has been formed.

Since the display apparatus 100 is transparent, the observer can visually recognize the image 460 displayed on the touch panel 400 from the main surface 71 side of the display apparatus 100. It should be noted that in addition to the display input function provided by the display apparatus 100 and the touch panel 400, a display input function within the plane by the touch panel 400 may be provided.

Figure 37A:
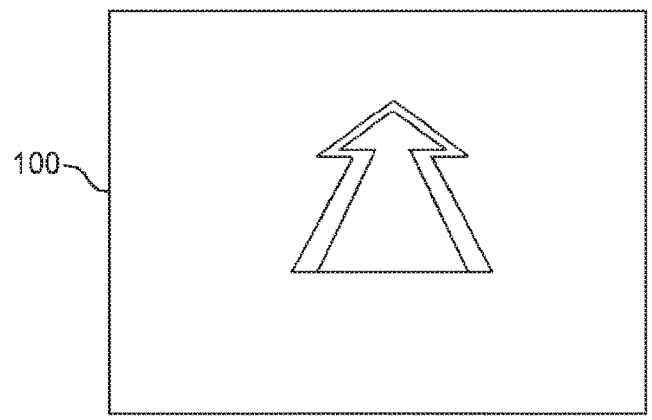
FIG. 37A schematically shows a display example of the display apparatus 100.
Figure 37B:
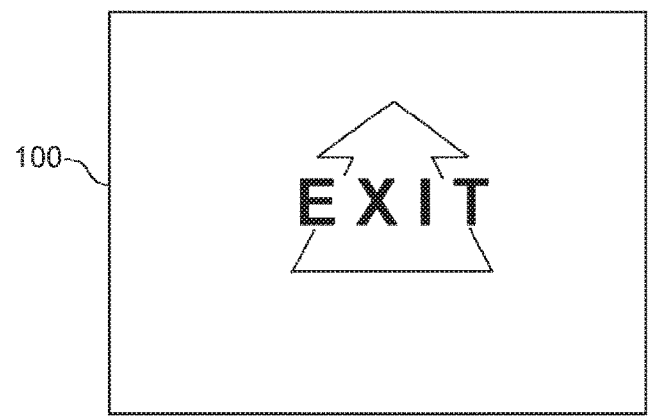
FIG. 37B schematically shows a display example of the display apparatus 100.

FIGS. 37A and 37B schematically show display examples of the display apparatus 100. FIG. 37A is a display example of the image recognized as a stereoscopic image having many vertical lines. By setting many vertical lines, the observer can easily recognize the image as the stereoscopic image.

FIG. 37B is a display example including a two-dimensional image. "EXIT" is a two-dimensional image and is an image drawn on the display surface of the display apparatus 100 and visually recognizable from any observation direction.

Figure 38:
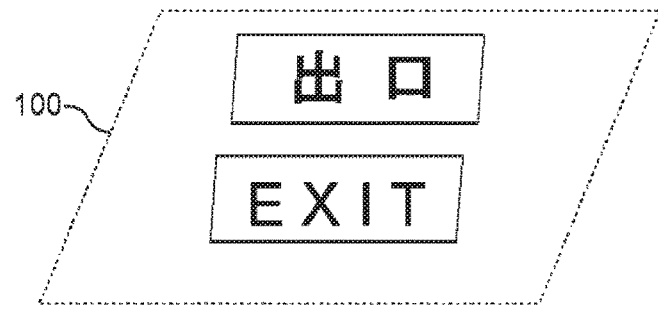
FIG. 38 schematically shows another display example of the display apparatus 100.

FIG. 38 schematically shows another display example of the display apparatus 100. The display apparatus 100 forms an image recognized as the stereoscopic image drawn on two surfaces protruding from the display surface of the display apparatus 100.

Figure 39A:
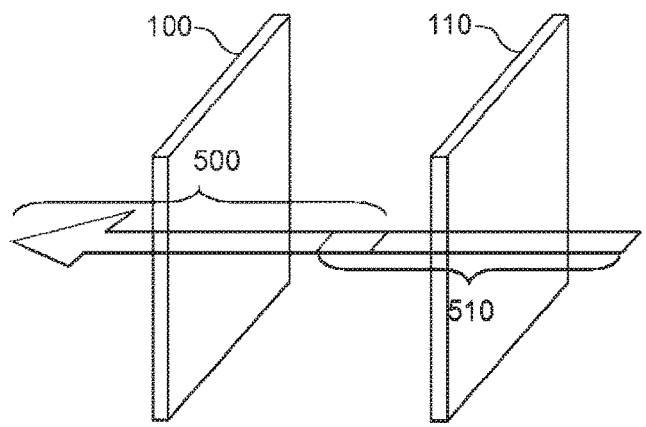
FIG. 39A schematically shows a display example of one continuous stereoscopic image by a plurality of display apparatuses.
Figure 39B:
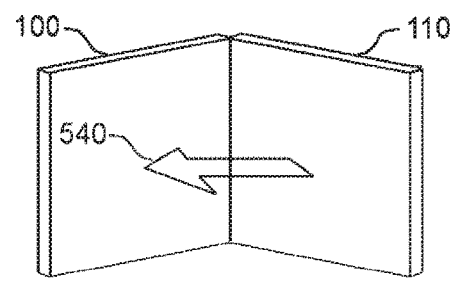
FIG. 39B schematically shows a display example of one continuous stereoscopic image by a plurality of display apparatuses.

FIGS. 39A and 39B schematically show display examples of one continuous stereoscopic image by a plurality of display apparatuses. FIG. 39A schematically shows a stereoscopic image as if penetrating the display apparatus 100 and the display apparatus 110 by the display apparatus 100 and the display apparatus 110. The display apparatus 100 and the display apparatus 110 are arranged such that the display surface is parallel thereto. The display apparatus 100 and the display apparatus 110 are arranged such that at least a part of the display surface overlaps. A portion 500 of the stereoscopic image is a portion which is recognized by an image formed by the display apparatus 100. A portion 510 of the stereoscopic image is a portion which is recognized by an image formed by the display apparatus 110.

FIG. 39A shows a stereoscopic image from a view point different from a view point of an observer, for a purpose to understandably easily represent the stereoscopic image recognized by the observer. From the view point of the observer, the image as FIG. 39A cannot be seen.

FIG. 39B schematically shows a display example in a case of an arrangement where a normal line of the display surface of the display apparatus 100 intersects a normal line of the display surface of the display apparatus 110. Similar to FIG. 39A, a part of the image recognized as the stereoscopic image 540 is formed by the display apparatus 100, and another part is formed at least by the display apparatus 110.

Figure 40:
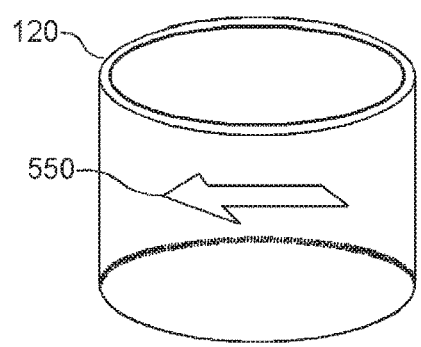
FIG. 40 schematically shows a display example according to a display apparatus 120 having a cylindrical display surface.

FIG. 40 schematically shows a display example by the display apparatus 120 having a cylindrical display surface. The display apparatus 120 has a similar configuration to the display apparatus 100 and the like, except that a cylindrical light guide body is applied instead of the tabular light guiding plate 7. The display apparatus 120 forms an image recognized as if a stereoscopic image 550 is present within a space surrounded by the cylindrical display surface.

Figure 41:
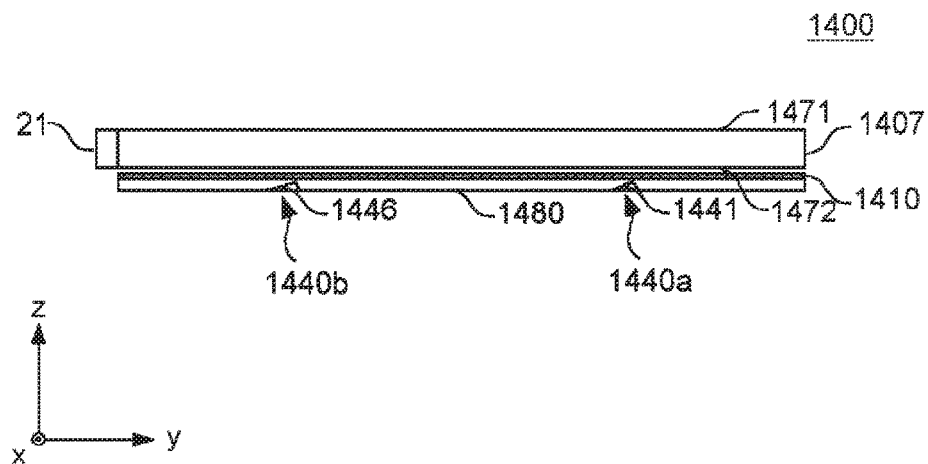
FIG. 41 schematically shows a display apparatus 1400 as a variation of the display apparatus 10.

FIG. 41 schematically shows a display apparatus 1400 as a variation of the display apparatus 10. The display apparatus 1400 includes an adhesive layer 1410 and a translucent sheet 1480, as well as a light guiding plate 1407 instead of the light guiding plate 7. The light guiding plate 1407 includes a main surface 1471 corresponding to the main surface 71 of the light guiding plate 7, and a main surface 1472 corresponding to the main surface 72 of the light guiding plate 7. The light guiding plate 1407 has a similar configuration to the light guiding plate 7, except that there is no reflection surface.

The translucent sheet 1480 is provided on the main surface 1472 of the light guiding plate 1407. The translucent sheet 1480 is adhered to the main surface 1472 by an adhesive layer 1410 having a refractive index lower than the refractive index of the light guiding plate 1407. In the translucent sheet 1480, a plurality of light converging sections including a light converging section 1440*a* and a light converging section 1440*b* are formed. The light converging section 1440*a* includes a plurality of reflection surfaces including a reflection surface 1441. The light converging section 1440*b* includes a plurality of reflection surfaces including a reflection surface 1446. The light converging section 1440*a* corresponds to the light converging section 40*a*, and the light converging section 1440*b* corresponds to the light converging section 40*b*. Also, the reflection surface 1441 corresponds to the reflection surface 41, and the reflection surface 1446 corresponds to the reflection surface 46. According to this display apparatus 1400, the translucent sheet 1480 is exchangeable. For example, by exchanging the translucent sheet 1480, a different image can be formed by the display apparatus 1400.

Figure 42:
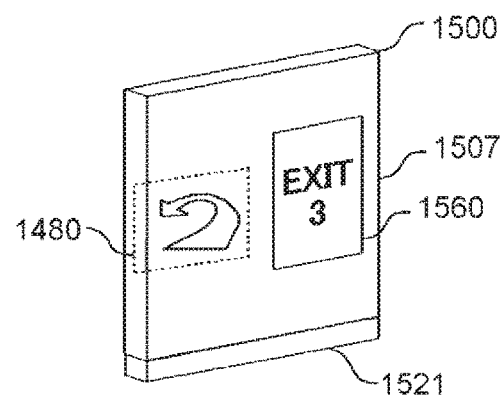
FIG. 42 schematically shows a display apparatus 1500 utilizing a translucent sheet 1480.

FIG. 42 schematically shows a display apparatus 1500 utilizing the translucent sheet 1480. The display apparatus 1500 includes a light guiding plate 1507, a light source 1521, and the translucent sheet 1480. The light guiding plate 1507 corresponds to the light guiding plate 1407. The light source 1521 corresponds to the light source 21.

The display surface of the light guiding plate 1507 includes a two-dimensional display area 1560. The light guiding plate 1507 allows a planar light to be emitted onto the two-dimensional display area 1560. The light guiding plate 1507 does not have any reflection surface or scattering surface as the light guiding plate 1407 in areas other than the two-dimensional display area 1560. Accordingly, by providing the translucent sheet 1480 in the areas other than the two-dimensional display area 1560 of the light guiding plate 1507, a stereoscopic image can be provided by the image formed by the translucent sheet 1480.

Figure 43:
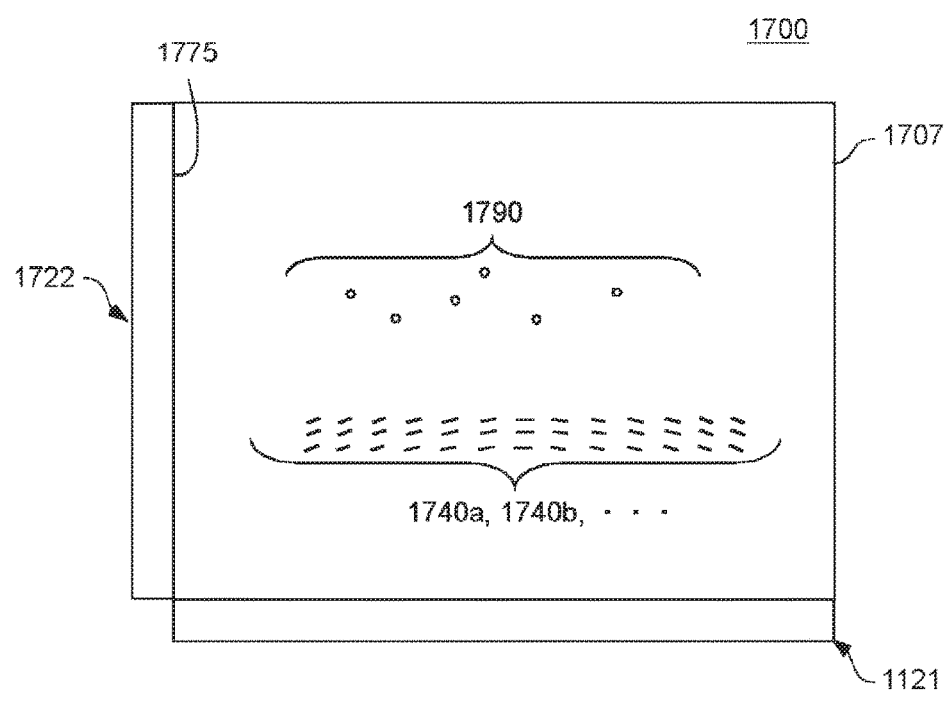
FIG. 43 schematically shows a display apparatus 1700 as a variation of the display apparatus 10.
Figure 43:
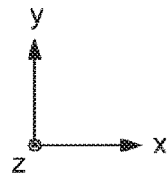

FIG. 43 schematically shows a display apparatus 1700 as a variation of the display apparatus 10. The display apparatus 1700 includes a light guiding plate 1707, a light source 1121, and a light source 1722. The light guiding plate 1707 corresponds to the light guiding plate 7. Similar to the light source 21, the light source 1121 is provided on an incident light end surface parallel to the xz plane of the light guiding plate 1707. The light source 1722 is provided on a side surface 1775 orthogonal to the xz plane. The side surface 1775 functions as an incident light end surface toward the light guiding plate 1707.

In the light guiding plate 1707, a plurality of light converging sections 1740 are formed including a light converging section 1740*a* and a light converging section 1740*b*, which are similar to the light converging section 40*a* and the light converging section 1740*b*. Also, in the light guiding plate 1707, a scattered pattern group 1790 is formed including a plurality of light scattering sections which scatter the lights from the light source 21. The light scattering sections have a conical pattern standing upright in the z-axis plus direction, for example. A scattered pattern group 1790 forms a two-dimensional image determined according to the positions of the light scattering sections.

In a case where the lights have been emitted by the light source 1121, the lights from the light source 1121 are reflected by the reflection surfaces respectively included in the plurality of light converging sections 1740 including the light converging section 1740*a* and the light converging section 1740*b*. Accordingly, the stereoscopic image is formed by the lights from the light guiding plate 1707. Also, the lights from the light source 1121 are scattered by the light scattering sections included in the scattered pattern group 1790 and a two-dimensional image is formed on the light guiding plate 1707.

The light source 1722 is provided in a position different from the light source 21, and emits the lights which are incident onto the plurality of light scattering sections included in the scattered pattern group 1790 and substantially not incident onto the reflection surfaces respectively included in the light converging sections 1740. Therefore, in a case where the light source 1121 did not emit the lights and the light source 1722 has emitted the lights, the lights from the light source 1722 are substantially not incident onto the respective reflection surfaces included in the light converging sections 1740 and are scattered by the light scattering sections included in the scattered pattern group 1790. Accordingly, in the light guiding plate 1707, only a two-dimensional image determined by the positions of the light scattering sections included in the scattered pattern group 1790 is substantially formed.

The display apparatus 1700 further includes a control section which controls a light emission state of the light source 1121 and a light emission state of the light source 1722. Specifically, the control section switches between the state where at least the light source 1121 is emitting the lights and the state where the light source 1121 does not emit the lights and the light source 1722 is emitting the lights. It should be noted that the light emission state is a concept including a lighting state and a flashing state.

Figure 44:
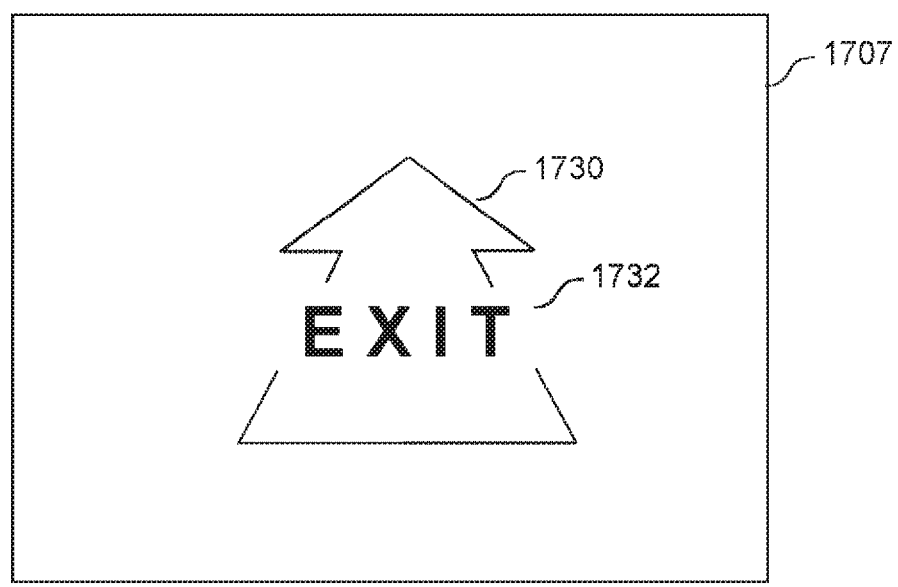
FIG. 44 schematically shows one example of an image recognized from an image formed on a light guiding plate 1707.
Figure 44:
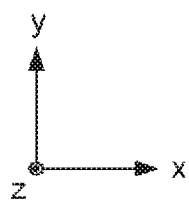

FIG. 44 schematically shows one example of the image recognized from the image formed on the light guiding plate 1707. A stereoscopic image 1730 is a stereoscopic image recognized from the image formed by the reflection surfaces respectively included in the light converging sections 1740. The two-dimensional image 1732 is a two-dimensional image formed by the light scattering sections included in the scattered pattern group 1790.

Figure 45:
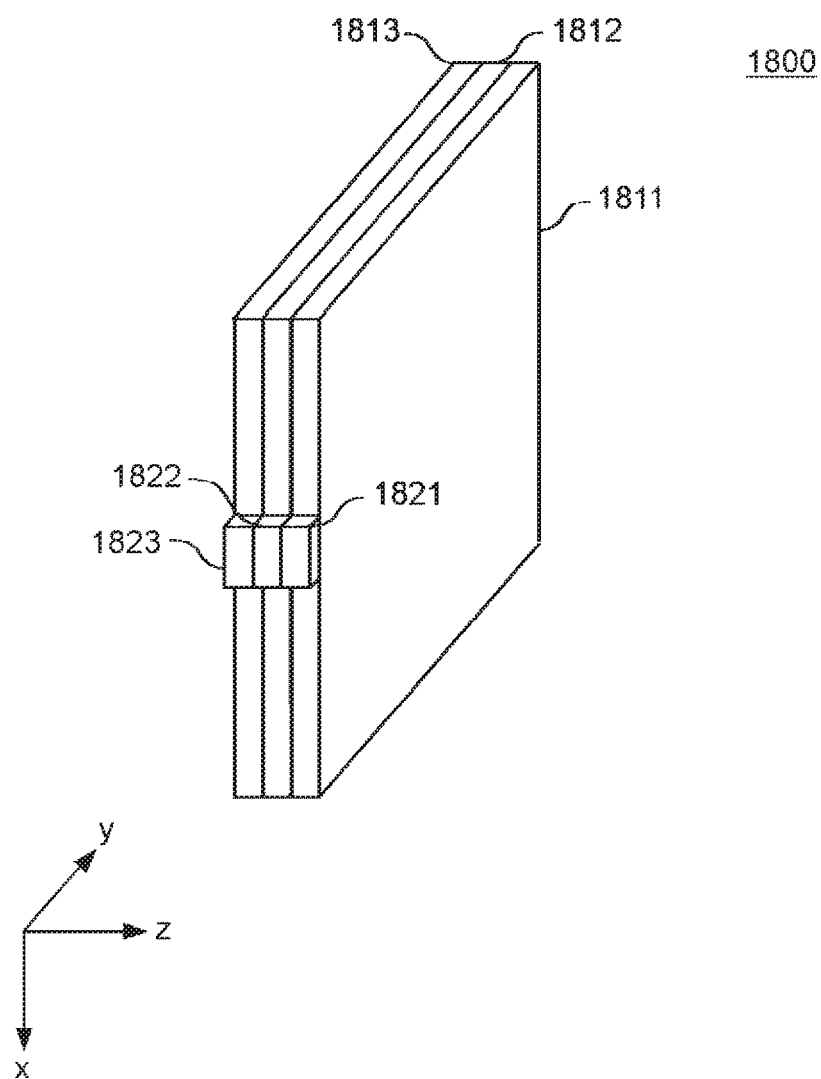
FIG. 45 schematically shows a display apparatus 1800 as a variation of the display apparatus 10.
Figure 46:
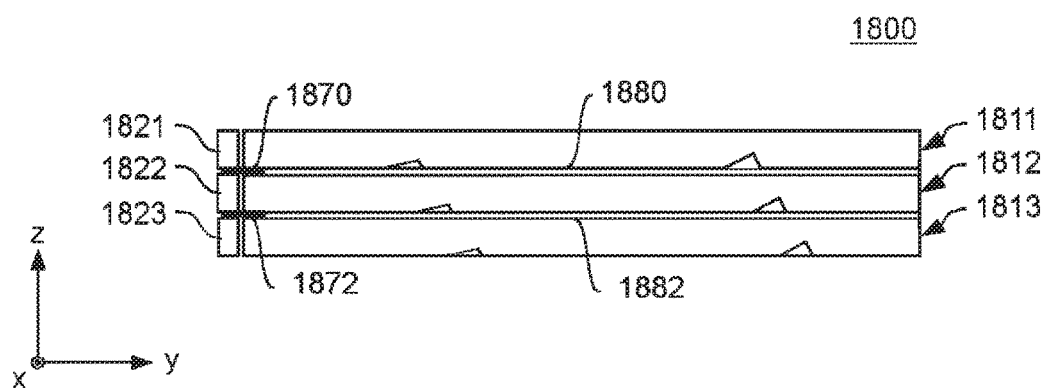
FIG. 46 schematically shows a cross-section view of the xz plane of a display apparatus 1800.

FIG. 45 schematically shows a display apparatus 1800 as a variation of the display apparatus 10. FIG. 46 schematically shows a cross-section view of the xz plane of the display apparatus 1800.

The display apparatus 1800 includes a first unit 1811, a second unit 1812 and a third unit 1813. Each of the first unit 1811, the second unit 1812, and the third unit 1813 has an approximately similar configuration to the display apparatus 10.

The third unit 1813, the second unit 1812, and the first unit 1811 are provided in this order along the z-axis plus direction from the z-axis minus direction. The first unit 1811 is adhered to the second unit 1812 by an adhesive layer 1880. The refractive index of the adhesive layer 1880 is lower than the refractive index of any of the light guiding plates respectively included in the first unit 1811 and the second unit 1812. The second unit 1812 is adhered to the third unit 1813 by an adhesive layer 1882. The refractive index of the adhesive layer 1882 is lower than the refractive index of any of the light guiding plates respectively included in the second unit 1812 and the third unit 1813.

A light shielding section 1870 is provided between the light source 1821 included in the first unit 1811 and the light source 1822 included in the second unit 1812. Accordingly, it can suppress the lights from the light source 1821 from being incident onto the second unit 1812. Also, it can suppress the lights of the light source 1822 from being incident onto the first unit 1811. Also, a light shielding section 1872 is provided between the light source 1823 included in the third unit 1813 and the light source 1822 included in the second unit 1812. Accordingly, it can suppress the lights from the light source 1823 from being incident onto the second unit 1812. Also, it can suppress the lights from the light source 1822 from being incident onto the third unit 1813. Accordingly, it can suppress mixing of the incident lights between the units.

The display apparatus 1800 further includes a control section which switches combinations of a light emission state of the light source 1821, a light emission state of the light source 1822, and a light emission state of the light source 1823. Functions of the control section will be described.

In one embodiment, the first unit 1811, the second unit 1812, and the third unit 1813 respectively form approximately the same images. Specifically, in a case of viewing the display apparatus 1800 from a position V1, the shape of the image formed in the first unit 1811 is approximately the same as the shape of the image formed in the second unit 1812 and the shape of the image formed in the third unit 1813. Also, the position of the image formed in the first unit 1811 is approximately the same as the position of the image formed in the second unit 1812 and the position of the image formed in the third unit 1813. Also, in a case of viewing the display apparatus 1800 from a position V2, similar to the case of viewing the display apparatus 1800 from the position V1, the shapes and the positions of the images formed in the respective units are also the same as each other. A case of viewing the display apparatus 1800 from a position V3 is also similar.

That is, since the light converging section included in the second unit 1812 forms the same stereoscopic image as the stereoscopic image formed by the light converging section included in the first unit 1811, the light converging section included in the second unit 1812 has the reflection surfaces corresponding to the reflection surfaces included in the first unit 1811 one-to-one. Then, each reflection surface included in the second unit 1812 reflects the light from the light source 1822, in a direction approximately the same as the proceeding direction of the reflected lights by the corresponding reflection surfaces of the first unit 1811.

The wavelength band of the light emitted by the light source 1821, the wavelength band of the light emitted by the light source 1822, and the wavelength band of the light emitted by the light source 1823 are different from each other. For example, the light source 1821 emits a light in the blue wavelength band, the light source 1822 emits a light in the green wavelength band, and the light source 1823 emits a light in the red wavelength band. Accordingly, the display apparatus 1800 can provide a stereoscopic image in any color.

The control section included in the display apparatus 1800 switches combinations of the light emission intensity of the light source 1821, the light emission intensity of the light source 1822, and the light emission intensity of the light source 1823. Accordingly, the colors of the recognized stereoscopic images can be switched. For example, when a stereoscopic image recognized in red color is to be formed, the display apparatus 1800 allows the light source 1823 only to emit the lights. When a gray stereoscopic image is to be formed, the display apparatus 1800 sets the light emission intensity of the light source 1821, the light emission intensity of the light source 1822, and the light emission intensity of the light source 1823 as approximately the same.

In other embodiments, the first unit 1811, the second unit 1812, and the third unit 1813 may form images substantially different from each other respectively. Specifically, in a case of viewing the display apparatus 1800 from a specific position within the range from the position V2 to the position V3, the shape of the image formed in the first unit 1811 is substantially different not only from the shape of the image formed in the second unit 1812 but also from the shape of the image formed in the third unit 1813. Also, the position of the image formed in the first unit 1811 may be substantially different not only from the position of the image formed in the second unit 1812 but also from the position of the image formed in the third unit 1813.

The first unit 1811 provides a first stereoscopic image to an observer within the range from the position V2 to the position V3. Also, the second unit 1812 provides to the observer a second stereoscopic image different from the first stereoscopic image. Also, the third unit 1813 provides to the observer a third stereoscopic image different from the first stereoscopic image and the second stereoscopic image. The control section included in the display apparatus 1800 switches combinations of a forming state of images by the first unit 1811, a forming state of images by the second unit 1812, and a forming state of images by the third unit 1813. For example, when the first stereoscopic image is to be provided to the observer, the control section included in the display apparatus 1800 allows the light source 1821 to emit the lights in a state where the light source 1822 and the light source 1823 do not emit the lights. Also, when the second stereoscopic image is to be provided, the control section included in the display apparatus 1800 allows the light source 1822 to emit the lights in a state where the light source 1821 and the light source 1823 do not emit the lights. Also, when the third stereoscopic image is to be provided, the control section included in the display apparatus 1800 allows the light source 1823 to emit the lights in a state where the light source 1821 and the light source 1822 do not emit the lights. Accordingly, the stereoscopic images recognized by the observer can be switched.

Figure 47:
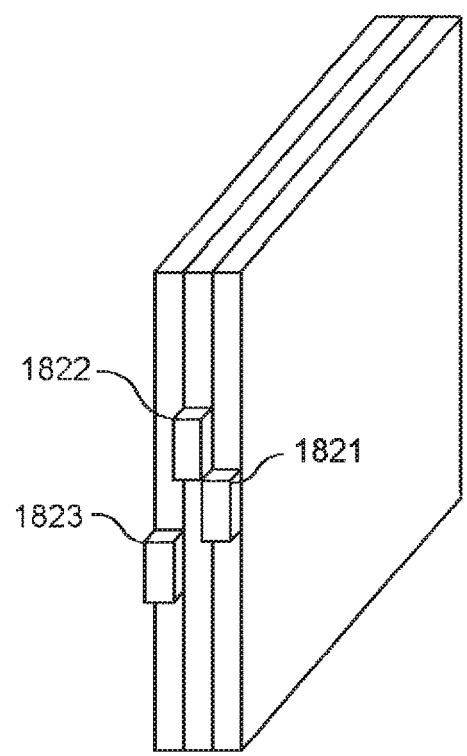
FIG. 47 schematically shows a display apparatus 1900 as a variation of the display apparatus 10.

FIG. 47 schematically shows a display apparatus 1900 as a variation of the display apparatus 10. The display apparatus 1900 has a similar configuration to the display apparatus 1800, except that the positions of the light source 1821, the light source 1822, and the light source 1823 are different from the display apparatus 1800. The provided positions of the light source 1821, the light source 1822, and the light source 1823 in the x direction are different from each other. For example, the light source 1822 is positioned in the x-axis minus direction than the light source 1821. Also, the light source 1823 is positioned in the x-axis plus direction than the light source 1821. Accordingly, it can suppress mixing of the incident lights between the units.

Figure 48:
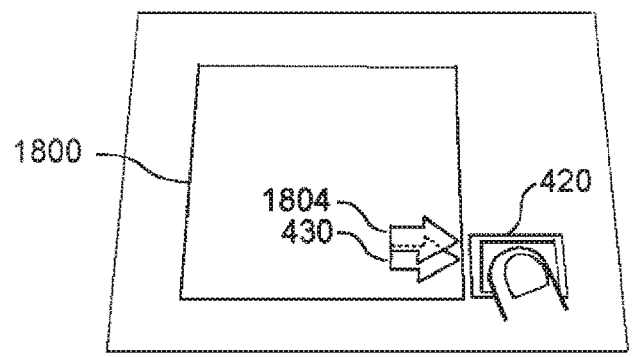
FIG. 48 schematically shows a utilization example of the display apparatus 1800.

FIG. 48 schematically shows a utilization example of the display apparatus 1800. FIG. 48 shows a state where the display apparatus 1800 is implemented along with the fingerprint authentication apparatus. Here, in the display apparatus 1800, the first unit 1811, the second unit 1812, and the third unit 1813 can form stereoscopic images in the positions in the z-axis direction respectively different from each other.

The display apparatus 1800 presents an image recognized as the stereoscopic image 430 of an arrow in the vicinity of the fingerprint detection apparatus 420. For example, the stereoscopic image 430 is displayed by the first unit 1811.

The display apparatus 1800 further includes a detecting section which detects a position of an object. The display apparatus 1800 displays a stereoscopic image 1804 near the position of the object detected by the detecting section. For example, when the object is detected near a position where the stereoscopic image 1804 is shown by the second unit 1812, the light source 1821 emits the lights to display the stereoscopic image 1804. Then, when the object is detected near a position where the stereoscopic image is shown by the third unit 1813, the display apparatus 1800 causes the light source 1822 to stop emitting the lights and the light source 1823 to emit the lights so as to display the stereoscopic image by the third unit 1813. Accordingly, following the position of the z-axis direction of the finger, the user is notified of the current position of the finger.

Figure 49A:
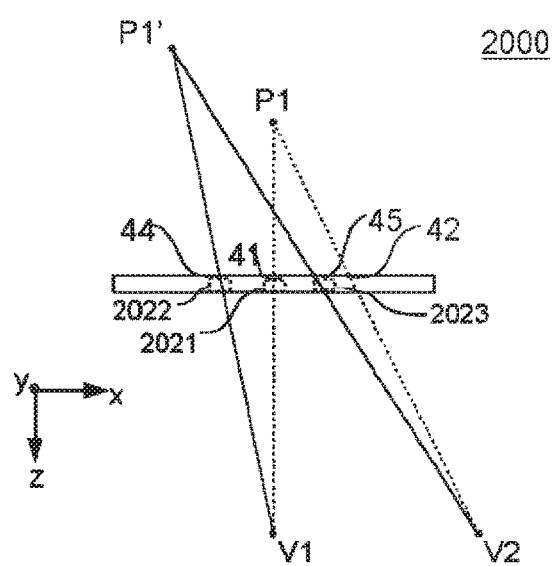
FIG. 49A schematically shows a display apparatus 2000 as a variation of the display apparatus 10.
Figure 49B:
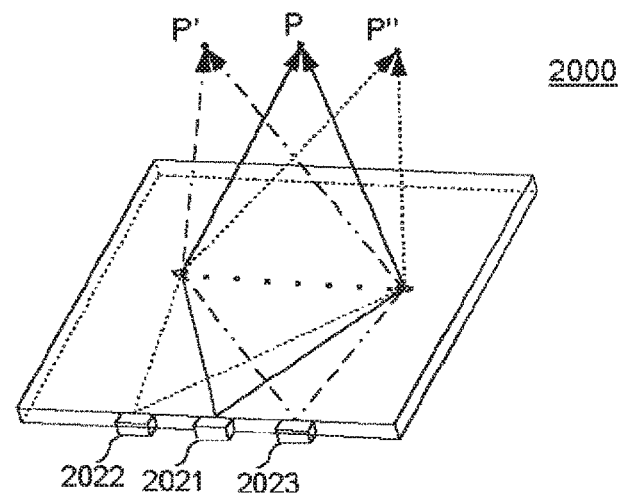
FIG. 49B schematically shows the display apparatus 2000 as a variation of the display apparatus 10.
Figure 49C:
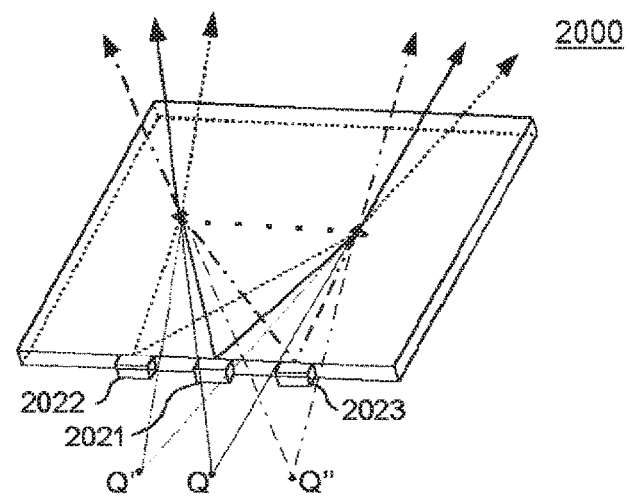
FIG. 49C schematically shows the display apparatus 2000 as a variation of the display apparatus 10.

FIGS. 49A to 49C schematically show a display apparatus 2000 as a variation of the display apparatus 10. FIG. 49A is a cross-section view within the xz plane of the display apparatus 2000. FIG. 49B and FIG. 49C are perspective views of the display apparatus 2000. The display apparatus 2000 is different from the display apparatus 10 in the following matter: the display apparatus 2000 includes three light sources, i. e. a light source 2021, a light source 2022, and a light source 2023, instead of the light source 21, and further includes a control section which switches combinations of light emission states of these light sources. In FIGS. 49A to 49C, a reflection surface 41, a reflection surface 42, a reflection surface 44, and a reflection surface 45 included in the light converging section 40a are shown. It should be noted that the light source 2021 corresponds to the light source 21.

Here, with reference to FIG. 49A, a case where the light source 2022 has emitted the lights will be described. The reflection surface 44 reflects the lights from the light source 2022 in a direction along a straight line connecting the point on the reflection surface 44 with the point P1'. Also, the reflection surface 45 reflects the lights from the light source 2022 in a direction along a straight line connecting the point on the reflection surface 45 with the point P1'. As shown in FIGS. 49A to 49C, the positions of P1 and P1' are different. Therefore, the formed stereoscopic image varies from a case where the light source 2021 has emitted the lights to a case where the light source 2022 has emitted the lights. For that reason, by causing the light sources in different positions to emit the lights, the angle of the stereoscopic image can be changed and the stereoscopic image can be rotated in some cases, as described later.

FIG. 49B and FIG. 49C schematically show situations where the fixed points on which the light fluxes are converged change by switching the light sources which are to emit the lights. FIG. 49B schematically shows a situation where the fixed points converged on the observer side change by switching the light sources. When the light source 2021 has emitted the light, a light converged on the fixed point P is generated. When the light source 2022 has emitted the light, a light converged on the fixed point P' is generated. When the light source 2023 has emitted the light, a light converged on the fixed point P" is generated. In this way, the fixed points on the observer side change by switching the light sources which are to emit the lights. As shown in FIG. 49C, the fixed points on the opposite side to the observer side are similar as well. When the light source 2021 has emitted the light, the light flux representing the light flux from the fixed point Q is generated. When the light source 2022 has emitted the light, the light flux representing the light flux from the fixed point Q' is generated. When the light source 2023 has emitted the light, the light flux representing the light flux from the fixed point Q" is generated.

Figure 50A:
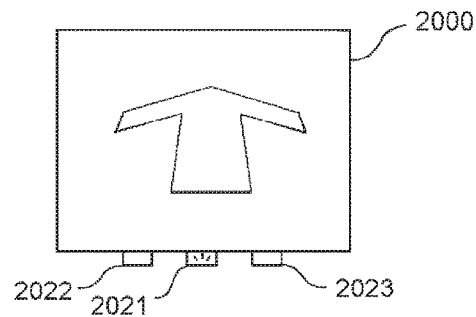
FIG. 50A schematically shows stereoscopic image switching by light source switching.
Figure 50B:
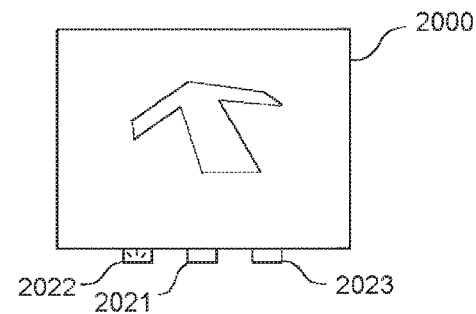
FIG. 50B schematically shows stereoscopic image switching by light source switching.
Figure 50C:
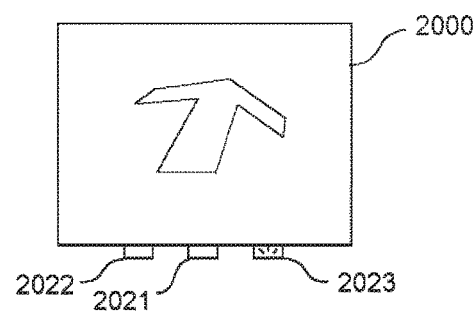
FIG. 50C schematically shows stereoscopic image switching by light source switching.
Figure 50C:
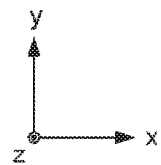

FIGS. 50A to 50C schematically show switching of the stereoscopic images by switching the light sources. FIG. 50A shows a situation of the stereoscopic image when the light source 2021 has emitted the lights in a state where the light source 2022 and the light source 2023 do not emit the lights. FIG. 50B shows a situation of the stereoscopic image when the light source 2022 has emitted the light in a state where the light source 2021 and the light source 2023 do not emit the lights. FIG. 50C shows a situation of the stereoscopic image when the light source 2023 has emitted the light in a state where the light source 2021 and the light source 2022 do not emit the lights. The control section included in the display apparatus 2000 switches the stereoscopic images by switching the light sources which are to emit the lights in a predetermined order of the light emission state of FIG. 50A, the light emission state of FIG. 50B, the light emission state of FIG. 50C, the light emission state of FIG. 50A, . . . , and so on, for example.

FIGS. 51A to 51D schematically show other examples of switching of the stereoscopic images. The display apparatus 2100 is a variation of the display apparatus 10. The display apparatus 2100 has approximately the same configuration as the display apparatus 2000, except that the display apparatus 2100 includes four light sources, i. e. a light source 2121, a light source 2122, a light source 2123, and a light source 2124, and that the display apparatus 2100 includes reflection surfaces which form an image different from the image formed by the reflection surfaces included in the display apparatus 2000.

Figure 51A:
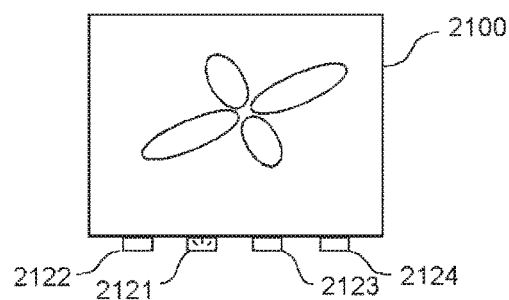
FIG. 51A schematically shows another switching example of stereoscopic images.
Figure 51B:
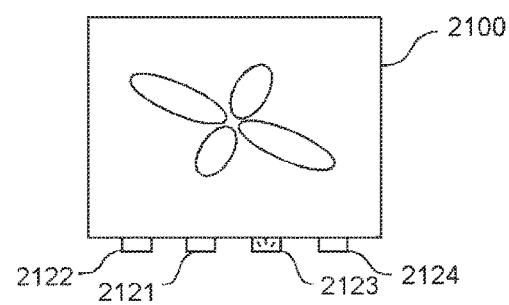
FIG. 51B schematically shows another switching example of stereoscopic images.
Figure 51C:
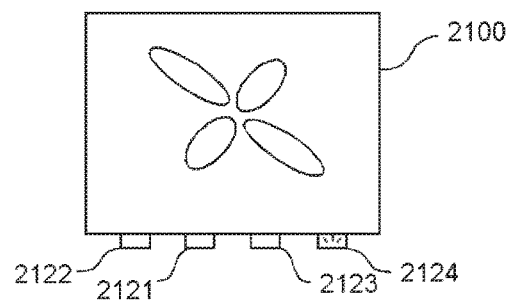
FIG. 51C schematically shows another switching example of stereoscopic images.
Figure 51D:
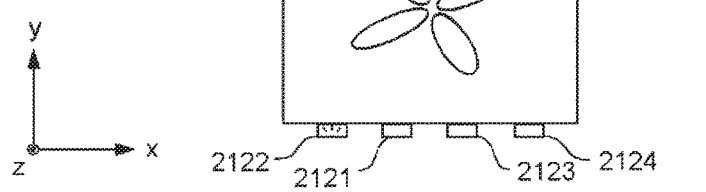
FIG. 51D schematically shows another switching example of stereoscopic images.

FIG. 51A shows a situation of the stereoscopic image when the light source 2121 has emitted the lights in a state where the light source 2122, the light source 2123, and the light source 2124 do not emit the lights. FIG. 51B shows a situation of the stereoscopic image when the light source 2123 has emitted the lights in a state where the light source 2121, the light source 2122, and the light source 2124 do not emit the lights. FIG. 51C shows a situation of the stereoscopic image when the light source 2124 has emitted the lights in a state where the light source 2121, the light source 2122, and the light source 2123 do not emit the lights. FIG. 51D shows a situation of the stereoscopic image when the light source 2122 has emitted the lights in a state where the light source 2121, the light source 2123, and the light source 2124 do not emit the lights.

The control section included in the display apparatus 2100 switches the stereoscopic images by switching the light sources to emit the lights in a predetermined order of the light emission state of FIG. 51A, the light emission state of FIG. 51B, the light emission state of FIG. 51C, the light emission state of FIG. 51D, the light emission state of FIG. 51A, . . . , and so on, for example. Accordingly, by switching the light sources, a stereoscopic image seen as if it is rotated is provided.

Figure 52A:
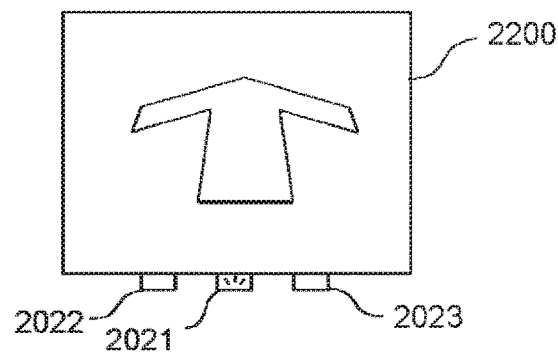
FIG. 52A schematically shows another switching example of stereoscopic images.
Figure 52B:
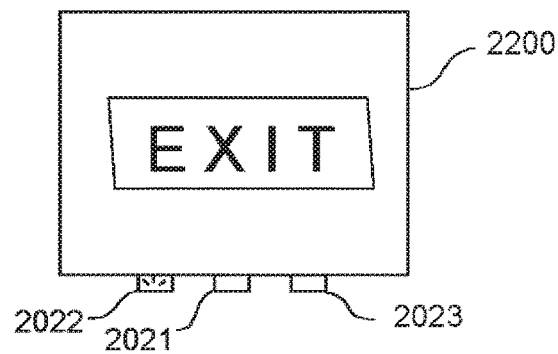
FIG. 52B schematically shows another switching example of stereoscopic images.

FIGS. 52A to 52B schematically show other examples of switching stereoscopic images. The display apparatus 2200 is a variation of the display apparatus 10. The display apparatus 2200 has approximately the same configuration as the display apparatus 2000, except that the display apparatus 2200 includes reflection surfaces which form an image different from the image formed by the reflection surfaces included in the display apparatus 2000.

Specifically, the display apparatus 2200 includes a light converging section which forms one positional image by the light from the light source 2022 and a light converging section which forms a visually recognizable image from the other position by the light from the light source 2022. Here, the image formed by the light of the light source 2022 is different from the image formed by the light from the light source 2021. That is, the display apparatus 2200 includes a plurality of light converging section groups corresponding to the light source 2021 and a plurality of light converging section groups corresponding to the light source 2022, and images formed by the respective light converging section groups are different. Therefore, the display apparatus 2200 can provide stereoscopic images which are totally different between a case where the light source 2021 has emitted the lights and a case where the light source 2022 has emitted the lights.

FIG. 52A shows a situation of the stereoscopic image when the light source 2021 has emitted the lights in a state where the light source 2022 and the light source 2023 do not emit the lights. FIG. 52B shows a situation of the stereoscopic image when the light source 2022 has emitted the lights in a state where the light source 2021 and the light source 2023 do not emit the lights. The control section included in the display apparatus 2200 provides different stereoscopic images by switching between the state where the light source 2021 has emitted the lights and the state where the light source 2022 has emitted the lights.

Figure 53:
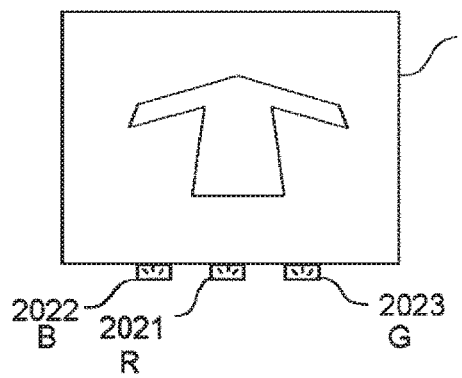
FIG. 53 schematically shows a display example of a color stereoscopic image by three light sources.

FIG. 53 schematically shows a display example of a color stereoscopic image by three light sources. The display apparatus 2300 is a variation of the display apparatus 10. The display apparatus 2300 has approximately the same configuration as the display apparatus 2000, except that the display apparatus 2300 includes reflection surfaces which form an image different from the image formed by the reflection surfaces included in the display apparatus 2000.

Specifically, the display apparatus 2300 includes a light converging section which forms a stereoscopic image by the light from the light source 2022, and a light converging section which forms a stereoscopic image by the light from the light source 2022. Here, the stereoscopic image formed by the light from the light source 2022 approximately matches the stereoscopic image formed by the light from the light source 2021. Also, the stereoscopic image formed by the light from the light source 2022 approximately matches the stereoscopic image formed by the light from the light source 2021. That is, the display apparatus 2300 includes a light converging section group corresponding to the light source 2021 and a light converging section group corresponding to the light source 2022, and the images formed by the respective light converging section groups are approximately the same. The light source 2023 is also similar.

In the display apparatus 2300, the wavelength band of the light emitted by the light source 2021, the wavelength band of the light emitted by the light source 2022, and the wavelength band of the light emitted by the light source 2023 are different from each other. For example, the light source 2021 emits the light in the red wavelength band, the light source 2022 emits the light in the blue wavelength band, and the light source 2023 emits the light in the green wavelength band. Since the stereoscopic image by the light from each light source 2021, the stereoscopic image by the light from the light source 2022, and the stereoscopic image by the light from the light source 2023 are approximately the same, the display apparatus 1800 can provide the stereoscopic images in any color by regulating the light emission intensity of each light source.

The control section included in the display apparatus 2300 switches combinations of the light emission intensity of the light source 2021, the light emission intensity of the light source 2022, and the light emission intensity of the light source 2023. Accordingly, the colors of the recognized stereoscopic image can be switched. For example, when the stereoscopic image recognized in red color is to be formed, the control section of the display apparatus 2300 allows the light source 2021 to emit the light only. When a gray stereoscopic image is to be formed, the control section of the display apparatus 2300 causes the light emission intensity of the light source 2021, the light emission intensity of the light source 2022, and the light emission intensity of the light source 2023 to be approximately the same.

Figure 54A:
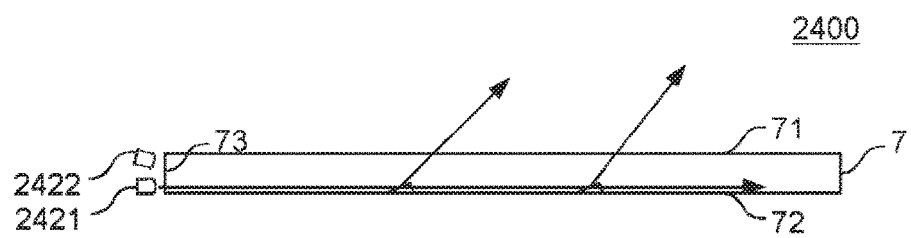
FIG. 54A schematically shows another configuration example for performing image switching.
Figure 54B:
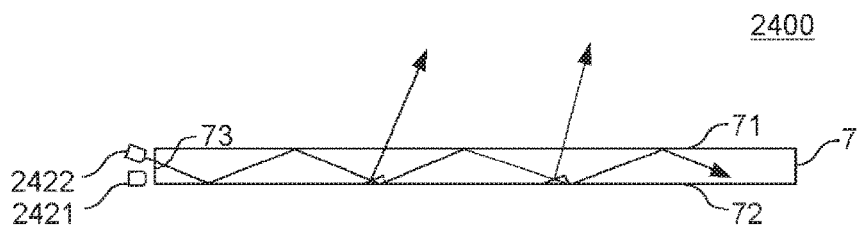
FIG. 54B schematically shows another configuration example for performing image switching.
Figure 54B:
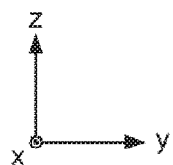

FIGS. 54A to 54B schematically show other configuration examples for performing the image switching. The display apparatus 2400 is a variation of the display apparatus 10. The display apparatus 2400 is different from the display apparatus 10 in the following matters: the display apparatus 2400 includes a first light source 2421 and a second light source 2422, instead of the light source 21, and the display apparatus 2400 includes a control section which controls these light sources. The first light source 2421 and the second light source 2422 together allow the light having a spread angle smaller than a predetermined value to be incident onto the end surface 73. The first light source 2421 and the second light source 2422 are LED light sources, for example.

The incident axis of the light of the first light source 2421 is substantially perpendicular to the end surface 73. The first light source 2421 allows the light substantially parallel to the y axis to be incident onto the light guiding plate 7. The incident axis of the light from the second light source 2422 is inclined to a normal line direction of the end surface 73. The incident axis of the light from the second light source 2422 is inclined to the xy plane.

FIG. 54A shows a case where the first light source 2421 has emitted the light in a state where the second light source 2422 does not emit the light. FIG. 54B shows a case where the second light source 2422 has emitted the light in a state where the first light source 2421 does not emit the light. In this way, the direction of the reflected light by the specific reflection surface is different between a case where the first light source 2421 has emitted and a case where the second light source 2422 has emitted. For that reason, the control section of the display apparatus provides different stereoscopic images by switching between the light emission state of the first light source 2421 and the light emission state of the second light source 2422.

Figure 55A:
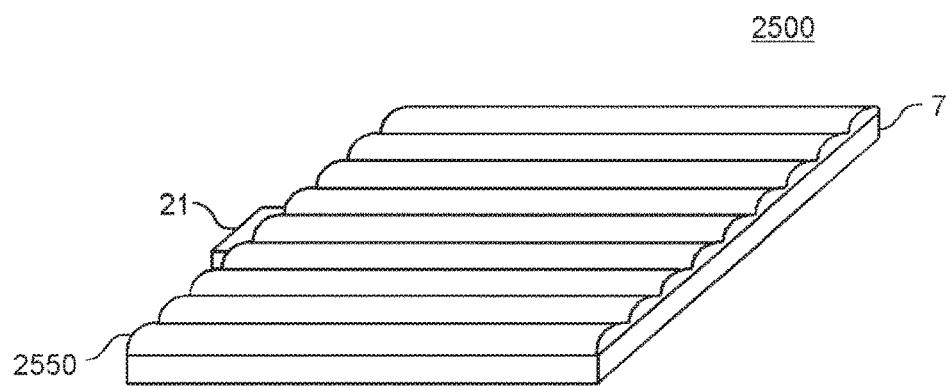
FIG. 55A schematically shows a display apparatus 2500 as a variation of the display apparatus 10.
Figure 55A:
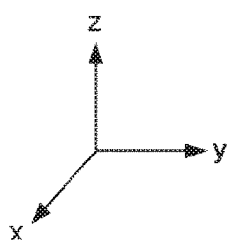
Figure 55B:
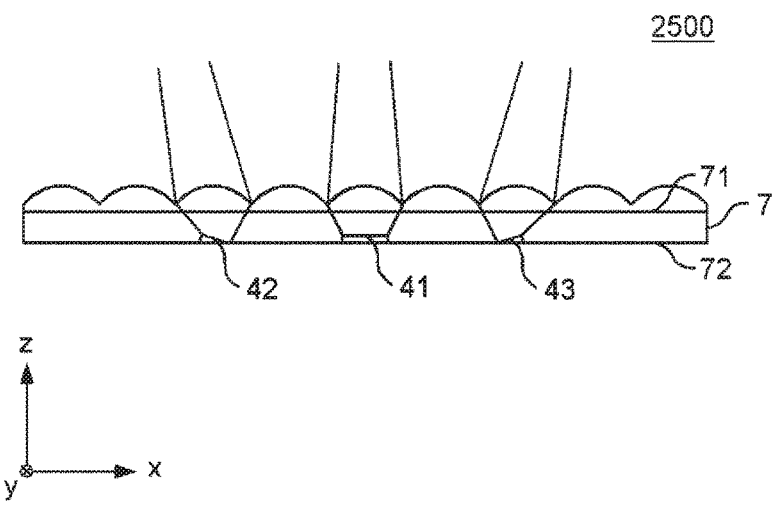
FIG. 55B schematically shows the display apparatus 2500 of a variation of the display apparatus 10.

FIGS. 55A to 55B schematically show a display apparatus 2500 as a variation of the display apparatus 10. FIG. 55A is a perspective view for schematically showing the display apparatus 2500. FIG. 55B is a cross-section view within the xz plane of the display apparatus 2500.

The display apparatus 2500 includes a cylindrical lens 2550 in addition to the components included in the display apparatus 10. The cylindrical lens 2550 is provided to the main surface 71. Each of a plurality of cylindrical lens 2550 is extended along the y-axis direction. The plurality of cylindrical lens 2550 are provided aligned along the x-axis direction.

The reflected light by the reflection surface 41 is emitted in a state where the spread angle of the light has become smaller by the cylindrical lens 2550. In particular, the cylindrical lens 2550 causes the spread of the emitted light in the x-axis direction to become smaller. For that reason, by providing the cylindrical lens 2550, an influence such as a blur of the stereoscopic image can be suppressed. The reflected lights of the reflection surface 42 and the reflection surface 43 are similar as well.

It should be noted that the emission angle of the emitted light is determined by the positional relation between the respective reflection surfaces of the reflection surface 41, the reflection surface 42 and the reflection surface 43, and the cylindrical lens 2550. Therefore, the position of the cylindrical lens 2550 on the x axis is determined based on the direction of the light flux in designing and the position of each reflection surface.

In this way, by providing the cylindrical lens 2550, the spread angle of the emitted light can be set smaller. The cylindrical lens 2550 is one example of the emission limit section which limits the spread of the emitted light in the x-axis direction. When the display unit may not have translucency, the spread of the emitted light in the x-axis direction may be limited by a parallax barrier.

Figure 56:
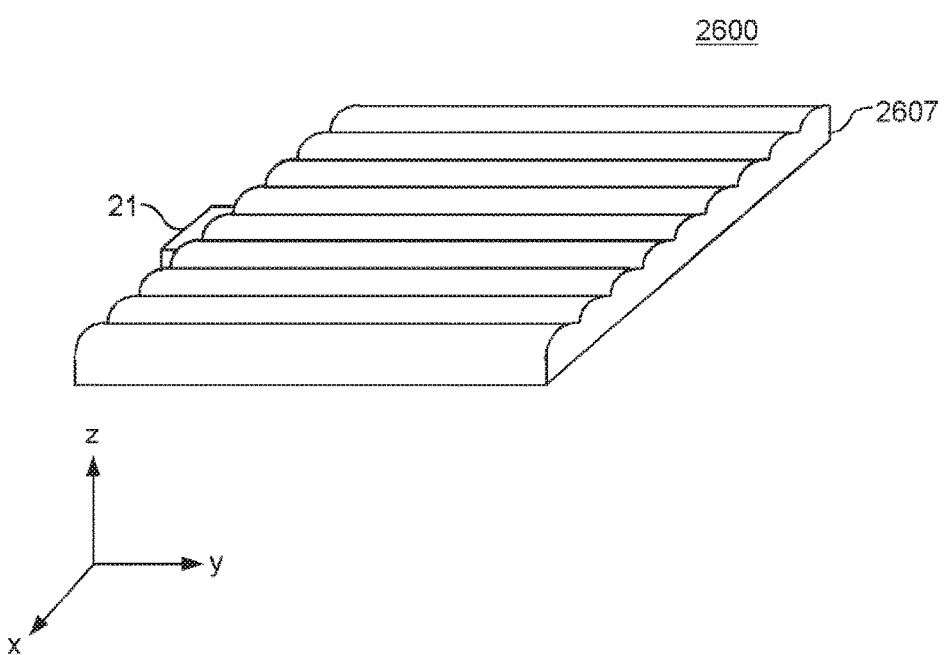
FIG. 56 is a perspective view schematically showing a display apparatus 2600 as a variation of the display apparatus 10.

FIG. 56 is a perspective view for schematically showing a display apparatus 2600 as a variation of the display apparatus 10. The display apparatus 2600 includes a light guiding plate 2607, instead of the light guiding plate 7 included in the display apparatus 10. The light guiding plate 2607 corresponds to the plurality of cylindrical lens 2550, which has been described with reference to FIGS. 55A to 55B, provided integrally with the light guiding plate 7. It should be noted that in the display apparatus 2500 and the display apparatus 2600 described with reference to FIGS. 55A to 55B and FIG. 56, the collimating light source described with reference to FIG. 24 may be applied instead of the light source 21.

Figure 57:
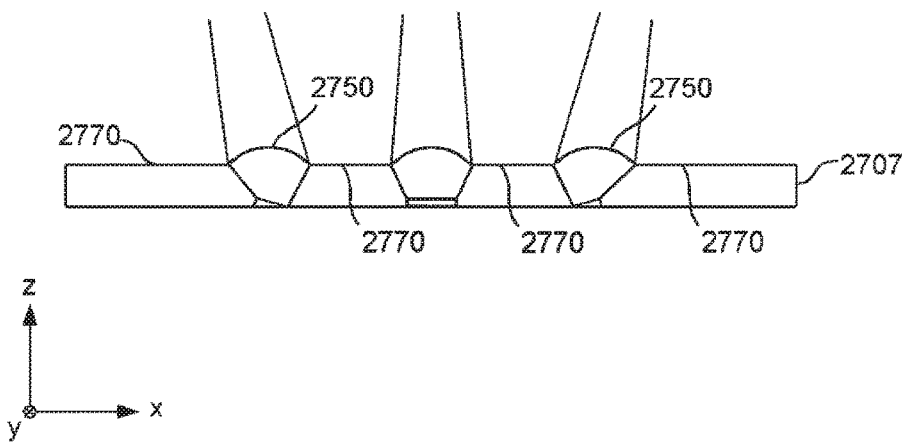
FIG. 57 schematically shows a light guiding plate 2707 as a variation of a light guiding plate 2607.

FIG. 57 schematically shows the light guiding plate 2707 as a variation of the light guiding plate 2607. The light guiding plate 2707 includes a flat section 2770 and a cylindrical lens section 2750. Since the light guiding plate 2607 includes a flat section 2770, the transparent can be increased compared to a case where there is no flat section 2770. For that reason, the light guiding plate 2607 may be applied in some cases as a unit included in the display apparatus 1800, display apparatus 1900, and the like described with reference to FIG. 45, FIG. 46, FIG. 47, FIG. 48 and the like.

Figure 58A:
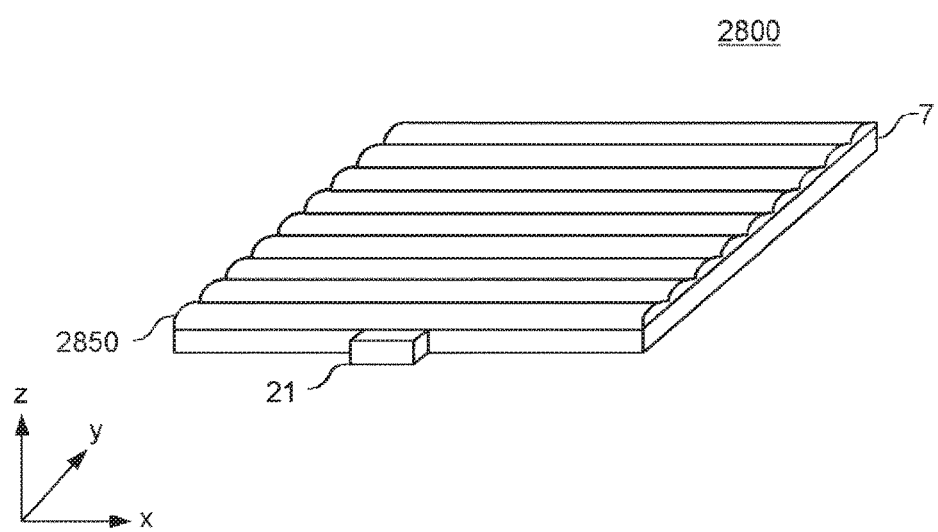
FIG. 58A schematically shows a display apparatus 2800 as a variation of the display apparatus 10.
Figure 58B:
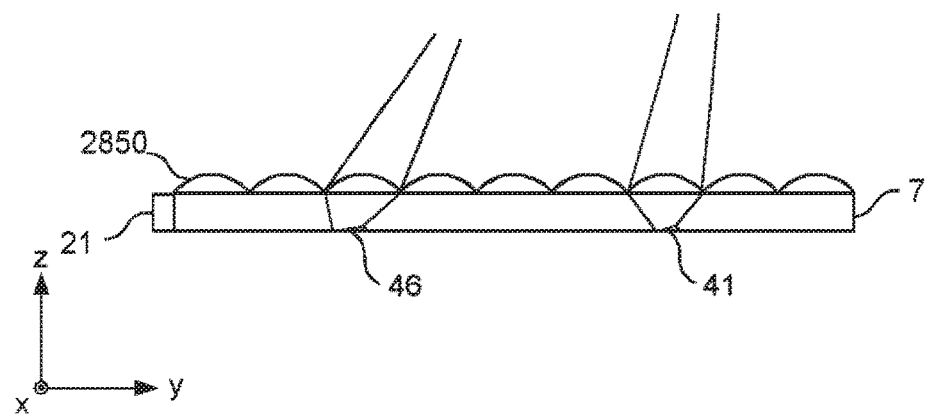
FIG. 58B schematically shows a display apparatus 2800 as a variation of the display apparatus 10.

FIGS. 58A to 58B schematically show a display apparatus 2800 as a variation of the display apparatus 10. FIG. 58A is a perspective view for schematically showing the display apparatus 2800. FIG. 58B is a cross-section view within the xz plane of the display apparatus 2800.

The display apparatus 2800 includes a cylindrical lens 2850 in addition to the components included in the display apparatus 10. The cylindrical lens 2850 is provided to the main surface 71. Each of a plurality of cylindrical lens 2850 is extended along the x-axis direction. The plurality of cylindrical lens 2850 are provided aligned along the y-axis direction. One light converging section and one cylindrical lens 285 are provided one-to-one.

The reflected light by the reflection surface 41 is emitted in a state where the spread in the x-axis direction is small by the reflection surface 41 and is emitted in a state where the spread in the y-axis direction is small by the cylindrical lens 2850. In this way, the reflected light by the reflection surface 41 is emitted in a state where the spread angle became small by the cylindrical lens 2850. In particular, the cylindrical lens 2850 causes the spread of the emitted light in the y-axis direction to be smaller. Accordingly, the number of the directions in which it looks like that the light is emitted from substantially one point in space can be increased. For that reason, by providing the cylindrical lens 2850, an influence due to a blur, distortion and the like of the stereoscopic image can be suppressed. The reflected light of the reflection surface 46 is also similar.

It should be noted that the emission angle of the emitted light is determined in accordance with the positional relation among the reflection surface 41, the reflection surface 46, and the cylindrical lens 2850. Therefore, the position of the cylindrical lens 2850 on the y axis is determined based on the direction of the light flux in designing and the position of each reflection surface.

In this way, by providing the cylindrical lens 2850, the spread angle of the emitted light can be set smaller. it should be noted that the cylindrical lens 2850 is one example of the emission limit section which limits the spread of the light reflected or refracted by the reflection surface 41 and the reflection surface 42 in the direction perpendicular to the direction of the straight line connecting the reflection surface 41 with the reflection surface 42 within the surface parallel to the main surface 71. If the display unit has no translucency, the spread of the emitted light in the y-axis direction may be limited by the parallax barrier. A microlens may be used as an emission limit section.

Figure 59:
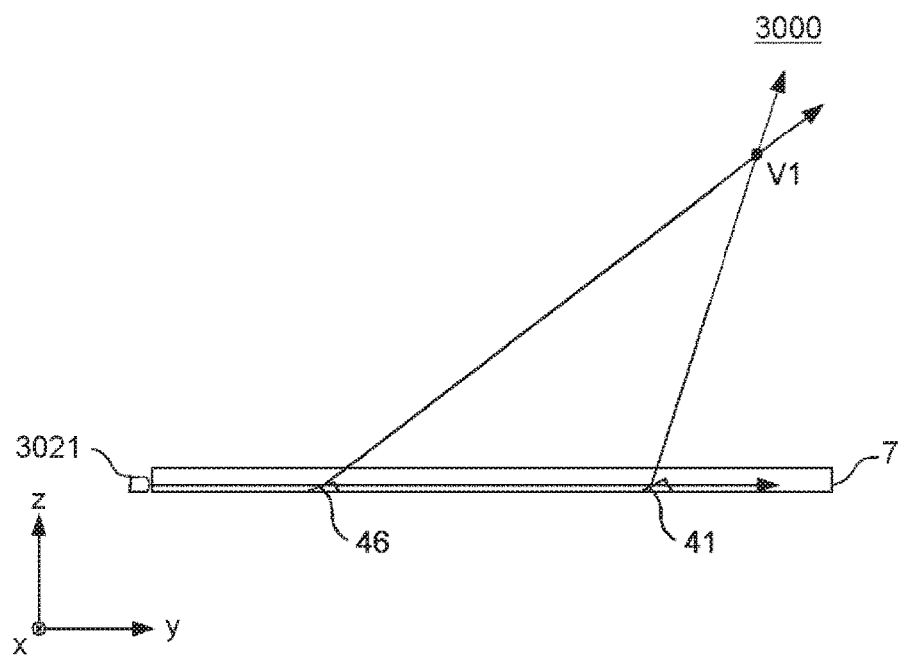
FIG. 59 schematically shows a display apparatus 3000 as a variation of the display apparatus 10.

FIG. 59 schematically shows a display apparatus 3000 as a variation of the display apparatus 10. The display apparatus 3000 includes a light source 3021 which emits the light having a small spread angle, instead of the light source 21 included in the display apparatus 10. The light source 3021 may be an LED light source. The light source 3021 may be an LED light source which emits the light parallel to the y-axis direction, similar to the light source 1221 of FIG. 25, for example. The light source 3021 may be a laser light source. The light source 3021 allows the light substantially parallel to the y-axis direction to be incident onto the light guiding plate 7.

As shown in FIG. 59, since the light source 3021 emits the light having a small spread angle, the reflected light by the reflection surface 41 included in the light guiding plate 7 has a small spread angle in the direction toward the position V1 as the center. The reflected light not only has a small spread in the x-axis direction but also has a small spread in the y-axis direction. The reflected light by the reflection surface 46 is also similar. By providing numerous reflection surfaces like this, the lights converged on the fixed point in space can be provided.

Figure 60:
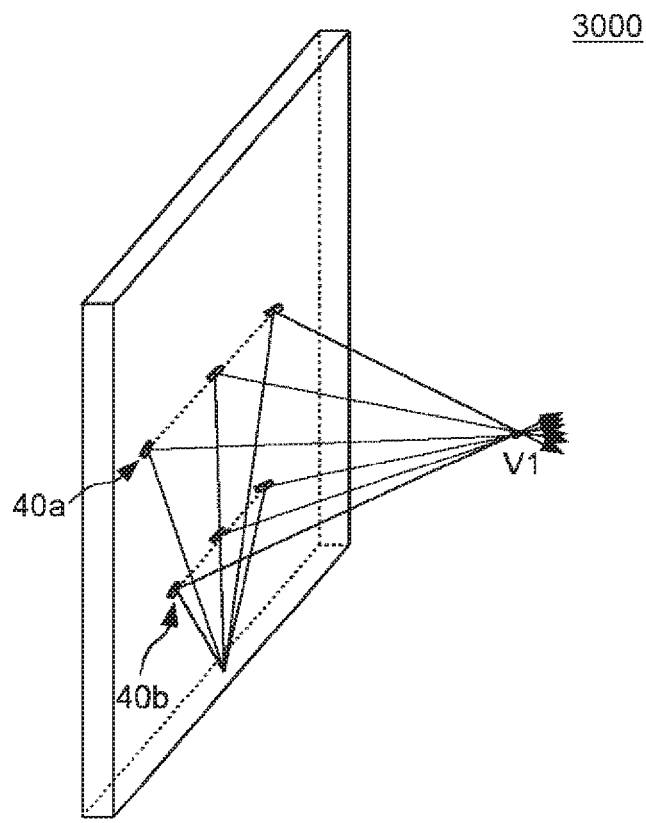
FIG. 60 schematically shows reflected lights by reflection surfaces included in the display apparatus 3000.

FIG. 60 schematically shows the reflected lights by the reflection surfaces included in the display apparatus 3000. As illustrated, according to the display apparatus 3000, the reflected lights having small spread angle from each reflection surface are toward the position V1. By providing numerous reflection surfaces in the positions shifted to the y-axis direction, the lights converged on the fixed point in space can be provided.

Figure 61:
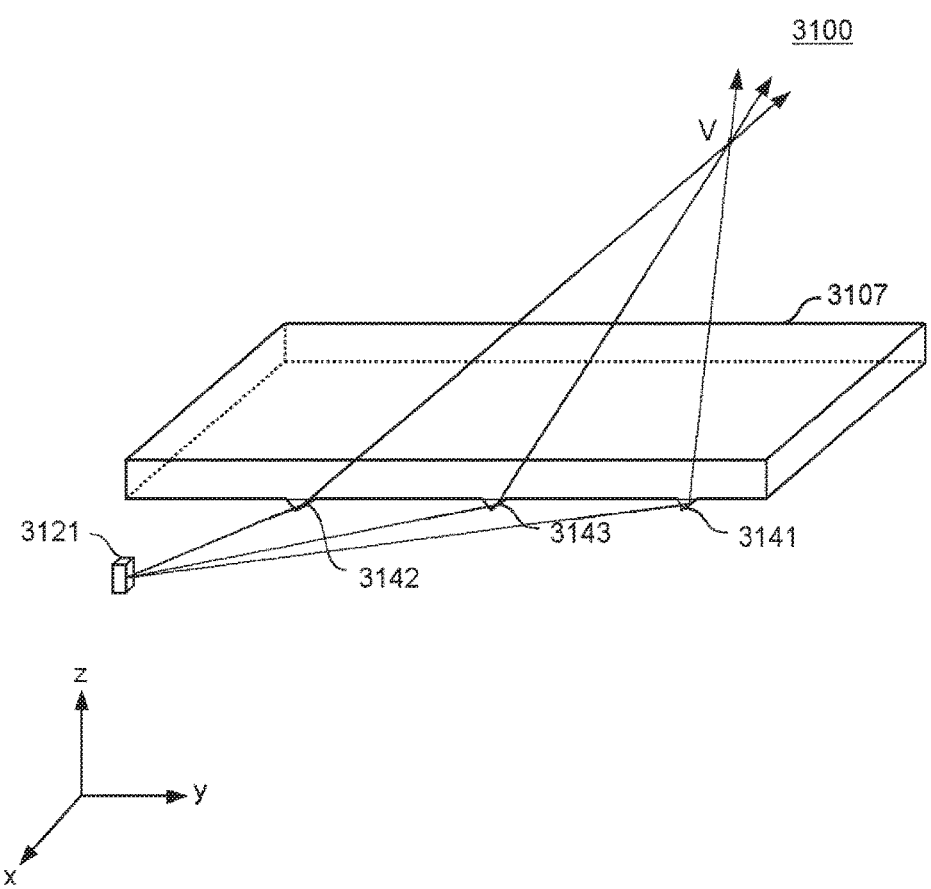
FIG. 61 schematically shows a display apparatus 3100 as a variation of the display apparatus 10.

FIG. 61 schematically shows a display apparatus 3100 as a variation of the display apparatus 10. The display apparatus 3100 includes a light guiding plate 3107 and a light source 3121. The light source 3121 allows the light having an inclination with respect to inside the xy plane to be incident onto the light guiding plate 3107.

The light guiding plate 3107 includes a reflection surface 3141, a reflection surface 3142, and a reflection surface 3143, which protrude toward outside of the light guiding plate 3107. Any of the reflected light by the reflection surface 3141, the reflected light by the reflection surface 3141, and the reflected light by the reflection surface 3142 is toward a position V. Therefore, even if in the manner shown in FIG. 61, the lights converged on the fixed point in space can be provided.

Figure 62:
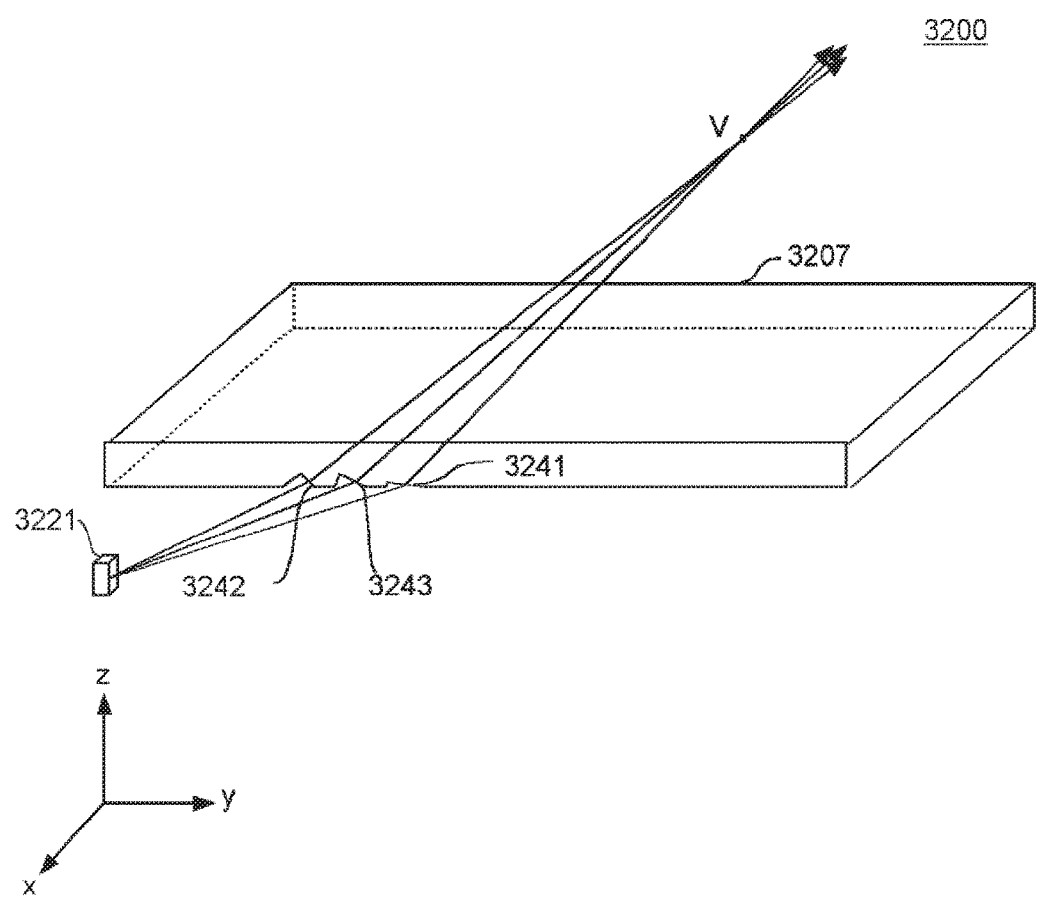
FIG. 62 schematically shows a display apparatus 3200 as a variation of the display apparatus 10.

FIG. 62 schematically shows a display apparatus 3200 as a variation of the display apparatus 10. The display apparatus 3200 includes a light guiding plate 3207 and a light source 3221. The light source 3221 allows the light having an inclination with respect to inside the xy plane to be incident onto the light guiding plate 3207.

The light guiding plate 3207 includes a refractive surface 3241, a refractive surface 3242, and a refractive surface 3243, which are provided to the light guiding plate 3207 in a recessed state. any of the refractive light by the refractive surface 3241, the refractive light by the refractive surface 3242, and the refractive light by the refractive surface 3243 is toward the position V. Therefore, even in in the manner shown in FIG. 62, the lights converged on the fixed point in space can be provided. It should be noted that the refractive surface 3241, the refractive surface 3242 and the refractive surface 3243 are examples of the optical surface which allows the lights from the light source 3221 to be refracted in the direction along the straight line connecting the point on each refractive surface with the fixed point.

Figure 63:
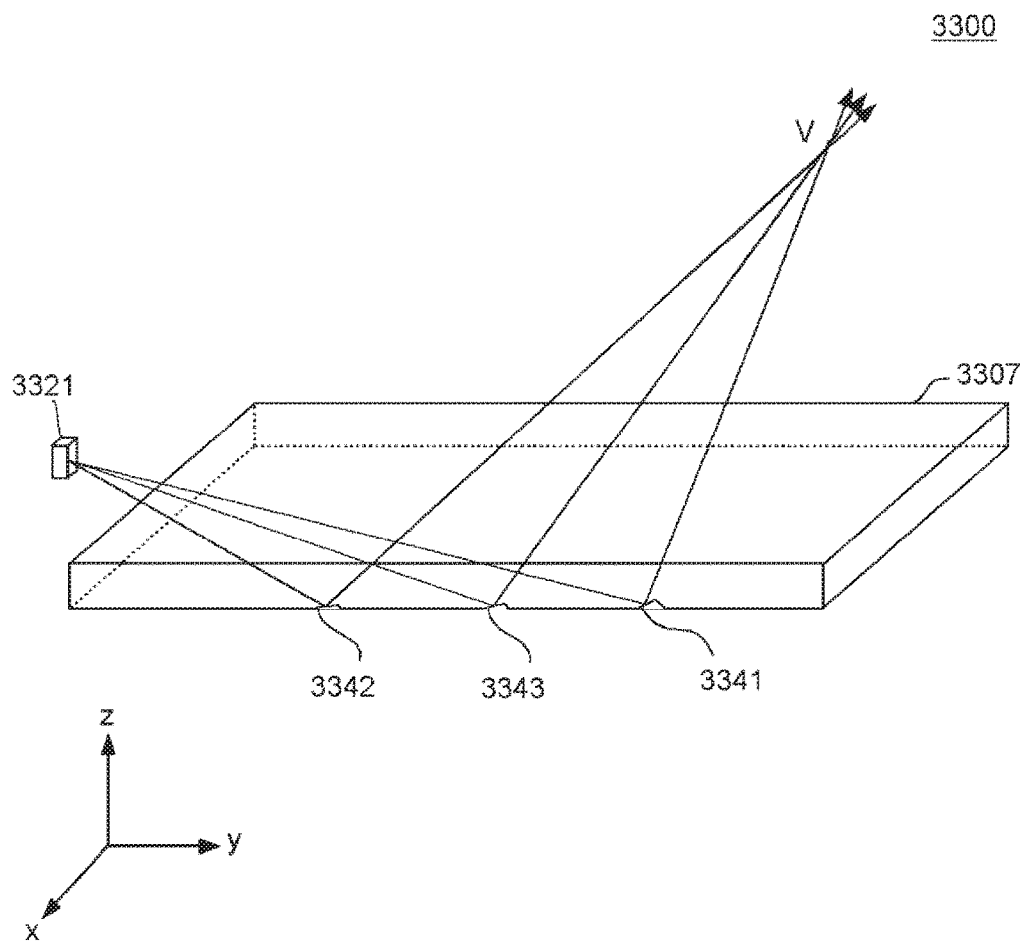
FIG. 63 schematically shows a display apparatus 3300 as a variation of the display apparatus 10.

FIG. 63 schematically shows a display apparatus 3300 as a variation of the display apparatus 10. The display apparatus 3300 includes a light guiding plate 3307 and a light source 3321. The light source 3321 allows the light having an inclination with respect to inside the xy plane to be incident onto the light guiding plate 3307.

The light guiding plate 3307 includes a reflection surface 3341, a reflection surface 3342 and a reflection surface 3343, which are provided to the light guiding plate 3307 in a recessed state. Any of the reflected light by the reflection surface 3341, the reflected light by the reflection surface 3342, and the reflected light by the reflection surface 3343 is toward the position V. Therefore, even if in the manner shown in FIG. 63, the stereoscopic image formed by the lights converged on the fixed point in space can be provided. A reflective layer may be provided to the reflection surface 3341, the reflection surface 3342, and the reflection surface 3343.

Figure 64A:
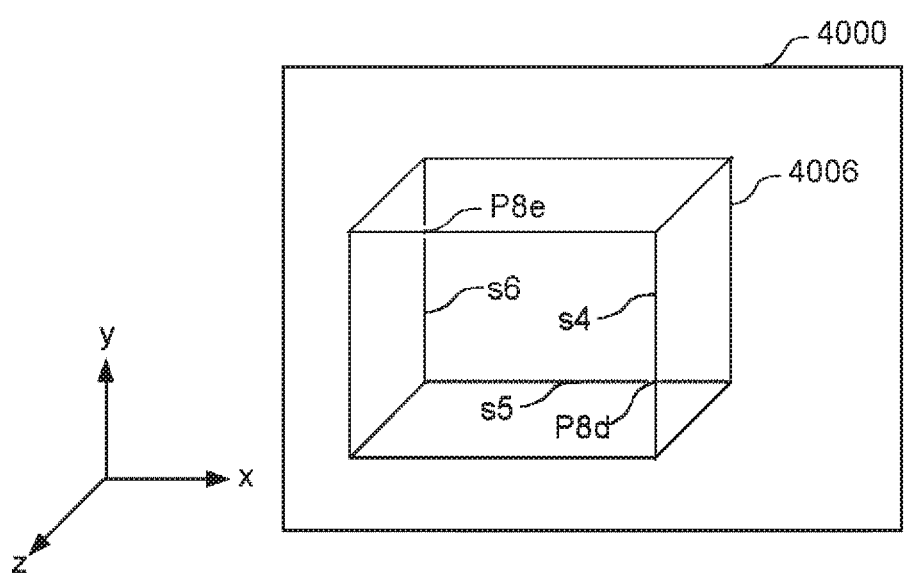
FIG. 64A schematically shows a display apparatus 4000 of a variation of the display apparatus 10.
Figure 64B:
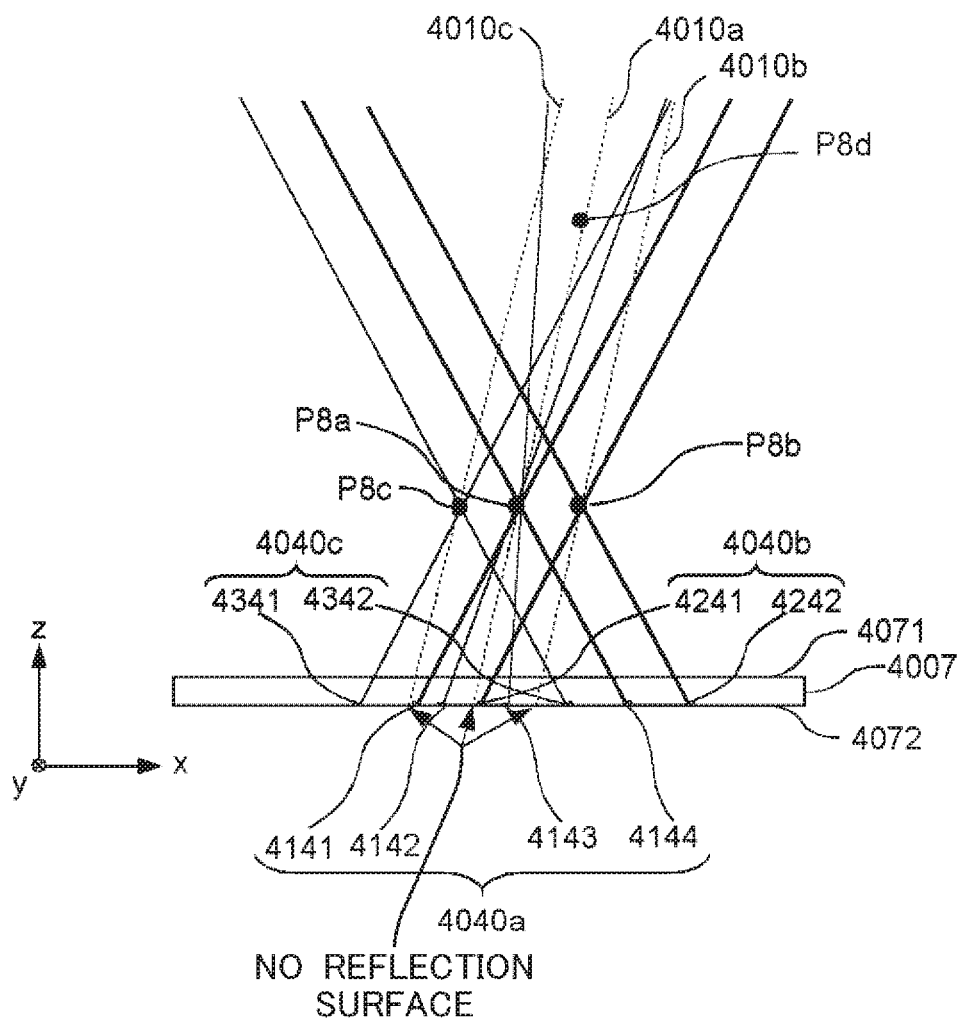
FIG. 64B schematically shows the display apparatus 4000 as a variation of the display apparatus 10.

FIGS. 64A to 64B show a display apparatus 4000 as a variation of the display apparatus 10. FIG. 64A is a perspective view for showing a display apparatus 4000 along with a stereoscopic image 4006 displayed by the display apparatus 4000. FIG. 64B is a cross-section view for showing the display apparatus 4000 along with the fixed points and the like.

The stereoscopic image 4006 is a stereoscopic image representing a cuboid drawn by lines including a side s4, a side s5, and a side s6. The side s5 is a side on the light guiding plate 4007 side than the side s4. The display apparatus 4000 provides the stereoscopic image 4006 emphasizing a stereoscopic effect by performing a so-called hidden line processing to the lines forming the stereoscopic image 4006.

Specifically, as shown in FIG. 64A, in a case of viewing from a position in which it looks like that the side s5 intersects the side s4, it looks like for the observer that the side s5 is cut in the vicinity of the position where the side s5 intersects the side s4. Accordingly, this makes the side s4 and the side s5 not look like that they are connected with each other. For that reason, the forward and back positional relation between the side s4 and the side s5 can become more understandable easily and the stereoscopic effect can be emphasized.

As shown in FIG. 64B, in the light guiding plate 4007 included in the display apparatus 4000, a plurality of light converging sections including a light converging section 4040a, a light converging section 4040b and a light converging section 4040c are formed. The light converging section 4040a includes a plurality of reflection surfaces including a reflection surface 4141, a reflection surface 4142, a reflection surface 4143, and a reflection surface 4144. The light converging section 4040a allows the emitted light to be emitted in the direction where the light is to be converged on a fixed point P8a.

The light converging section 4040b includes a plurality of reflection surfaces including a reflection surface 4241 and a reflection surface 4242. The light converging section 4040b allows the emitted light to be emitted in the direction where the light is to be converged on a fixed point P8b. The light converging section 4040c includes a plurality of reflection surfaces including a reflection surface 4341 and a reflection surface 4342. The light converging section 4040c allows the emitted light to be emitted in the direction where the light is to be converged on a fixed point P8c. The fixed point P8a, the fixed point P8b and the fixed point P8c are fixed points forming the side s5. The fixed point P8b and the fixed point P8c are the fixed points adjacent to the fixed point P8a along the side s5.

A fixed point P8d is a convergence point of an emitted light by one light converging section other than the light converging section 4040a, the light converging section 4040b and the light converging section 4040c. The fixed point P8a, the fixed point P8b, and the fixed point P8c are closer to the main surface 4071 of the light guiding plate 4007 than the fixed point P8d.

Here, the light converging section 4040a does not include any reflection surface in a position where a straight line 4010a connecting the fixed point P8d with the fixed point P8a intersects the main surface 4072. Accordingly, this can make the side s4 and the side s5 not look like for the observer that they are connected with each other completely in the direction of the straight line 4010a.

Also, the light converging section 4040b is approximately parallel to the straight line 4010, and does not include any reflection surface in the position where the straight line 4010b passing through the fixed point P8b intersects the main surface 4072. Also, the light converging section 4040c is approximately parallel to the straight line 4010a, and does not include any reflection surface in the position where the straight line 4010c passing through the fixed point P8c intersects the main surface 4072. Accordingly, this can make the side s4 and the side s5 not look like for the observer that they are connected with each other in the direction of the straight line 4010a.

It should be noted that other than the fixed point P8b and the fixed point P8c, a light converging section corresponding to a predetermined number of fixed points in the vicinity of the fixed point P8a is also similar and may partially omit forming of the reflection surfaces. Also, not only in the position where the straight line 4010a intersects the main surface 4072, the light converging section 4040a may not include any reflection surface in a range passing through the fixed point P8a and in which a straight line, which forms an angle within a predetermined angle (for example, a resolution angle 3°) with respect to the straight line 4010a, intersects the main surface 4072.

In this way, the hidden line processing is performed to the light converging section which forms the fixed points that form the side s5, such that the portion intersecting the fixed point P8d is not to be seen. Similar to the said hidden line processing, the hidden line processing may be performed to the light converging section which forms the fixed points that form the side s6 such that the portion intersecting the fixed point P8e is not to be seen.

Figure 65A:
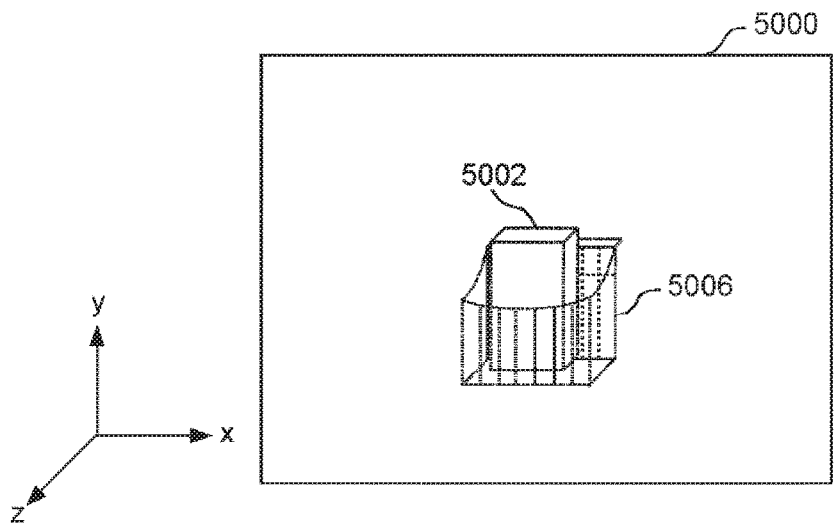
FIG. 65A schematically shows a display apparatus 4000 as a variation of the display apparatus 10.
Figure 65B:
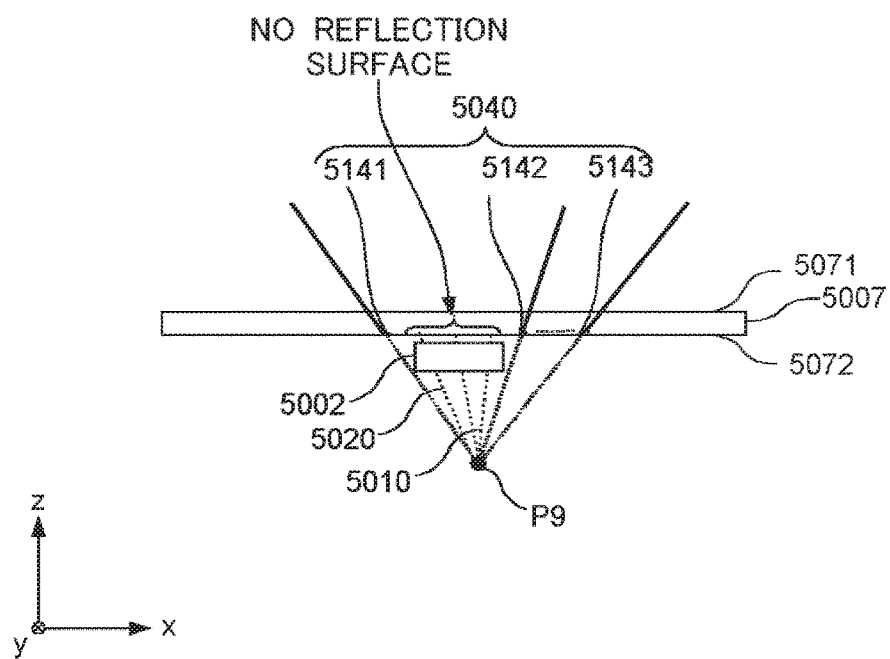
FIG. 65B schematically shows the display apparatus 4000 as a variation the display apparatus 10.

FIGS. 65A to 65B show a display apparatus 5000 as a variation of the display apparatus 10. FIG. 65A is a perspective view for showing a display apparatus 5000 along with a stereoscopic image 5006 and a product 5002 displayed by the display apparatus 5000. FIG. 65B schematically shows a cross-section view of the display apparatus 5000 along with the fixed points and the like. The display apparatus 5000 achieves a so-called AR (Augmented Reality) by which an object is overlapped with a spatial projected image.

The stereoscopic image 5006 is a stereoscopic image representing a product basket. A position where a product should be placed in the product basket is predetermined. The product 5002 has no transparency. The product 5002 is one example of the object.

As shown in FIG. 65B, a plurality of light converging sections including a light converging section 5040 are formed in the light guiding plate 5007 included in the display apparatus 5000. The light converging section 5040 includes a plurality of reflection surfaces including a reflection surface 5141, a reflection surface 5142, and a reflection surface 5143. The light converging section 5040 allows the emitted light in the direction where the light is to be diverged from the fixed point P9 to be emitted from the main surface 5071. Here, the fixed point P9 is a point apart from the light guiding plate 5007 in the opposite direction (the z-axis minus direction) to the emitting direction of the light from the light guiding plate 5007 in the z axis than the position where the product 5002 is to be arranged. For example, the fixed point P9 represents a point in a portion positioned on the rear side of the product 5002 in the product basket, if viewed from the observer.

Here, the light converging section 5040 does not include any reflection surface in a position where a straight line 5010 connecting the fixed point P9 with the position where the product 5002 is arranged intersects the main surface 5072. Also, the light converging section 5040 does not include any reflection surface in a position where a straight line 5020 connecting the fixed point P9 with the position where the product 5002 is arranged intersects the main surface 5072. For that reason, from the light guiding plate 5007, no light is emitted in the direction of the straight line 5010 and the straight line 5020 passing through the position where the object is occupied and through the fixed point P9. On the other hand, from the light guiding plate 5007, the light is emitted in the direction passing through the position where the object is not occupied and through the fixed point P9. Therefore, this can limit the direction of the light being emitted from the light guiding plate 5007 to the directions not passing through the position where the object is occupied among the directions where the light is to be diverged from the fixed point P9. For example, in a case where the observer observes the light guiding plate 5007 while moving, if the observer is in a position where the fixed point looks like that it is hidden in a deep place of the product 5002, the observer cannot see the light in the direction from the fixed point, and if the observer is in a position where the fixed point is not hidden by the product 5002, the observer can see the light in the direction from the fixed point. Therefore, according to the display apparatus 5000, an image for which the observer easily feels a stereoscopic effect can be formed. It should be noted that other than the light converging section 5040, the light converging sections corresponding to other fixed points are similar as well and may not include any reflection surfaces in some portions.

Figure 66A:
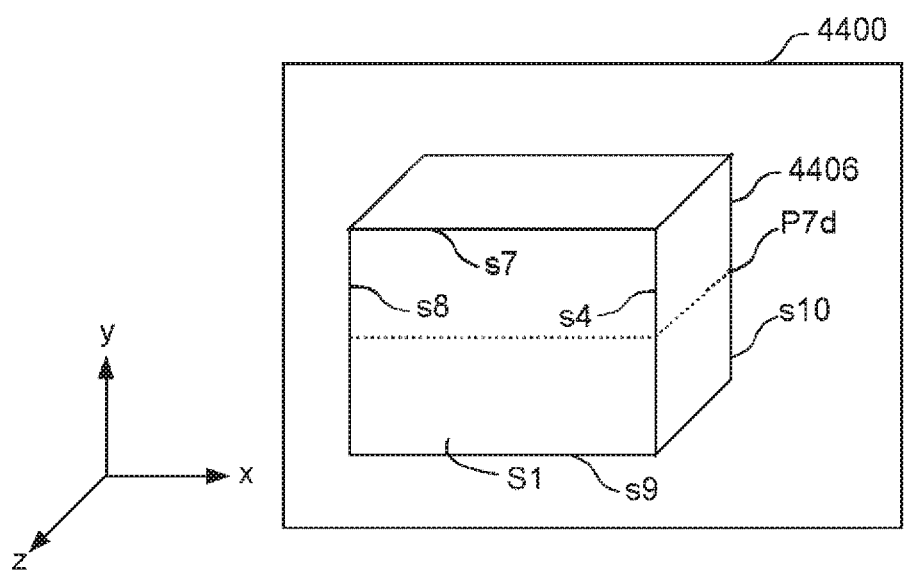
FIG. 66A shows a display apparatus 4400 as a variation of the display apparatus 4000.
Figure 66B:
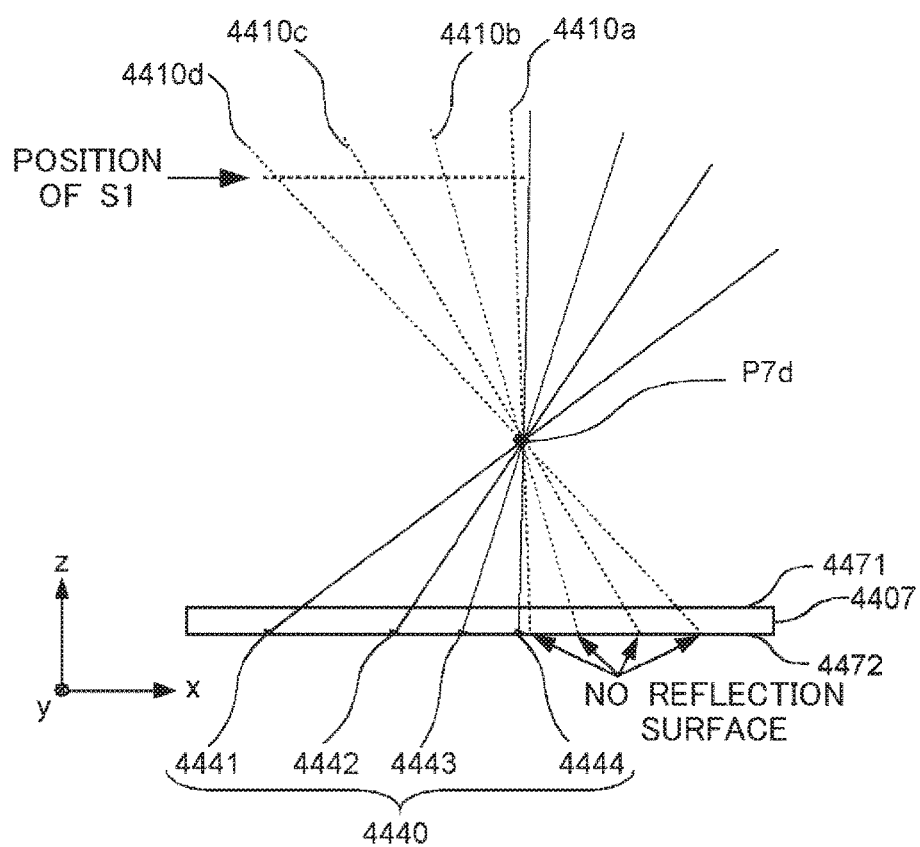
FIG. 66B shows the display apparatus 4400 as a variation of the display apparatus 4000.

FIGS. 66A to 66B show a display apparatus 4400 as a variation of the display apparatus 4000. FIG. 66A is a perspective view for showing the display apparatus 4400 along with a stereoscopic image 4406 displayed by the display apparatus 4400. FIG. 66B is a cross-section view for showing the display apparatus 4400 along with the fixed points and the like. The stereoscopic image 4406 is a stereoscopic image representing a cuboid. The cuboid represented by the stereoscopic image 4406 is different from a cuboid represented by the stereoscopic image 4006 in the matter that the hidden line processing, by which the sides hidden by the surfaces of the cuboid are not seen by an observer, has been performed.

The stereoscopic image 4406 is a stereoscopic image where a cuboid including the side s4, a side s7, a side s8, a side s9, and a side s10, is drawn by lines. The stereoscopic image 4406 represents a cuboid including a virtual surface S1 surrounded by the side s4, the side s7, the side s8, and the side s9. A side s10 is a side on the light guiding plate 4407 side than the surface S1. The side s4 and the side s10 are the sides positioned on the most plus side of x-axis direction among the sides of the cuboid represented by the stereoscopic image 4406.

According to the stereoscopic image 4406 displayed by the display apparatus 4400, as shown in FIG. 66A, for example, the side s10 can be visually recognized by the observer who is positioned on the x-axis plus side than the side s10. On the other hand, the side s10 cannot be visually recognized by the observer positioned on a front surface of the surface S1 or by the observer positioned on the x-axis minus side than the side s4, according to the hidden line processing. Accordingly, the forward and back positional relation between the side s10 and the surface S1 becomes understandable easily for the observer.

A specific configuration of the display apparatus 4400 will be described showing as examples the hidden line processing to the side s10 hidden by surface S1. As shown in FIG. 66B, in the light guiding plate 4407 included in the display apparatus 4400, a plurality of light converging sections including a light converging section 4440 have been formed. The light converging section 4440 includes a plurality of reflection surfaces including a reflection surface 4441, a reflection surface 4442, a reflection surface 4443 and a reflection surface 4444. The light converging section 4440 allows the emitted light to be emitted in the direction where the light is to be converged on a fixed point P7d. The fixed point P7d is one of a plurality of fixed points forming the side s10. The fixed point P7d is close to the main surface 4471 of the light guiding plate 4407 than the surface S1.

In FIG. 66B, a straight line connecting the reflection surface 4441 with the fixed point P7d does not intersect the surface S1. Similarly, each straight line connecting each of the reflection surface 4442, the reflection surface 4443 and the reflection surface 4444 with the fixed point P7d does not intersect the surface S1. Therefore, the fixed point P7d can be visually recognized by the observer who is positioned on the x-axis plus side than the fixed point P7d.

In FIG. 66B, a straight line 4410a, a straight line 4410b, a straight line 4410c and a straight line 4410d are straight lines intersecting the surface S1 passing through the fixed point P7d. The light converging section 4440 does not include any reflection surface in a position where the straight line 4410a intersects the main surface 4472. Accordingly, this can make the fixed point P7d not be seen by the observer who is in the direction of the straight line 4410a. Similarly, the light converging section 4440 does not have any reflection surface in a position where each of the straight line 4410b, the straight line 4410c, and the straight line 4410d intersects the main surface 4472. Accordingly, this can make the fixed point P7d not be seen by the observer positioned on the front surface of the surface S1 or the observer positioned on the x-axis minus side than the fixed point P7d.

Similar to the light converging section 4440, for the light converging sections which converge all fixed points other than the fixed point P7d forming the side s10, the stereoscopic image 4406 where the hidden line processing has been performed to the side s10 can be provided by providing an area where no reflection surface is formed. Also, by performing a similar hidden line processing to all sides hidden by any of surfaces included in the cuboid, as shown in FIG. 66A, it can make the sides hidden by the virtual surface not be seen by the observer.

Figure 67A:
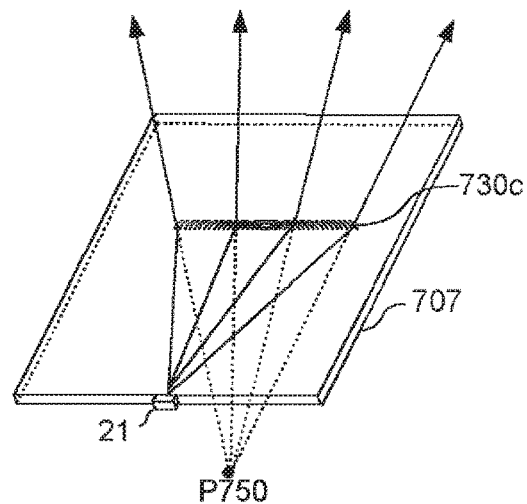
FIG. 67A is a drawing schematically describing a light convergence at a fixed point by light converging sections 730.
Figure 67B:
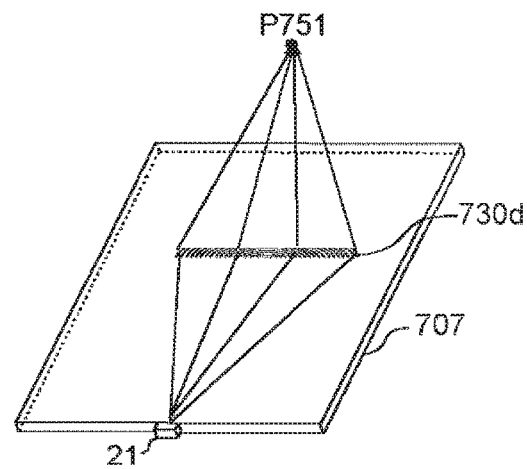
FIG. 67B is a drawing schematically describing a light convergence at a fixed point by the light converging sections 730.
Figure 67C:
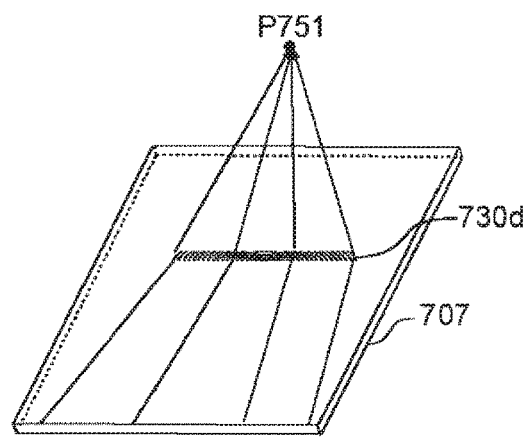
FIG. 67C is a drawing schematically describing a light convergence at a fixed point by the light converging sections 730.

FIGS. 67A to 67C are the drawings for schematically describing that the lights are converged on the fixed points by the light converging section 730. FIG. 67A is a perspective view for showing the light flux in the direction where the light is converged on the fixed point P 750 on the opposite side to the observer. FIG. 67B is a perspective view for showing the light flux converged on the fixed point P 751 on the observer side.

With reference to FIG. 67A, the fixed point P 750 is a fixed point on the opposite side to the observer than the light guiding plate 707. The light emitted from the light source 21 proceeds while spreading inside the light guiding plate 707 and is converted into the light flux in the direction where the light is to be diverged in the x-axis direction by the light converging section 730c. The light converging section 730c may convert the light flux, which proceeds inside the light guiding plate 707 in the direction where the light spread in the x-axis direction, into the light flux in the direction where the light is to be diverged in the x-axis direction.

On the other hand, as shown in FIG. 67B, in order to generate the light flux to be converged on the fixed point P751 on the observer side than the light guiding plate 707, the light converging section 730d needs to convert the light flux, which proceeds in the direction where the light spreads inside the light guiding plate 707 in the x-axis direction, into the light flux which proceeds in the direction where the light is to be converged in the x-axis direction. Generally, it is more difficult to generate the light flux which is to be converged on the fixed point (the fixed point where the light protrudes from the light guiding plate 707) on the observer side than a case of generating the light flux which represents the fixed point (the fixed point in a deeper place than the light guiding plate 707) on the opposite side to the observer.

FIG. 67C conceptually shows a configuration for easily generating the light to be converged on the fixed point 751. As shown in FIG. 67C, the light proceeding inside the light guiding plate 707 while converged in the x-axis direction is incident onto the light converging section 730d. In this case, the light converging section 730d may convert the light flux proceeding while converged in the x-axis direction into the light flux in the direction where the light is to be converged in the x-axis direction. Accordingly, compared to the configuration shown in FIG. 67B, the light flux which is to be converged on the fixed point on the observer side can be easily generated.

Figure 68:
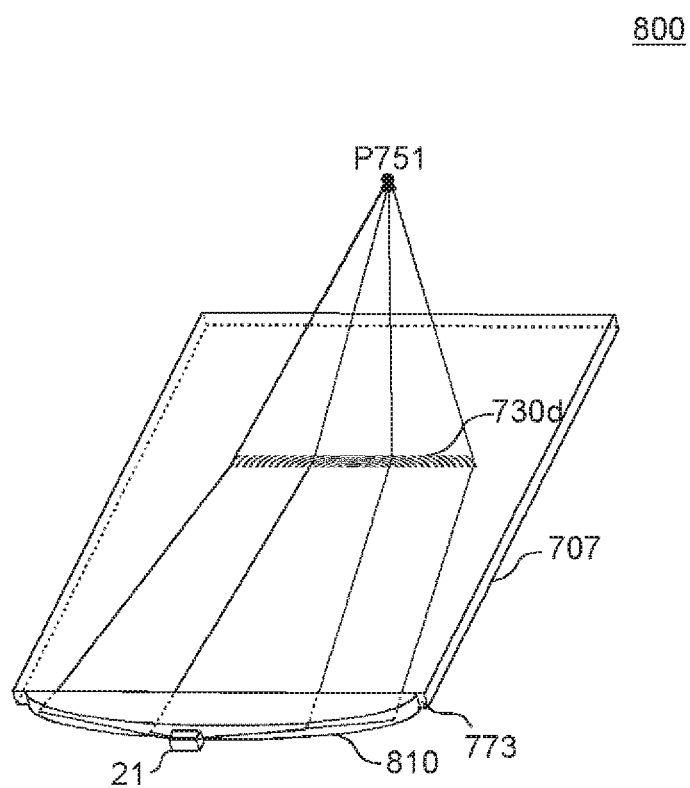
FIG. 68 schematically shows a display apparatus 800 as a variation of the display apparatus 700.

FIG. 68 schematically shows a display apparatus 800 as a variation of the display apparatus 700. The display apparatus 800 further includes a lens 810 in addition to the configuration included in the display apparatus 700. The lens 810 is provided between the light source 21 and the end surface 773. The lens 810 converts the light flux from the light source 21 into the light flux converged by making the spread smaller in the x-axis direction; that is, into the light flux converged in the light guiding direction of the light guiding plate 707 and allows the light to be incident onto the end surface 773. Accordingly, the light proceeding inside the light guiding plate 707 while converged in the x-axis direction can be incident onto the light converging section 730d.

Figure 69A:
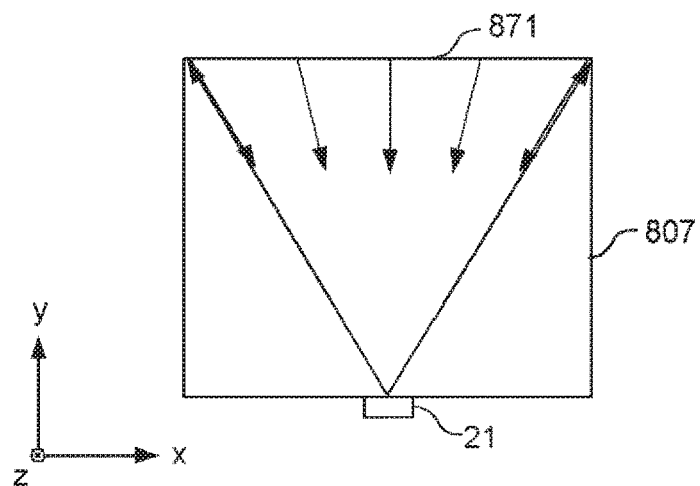
FIG. 69A schematically shows another configuration for allowing a light, which proceeds while being converged in the x-axis direction, to be incident.
Figure 69B:
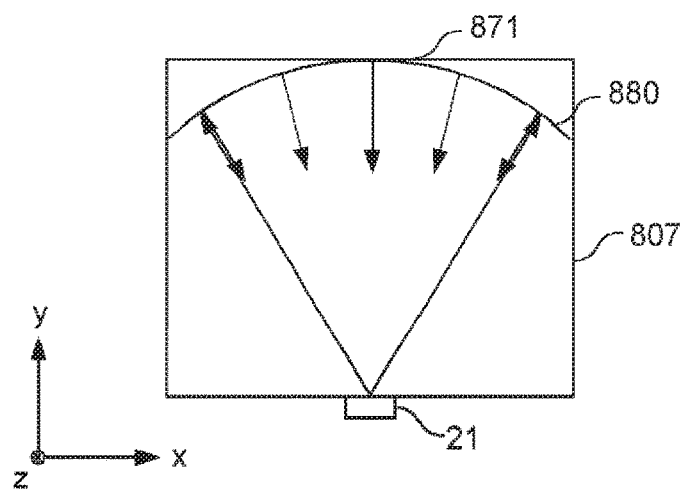
FIG. 69B schematically shows another configuration for allowing a light, which proceeds while being converged in the x-axis direction, to be incident.
Figure 69C:
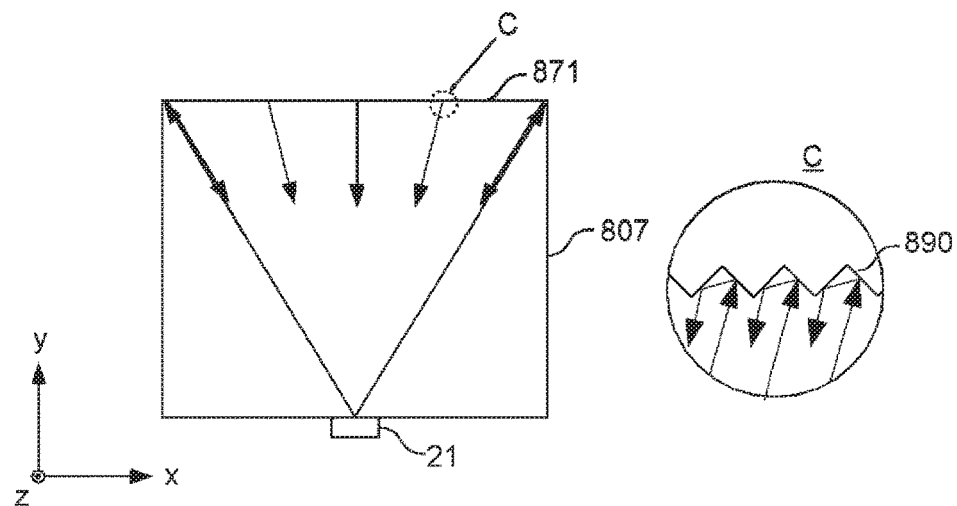
FIG. 69C schematically shows another configuration for allowing a light, which proceeds while being converged in the x-axis direction, to be incident.

FIGS. 69A to 69C schematically show other configurations for allowing the lights proceeding while converged in the x-axis direction to be incident onto the light converging section. FIG. 69A conceptually shows a configuration utilizing a return light from the end surface 871 of the light guiding plate 807. The end surface 871 is an end surface corresponding to the end surface 774 of the light guiding plate 707. In the end surface 871 of the light guiding plate 807, the reflection surface reflecting lights is formed.

FIG. 69B shows a formation where a circular reflection surface 880 is formed in the inner side of the end surface 871. The light from the light source 21 proceeds while spreading inside the light guiding plate 807, reaches the reflection surface 880, and is reflected on the reflection surface 880. The reflected light by the reflection surface 880 becomes the light proceeding while converged in the x-axis direction.

FIG. 69C shows a formation where a reflection surface 890 in a prism shape is formed on the inner side of the end surface 871 along with an enlarged portion C which is a part of the end surface 871. The light from the light source 21 proceeds while spreading inside the light guiding plate 807, reaches the reflection surface 890, and is retro-reflected on the reflection surface 890. The reflected light by the reflection surface 890 becomes the light proceeding while converged in the x-axis direction.

Figure 70A:
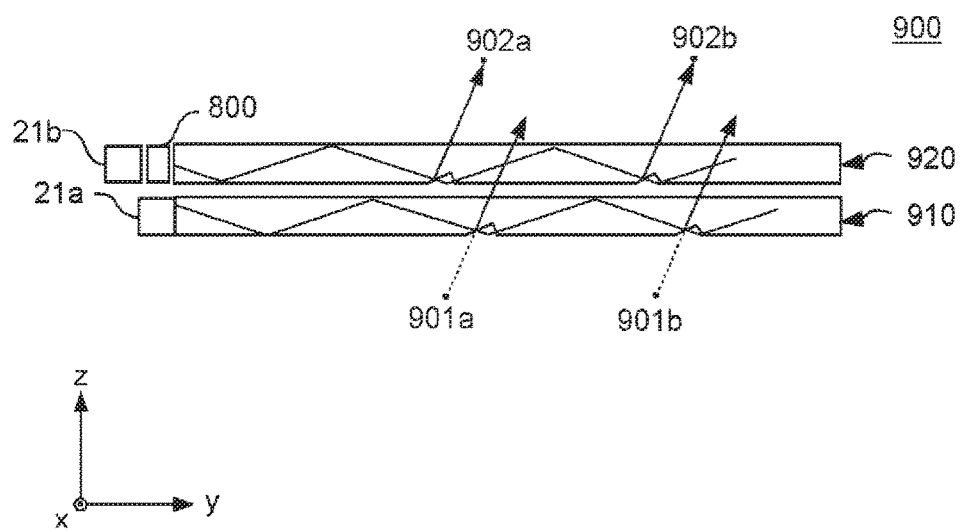
FIG. 70A schematically shows one example of a display apparatus utilizing a light flux proceeding while being converged.
Figure 70B:
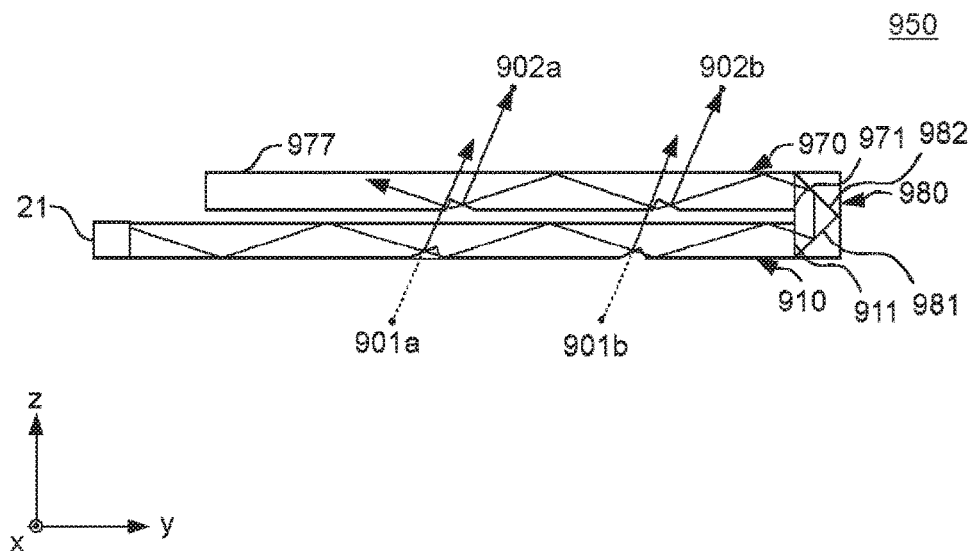
FIG. 70B schematically shows one example of a display apparatus utilizing a light flux proceeding while being converged.

FIGS. 70A to 70B schematically show examples of the display apparatus utilizing the light flux proceeding while converged inside the light guiding plate. FIG. 70A schematically shows a display apparatus 900 including a first unit 910 and a second unit 920. The first unit 910 is provided on an emission surface of the second unit 920. The first unit 910 is positioned on the observer side than the second unit 920.

The first unit 910 has a similar configuration to the display apparatus 700 or the variations of the display apparatus described above. The first unit 910 includes a light converging section onto which the light from the light source 21*a* is incident, the light converging section generating the light fluxes representing the lights from the fixed point 901*a* and the fixed point 901*b* on the opposite side to the observer. The first unit 910 does not include a light converging section which generates the light fluxes which are to be converged on the fixed point on the observer side.

The second unit 920 has a similar configuration to the display apparatus 800. In the second unit 920, the light from the light source 21*b* is converted by the lens 800 into the light proceeding while converged. The second unit 920 includes a light converging section which generates the light fluxes which are to be converged on fixed points 902*a* and 902*b* on the observer side. It should be noted that the second unit 920 does not include a light converging section which generates the light flux representing the light from the fixed point on the opposite side to the observer.

It should be noted that the structure utilizing the return light of the light guiding plate, described with reference to FIGS. 69A to 69C, may be adopted as the second unit 920 instead of the lens 800.

FIG. 70B schematically shows another display apparatus 950 in the formation utilizing the return light of the light guiding plate. The display apparatus 950 includes a first unit 910, a reflecting section 980, and a second unit 970. The second unit 970 includes a light guiding plate 977.

The reflecting section 980 is optically connected with an end surface 911 of the light guiding plate 977 of the first unit 910 and an end surface 971 of the second unit 970. The end surface 911 of the first unit 910 is an end surface corresponding to the end surface 774. Among the lights from the light source 21, at least parts of the lights reaching the end surface 911 are reflected on a reflection surface 981 and on a reflection surface 982, which are included in the reflecting section 980, and are incident onto the second unit 970 from the end surface 971 of the second unit 970.

The light incident onto the second unit 970 proceeds in the y-axis minus direction while converged within the light guiding plate 977. The second unit 970 includes a light converging section which generates the light flux converged on the fixed points 902*a* and 902*b* and on the observer side. The light incident onto the second unit 970 proceeds in the y-axis minus direction while converged inside the light guiding plate 977, and generates the light fluxes converged on the fixed points 902*a* and 902*b* by the light converging section. It should be noted that the second unit 970 does not include any light converging section which generates the light flux representing the light from the fixed point on the opposite side to the observer. As described with reference to FIG. 70A and FIG. 70B, an image in a deeper position than the light guiding plate is formed by the first unit, and an image in a position where the image protrudes from the light guiding plate is formed by the second unit; accordingly, an image have a higher stereoscopic effect can be provided.

Figure 71A:
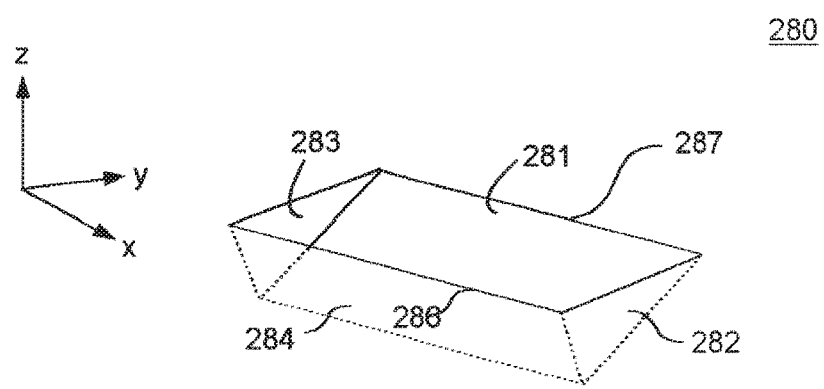
FIG. 71A schematically shows a pattern section 280 as a variation of the pattern section 80.
Figure 71B:
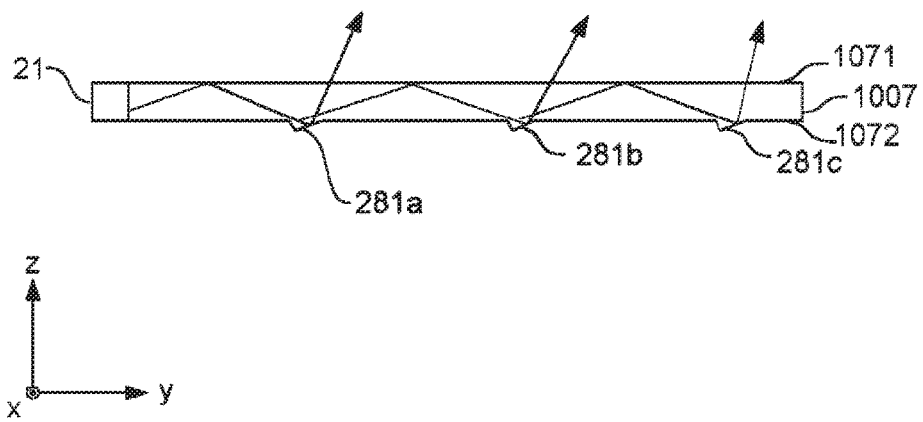
FIG. 71B schematically shows a pattern section 1010 as a variation of the pattern section 80.

FIGS. 71A to 71B schematically show a pattern section 280 as a variation of the pattern section 80. FIG. 71A is a perspective view for schematically showing the pattern section 280. FIG. 71B is one example of the display apparatus 1010 including reflection surfaces of the pattern section 280 as the light converging section.

As shown in FIG. 71A, the pattern section 280 includes a reflection surface 281, a side surface 282, a side surface 283, and a front face 284. As shown in FIG. 71B, the display apparatus 1010 includes a light guiding plate 1007 including a pattern section 280*a*, a pattern section 280*b*, and a pattern section 280*c*. The reflection surface 281*a* of the pattern section 280*a*, the reflection surface 281*b* of the pattern section 280*b*, and the reflection surface 281*c* of the pattern section 280*c* respectively protrude in the z-axis minus direction by the main surface 1072.

With reference to FIG. 71A, a rear edge 287 is a border line between the reflection surface 281 and the main surface 1072. A front edge 286 is a border line between the front face 284 and the main surface 1072. The reflection surface 281 is positioned away from the light source 21 than the front face 284. Also, the reflection surface 281, the side surface 282 and the side surface 283 protrude in the z-axis minus direction from the main surface 1072. In this way, the pattern section 280 includes a surface protruding in the z-axis minus direction. For that reason, it can suppress the light from the light source 21 from being incident onto the side surface 282 or the side surface 283. Also, even if the spread occurs due to the form shear droop and the like on the side surface 282, the side surface 283 and the rear surface 284, an influence from the spread portion on the reflected light can be suppressed.

Figure 72A:
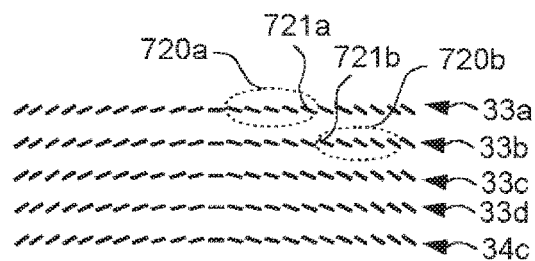
FIG. 72A schematically shows a forming method of one optical element providing a plurality of reflection surfaces.
Figure 72B:
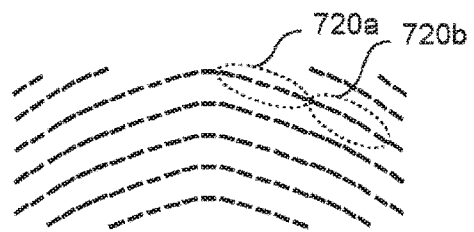
FIG. 72B schematically shows a forming method of one optical element providing a plurality of reflection surfaces.
Figure 72C:
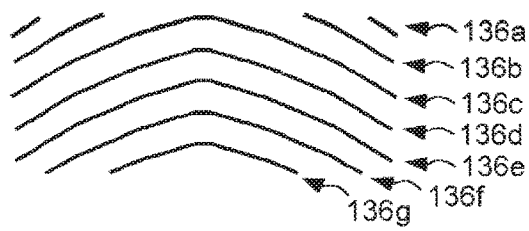
FIG. 72C schematically shows a forming method of one optical element providing a plurality of reflection surfaces.

FIGS. 72A to 72C schematically show forming methods of one optical element which provides a plurality of reflection surfaces. FIGS. 72A to 72C show other methods of forming the optical element described with reference to FIGS. 15A to 15D. FIG. 72A shows a design position of the reflection surfaces included in a light converging section 33. FIG. 72B shows a state where the positions of the reflection surfaces are changed within the xy plane. FIG. 72C shows an optical element obtained by connecting the reflection surfaces.

With reference to FIG. 72A and FIG. 72B, the position of each reflection surface within the reflection surface group 720*c* among the plurality of reflection surfaces included in the light converging section 33*a* is changed to be on the light converging section 33*b* side. At this time, the positions of the reflection surfaces are changed such that among two adjacent reflection surfaces, one end of one reflection surface is adjacent to one end of the other reflection surface. Also, the other end of the reflection surface is set to be adjacent to one end of the other reflection surface of the two adjacent reflection surfaces.

In this way, by changing the positions of the reflection surfaces, the reflection surface 721*a* within the reflection surface group 720 is positioned in the vicinity of the reflection surface 721*b* included in the light converging section 33*b*. In this case, the position of each reflection surface within the reflection surface group 720 including the reflection surface 721*b* is changed similarly. Accordingly, the positions of the reflection surfaces are being changed such that both ends of each reflection surface are respectively adjacent to one end of two reflection surfaces adjacent to each other.

Then, as shown in FIG. 72C, by extending each end portion of the each reflection surface, the adjacent ends of the adjacent reflection surfaces are connected to each other.

Accordingly, a plurality of optical components extended in the x-axis direction, i. e. an optical component 136a to an optical component 136g, are formed. In this way, by connecting the end portions of each reflection surface, the ambient light can be reduced. As shown in FIG. 72A to FIG. 72C, in a case where the normal line of the reflection surface is projected onto the xy plane, the direction of the normal line of the reflection surface intermittently changes along the lengthwise direction of the light converging section.

Figure 73A:
FIG. 73A schematically shows another forming method of one optical element providing a plurality of reflection surfaces.
Figure 73B:
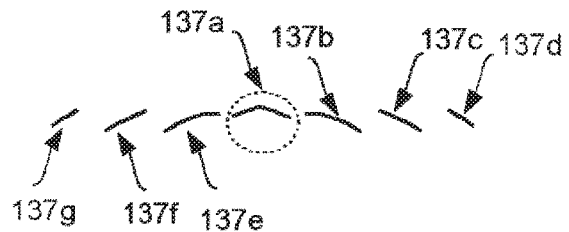
FIG. 73B schematically shows another forming method of one optical element providing a plurality of reflection surfaces.

FIGS. 73A to 73B schematically show other forming methods of one optical element which provides a plurality of reflection surfaces. FIG. 73A shows a design position of reflection surfaces included in a light converging section 34. FIG. 73B shows an optical element obtained by changing the positions of the reflection surfaces within the xy plane to connect the end portions of each reflection surface.

As shown in FIG. 73A, the light converging section 34a and the light converging section 34b are light converging sections adjacent to each other. Here, the reflection surface group 720c includes two reflection surfaces adjacent to the light converging section 34a and two reflection surfaces adjacent to the light converging section 34b. As the reflection surfaces included in the reflection surface groups 720c, at most four neighboring reflection surfaces are selected. As shown in FIG. 73B, the position of each reflection surface within the reflection surface group 720c is changed such that each end of the reflection surfaces is connected. By connecting the plurality of the neighboring reflection surfaces in this way, one optical component 137a which provides a plurality of reflection surfaces is formed. By connecting other reflection surfaces in a similar way, the optical components 137b to optical component 137g are formed. By changing the positions such that the end portions of each reflection surface can be connected with each, the ambient light can be reduced. It should be noted that if only focusing on a reflection surface of a light converging section corresponding to one fixed point, when the normal line of the reflection surface is projected onto the xy plane, the direction of the normal line of the reflection surface is intermittently changed along the lengthwise direction of the light converging section.

Figure 74A:
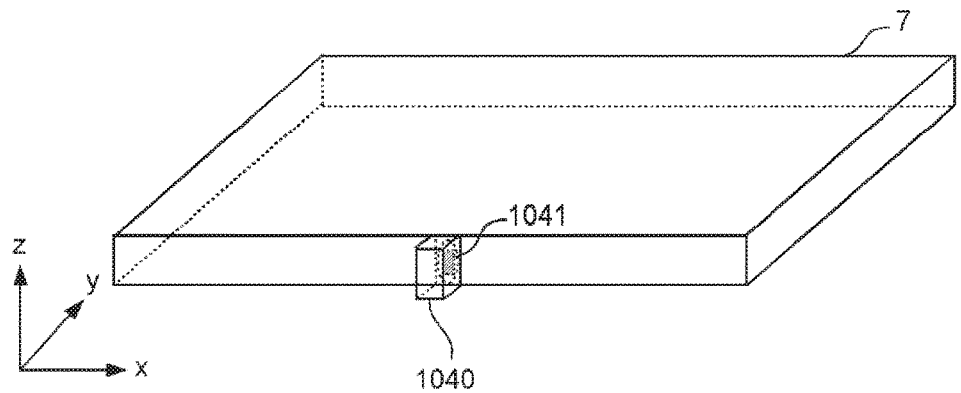
FIG. 74A schematically shows a light source 1041 as a variation of the light source 21.
Figure 74B:
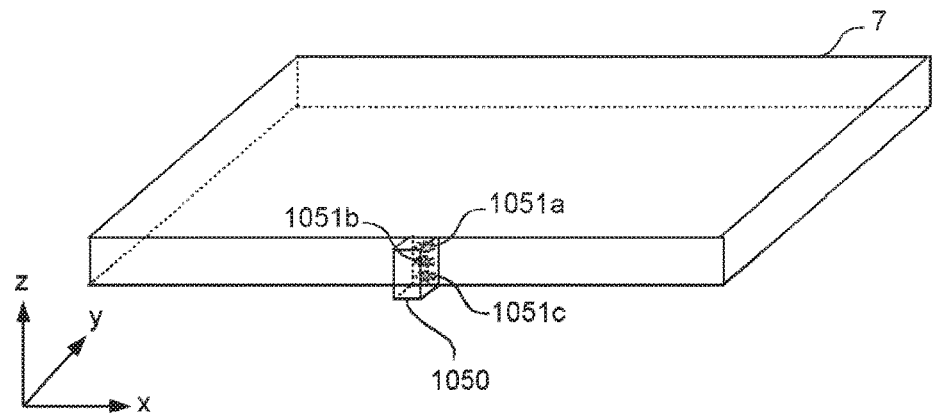
FIG. 74B schematically shows a light source 1051 as a variation of the light source 21.
Figure 74C:
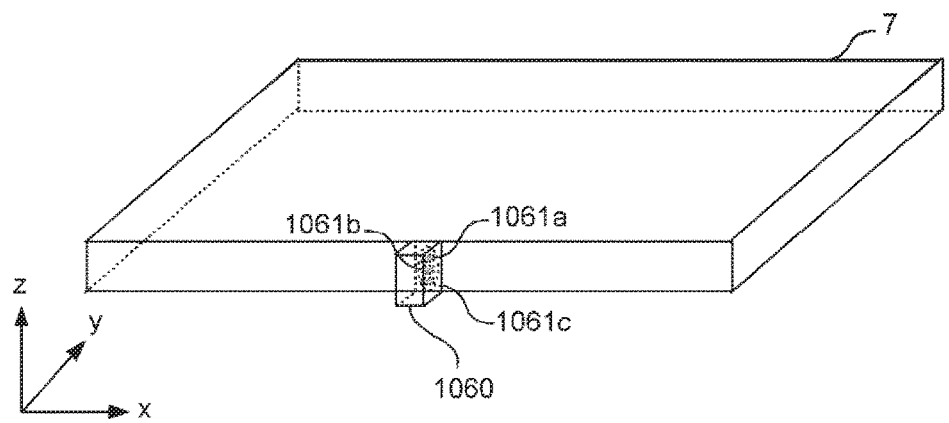
FIG. 74C schematically shows a light source 1061 as a variation of the light source 21.

FIGS. 74A to 74C schematically show a light source 1041 as a variation of the light source 21. As described with reference to FIG. 4 and the like, it is preferable to use a light source having a small Δθ. FIG. 74A shows a light source 1040 including a light emitting section 1041 in a longitudinal direction and lateral direction. The light emitting section 1041 is, for example, an LED. The light source 1040 is attached to the light guiding plate 7 such that the longitudinal direction of the light emitting section 1041 is parallel to the z-axis direction. Accordingly, it becomes possible to set Δθ small.

FIG. 74B shows a light source 1050 including a plurality of light emitting sections 1051. The light source 1050 includes a light emitting section 1051a, a light emitting section 1051b and a light emitting section 1051c. The light emitting section 1051a, the light emitting section 1051b, and the light emitting section 1051c are respectively independent light emitting optical elements. For example, the light emitting section 1051a, the light emitting section 1051b, and the light emitting section 1051c are respectively independent LEDs. The light emitting section 1051a, the light emitting section 1051b, and the light emitting section 1051c are aligned along the z-axis direction. Accordingly, Δθ can be set small.

FIG. 74C shows a light source 1060 including a plurality of light emitting sections 1061. The light source 1060 includes a light emitting section 1061a, a light emitting section 1061b, and a light emitting section 1061c. The light emitting section 1061a, the light emitting section 1061b and the light emitting section 1061c are, for example, LEDs. The light emitting section 1061a, the light emitting section 1061b, and the light emitting section 1061c are packaged in a state of one-row alignment, as a light source 1060. The light source 1060 is attached to the light guiding plate 7 such that the arrangement direction of the light emitting section 1061a, the light emitting section 1061b and the light emitting section 1061c is along the z-axis direction. Accordingly, Δθ can be set small.

Figure 75:
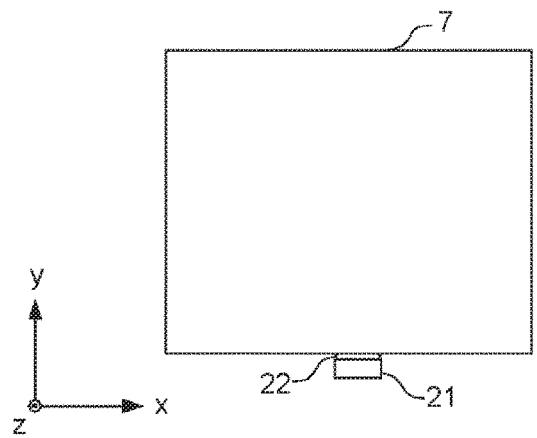
FIG. 75 shows a configuration where the light source 21 and the light guiding plate 7 are optically in close contact with each other.

FIG. 75 shows a configuration for making the light source 21 and the light guiding plate 7 optically in close contact with each other. The light source 21 and the end surface 73 of the light guiding plate 7 are optically connected by a connection material 22. Accordingly, an air layer between the light source 21 and the end surface 73 can be eliminated. Therefore, the light utilization efficiency can be increased. The connection material 22 may be formed of a translucent sheet, for example. The translucent sheet may be a translucent resin. The connection material 22 may be a sealing material made of the translucent sheet. It is preferable that the refractive index of the connection material 22 is close to or matches the refractive index of the light guiding plate 7.

FIG. 76 schematically shows a display apparatus 1850 as a variation of the display apparatus 1800. The display apparatus 1850 includes a first unit 1851 and a second unit 1852. The first unit 1851 corresponds to the first unit 1811. The second unit 1852 corresponds to the second unit 1812.

The first unit 1851 and the second unit 1852 form images substantially different from each other. For example, the first unit 1851 provides the stereoscopic image 1861 which is recognized from a position of an observer 1891. The second unit 1852 provides a planar image 1862 which is visually recognizable from a position of an observer 1892. According to the display apparatus 1850, different images in accordance with the position of the observer can be provided. Since the first unit 1851 is transparent, a plurality of units can be utilized in an overlapping manner.

FIGS. 77A to 77C are the drawings for describing a configuration for increasing a grayscale of a stereoscopic image. FIG. 77A shows one light converging section 730. By setting a length dy of the light converging section 730 in the y-axis direction longer, the number of the light fluxes from the light converging section 730 becomes greater. Therefore, a luminance of the fixed points forming the stereoscopic image is increased. On the contrary, by setting a thickness dy of the light converging section 730 shorter, the number of the light fluxes from the light converging section 730 becomes less. Therefore, the luminance of the fixed points forming the stereoscopic image is decreased. In this way, by regulating the length dy per light converging section 730, the luminance level can be set. Therefore, the grayscale expression of stereoscopic image becomes possible.

FIG. 77B shows a pattern section 80 including one light reflection surface. FIG. 77C shows a plurality of reflection surfaces included in one light converging section 30. By setting the length L of the reflection surface longer, the number of the light fluxes from one reflection surface becomes greater. By setting the length L of each reflection surface included in the light converging section 30 longer and setting intervals of each reflection surface shorter, the number of the light fluxes from one light converging section 30 becomes greater. Therefore, the luminance of the fixed points forming the stereoscopic image is increased. On the contrary, by setting the length L of each reflection surface shorter, the number of the light fluxes from the light converging section 30 becomes less. Therefore, the luminance of the fixed points forming the stereoscopic image is decreased. In this way, by regulating the length L of the reflection surface per light converging section 30, the luminance level can be set. Therefore. The grayscale expression of stereoscopic image becomes possible. It should be noted that if applying the above-described grayscale expression to each of the first unit 1811, the second unit 1812 and the third unit 1813 described with reference to FIG. 45 to FIG. 47 and the like, a full-color stereoscopic image can be provided.

FIGS. 78A to 78B schematically show a display apparatus 1950 as a variation of the display apparatus 1900. FIG. 78A is a plan view of the xz plane when viewing the display apparatus 1900 from a position in the y-axis minus direction. The display apparatus 1950 includes a light source 1921 instead of the light source 1821 includes a light source 1922 instead of the light source 1822, and includes a light source 1923 instead of the light source 1823. The display apparatus 1950 further includes a light shielding section 1941, a light shielding section 1942 and a light shielding section 1943, a spacer 1951 and a spacer 1952 in addition to other components included in the display apparatus 1900. FIG. 78B is a plan view along the xy plane when viewing the display apparatus 1900 from the position in the z-axis plus direction.

The light source 1921 emits a blue light, the light source 1922 emits a green light, and the light source 1923 emits a red light. The light source 1921 is provided through an incident light end surface of the first unit 1811, an incident light end surface of the second unit 1812, and an incident light end surface of the third unit 1813. Similarly, the light source 1922 is provided through an incident light end surface of the first unit 1811, an incident light end surface of the second unit 1812, and an incident light end surface of the third unit 1813. Also, the light source 1923 is provided through an incident light end surface of the first unit 1811, an incident light end surface of the second unit 1812, and an incident light end surface of the third unit 1813.

The light shielding section 1941, the light shielding section 1942 and the light shielding section 1943 shield lights. The light shielding section 1941, the light shielding section 1942 and the light shielding section 1943 are, for example, light shielding tapes or light shielding films. The light shielding section 1941 is provided to a part of the incident light end surface of the first unit 1811. The light shielding section 1941 suppresses the light from the light source 1922 and the light from the light source 1923 from being incident onto the first unit 1811. Also, the light shielding section 1942 is provided to a part of the incident light end surface of the second unit 1812, and suppresses the light from the light source 1921 and the light from the light source 1923 from being incident onto the second unit 1812. The light shielding section 1943 is provided to a part of the incident light end surface of the third unit 1813, and suppresses the light from the light source 1921 and the light from the light source 1922 from being incident onto the third unit 1813.

Specifically, as shown in FIG. 78A and FIG. 78B, the light shielding section 1942 is provided at least between the incident light end surface of the second unit 1812 and the light source 1921, and between the incident light end surface of the second unit 1812 and the light source 1923. The light shielding section 1942 is not provided to the position where the light source 1922 has been provided among the incident light end surfaces of the second unit 1812. Accordingly, this allows that: the light from the light source 1921 and the light from the light source 1923 are not substantially incident onto the incident light end surface of the second unit 1812, while the light from the light source 1922 is incident from the incident light end surface of the second unit 1812.

Similarly, the light shielding section 1941 is provided at least between the incident light end surface of the first unit 1811 and the light source 1922, and between the incident light end surface of the first unit 1811 and the light source 1923. The light shielding section 1941 is not provided to a position where the light source 1921 has been provided among the incident light end surfaces of the first unit 1811. Accordingly, this allows that: the light from the light source 1922 and the light from the light source 1923 are not substantially incident onto the incident light end surface of the first unit 1811 while the light from the light source 1921 is incident onto the incident light end surface of the first unit 1811.

Also, the light shielding section 1943 is provided at least between the incident light end surface of the third unit 1813 and the light source 1921, and between the incident light end surface of the third unit 1813 and the light source 1922. The light shielding section 1943 is not provided in a position where the light source 1923 has been provided among the incident light end surfaces of the third unit 1813. Accordingly, this allows that: the light from the light source 1921 and the light from the light source 1922 are not substantially incident onto the incident light end surface of the third unit 1813 while the light from the light source 1923 is incident onto the incident light end surface of the third unit 1813.

It should be noted that it is sufficient if the light shielding section 1941 can shield the light in the wavelength band emitted by the light source 1922 and the light in the wavelength band emitted by the light source 1923. Also, it is sufficient if the light shielding section 1942 can shield the light in the wavelength band emitted by the light source 1921 and the light in the wavelength band emitted by the light source 1923. Also, it is sufficient if the light shielding section 1943 can shield the light in the wavelength band emitted by the light source 1921 and the light in the wavelength band emitted by the light source 1922.

It should be noted that the first unit 1811 may include a light converging section where the grayscale expression for the blue color, for example, has been added. The second unit 1812 may include a light converging section where the grayscale expression for the green color, for example, has been added. The third unit 1813 may include a light converging section where the grayscale expression for the red color, for example, has been added. Accordingly, a full-color stereoscopic image can be provided.

Also, the spacer 1951 is provided between the first unit 1811 and the second unit 1812. The spacer 1952 is provided between the second unit 1812 and the third unit 1813. According to the spacer 1951, it can prevent the first unit 1811 and the second unit 1812 from closely contacting with each other. Also, according to the spacer 1952, it can prevent the second unit 1812 and the third unit 1813 from closely contacting with each other.

FIGS. 79A to 79C show other examples of the design methods of the reflection surfaces in the light guiding plate 7. With reference to FIGS. 28A to 28C, a case where the light converging section is designed including 21 reflection surfaces by dividing an angle range which has been set from −30° to 30° per 3° has been described. In the design examples shown in FIGS. 28A to 28C, the number of the reflection surfaces forming the light to be converged on the fixed point is the same for any fixed point. Therefore, the pitch of the reflection surface becomes smaller as a distance from the light guiding plate 7 to the fixed point is shorter. On the other hand, FIGS. 79A to 79C show design methods for providing the reflection surfaces to the main surface 72 of the light guiding plate 7 at the same pitch.

As shown in FIG. 79A, the fixed point Pa in space on the observer side is set. As shown in FIG. 79B, the angle range within which the light from one light converging section corresponding to Pa is to be emitted is set. In the example of FIG. 79B, similar to FIG. 28B, the angle range from −30° to 30° is set. The range between a line 6000 and a line 6002 shown in FIG. 79B becomes the angle range within which the light from one light converging section is to be emitted.

As shown in FIG. 79C, by dividing the positions between an intersection point of the line 6000 and the main surface 72 and an intersection point of the line 6002 and the main surface 72 at the same pitch in the x-axis direction, each divided position is determined as the position of the reflection surface. In the example of FIG. 79C, 8 reflection surfaces for forming the lights to be converged on the fixed point Pa are provided. In this way, the reflection surfaces are provided at substantially equal pitches along the forming direction of the light converging sections.

FIGS. 80A to 80C show a design example of the reflection surfaces corresponding to the fixed point Pb in the vicinity of the main surface 72. FIG. 80A shows the positions of the reflection surfaces corresponding to the fixed point Pb. In the example of FIG. 80A, a distance from the light guiding plate 7 to the fixed point Pb is half of a distance from the light guiding plate 7 to the fixed point Pa. In an example of (FIG. 80A, four reflection surfaces for forming the light to be converged on the fixed point Pb are provided at the same pitch as the pitch of the reflection surfaces shown in FIG. 79C. In the x-axis direction, the length of the alignment of the plurality of reflection surfaces shown in FIG. 79A is half of the length of the alignment of the plurality of reflection surfaces shown in FIG. 80C. Generally, in the alignment direction of the reflection surfaces, the length from one end to the other end where the reflection surface has been formed is approximately proportional to a distance from the light guiding plate 7 to the fixed point.

For the fixed point Pb, if the design method shown in FIGS. 28A to 28C is applied, the pitch in the x direction for the reflection surfaces is shorter than the pitch shown in FIG. 80A. For that reason, overlapping of the reflection surfaces may be larger in some cases. According to the design method shown in FIGS. 79A to 79C, it can prevent the overlapping of the reflection surfaces from becoming larger.

According to the design method shown in FIGS. 79A to 79C, while it can prevent the overlapping of the reflection surfaces from becoming larger, the intensity of the light forming the fixed point Pb becomes less than the intensity of the light forming the fixed point Pa. FIG. 80B shows one example of the reflection surfaces for eliminating the light intensity difference. FIG. 80B schematically shows a forming range of each reflection surface corresponding to Pa and a forming range of each reflection surface corresponding to Pb. The length of the reflection surfaces corresponding to the fixed point Pb is twice as much as the length of the reflection surfaces corresponding to the fixed point Pa. Accordingly, the light from each reflection surface corresponding to Pb becomes two times, and it can suppress the intensity of the light forming the fixed point Pb from being smaller than the intensity of the light forming the fixed point Pa. Generally, in the direction along the respective forming directions of the light converging sections, it is preferable to set the respective lengths of the plurality of reflection surfaces to be approximately inversely proportional to the respective length of the light converging sections. It should be noted that the height of the reflection surface corresponding to the fixed point Pb may be set as twice as much as the height of the reflection surface corresponding to the fixed point Pa. In this way, when the design example shown in FIGS. 79A to 79C is adopted, the area of the reflection surface for forming the fixed point by the light guiding plate 7 may be proportional to the distance to the light guiding plate 7.

FIG. 80C and FIG. 80D schematically show the viewed shapes of the reflection surface corresponding to the fixed point Pb projected onto the xy plane. As illustrated, a cross section if cut in a surface parallel to the reflection surface and to the xy plane becomes a curved line. Therefore, the light reflected on the reflection surface is spread in the x-axis direction. However, since the position of the fixed point Pb is close to the light guiding plate 7, even if the reflected light is spread in the x-axis direction, it can prevent the light for forming the fixed point adjacent to the fixed point Pb from mixing in some cases.

FIGS. 81A to 81B schematically show examples where a plurality of reflection surfaces are periodically arranged together. FIG. 81A shows a stage on the way of the design before periodically arranging. FIG. 81B shows a periodic arrangement of the actually formed reflection surfaces.

As shown in FIG. 81A, at the stage on the way of the design, the positions of the reflection surfaces respectively on the light converging section 6101, the light converging section 6102, the light converging section 6103, the light converging section 6104 and the light converging section 6105 are determined based on the position of each fixed point, the angle range, and the pitch of the reflection surfaces. The light converging section 6101, the light converging section 6102, the light converging section 6103, the light converging section 6104 and the light converging section 6105 are aligned in this order in the y-axis plus direction.

At this stage, the area within the xy plane is divided into a plurality of columns at a predetermined interval in the x direction and divided into a plurality of rows at a predetermined interval in the y-direction. Accordingly, the area within the xy plane is divided into a plurality of partial areas including a partial area 6201 and a partial area 6202. The interval for dividing in the x direction and the interval for dividing in the y-direction may be the same or may be different. Each partial area may be a square or may be a rectangle.

Next, for each of the plurality of partial areas, if a plurality of reflection surfaces exist in one partial area, one continuous reflection surface is generated by moving the positions of the plurality of reflection surfaces in one partial area and connecting the ends of the reflection surfaces.

Specifically, within the partial area 6201, a continuous reflection surface 6401 is formed in a forming direction of the light converging section 6101 and the light converging section 6102 by connecting the reflection surface 6301 included in the light converging section 6101 with the reflection surface 6302 included in the light converging section 6102. Also, within the partial area 6202, a continuous reflection surface 6402 is formed in a forming direction of the light converging section 6103, the light converging section 6104 and the light converging section 6105 by connecting the reflection surface 6303 included in the light converging section 6103, the reflection surface 6304 included in the light converging section 6104 and the reflection surface 6305 included in the light converging section 6105. In this way, among the plurality of reflection surfaces included in the light converging sections different from each other, one continuous reflection surface is formed per partial area in the forming direction of the light converging sections by connecting the ends of the reflection surfaces positioned within the area in a predetermined size. Then, the connected reflection surfaces are provided at substantially equal pitches in the forming direction of the light converging sections. Accordingly, the reflection surfaces in a matrix-like arrangement periodically arranged in the x direction and the y-direction can be formed.

FIGS. 82A to 82B are the drawings for describing the angle range within which the light from the light guiding plate 7 can be emitted. FIG. 82A shows three reflection surfaces where the normal line directions projected onto the inside of the xy plane are different from each other. As one example, the normal line of the reflection surface 6410 forms 0° with the y axis, the normal line of the reflection surface 6420 forms 30° with the y axis, and the normal line of the reflection surface 6430 forms 40° with the y axis. It should be noted that the light source 22 is set as provided in the center of the end surface 73 in the x-axis direction, and in order to describe understandably easily, the light parallel to the y axis is set to be incident onto each reflection surface.

The reflected lights from the reflection surface 6410 and the reflection surface 6420, at an incident angle to the main surface 71 less than a critical angle, are substantially emitted from the main surface 71. On the other hand, the reflected light from the reflection surface 6430, at an incident angle to the main surface 71 not less than the critical angle, is not substantially emitted from the main surface 71. Therefore, as shown in FIG. 82B, the angle range forming the fixed point 6490 is determined. For that reason, for example, as a point 6500, an image cannot be formed in a position where the reflection surfaces are apart in the alignment direction (the x-axis direction) in each light converging section.

FIGS. 83A to 83C show a configuration for forming an image in a position where the reflection surfaces are apart in the alignment direction. As shown in FIG. 83A, the light source 22 is provided to an end portion of the end surface 73 in the x-axis minus direction. The light from the light source 22 is incident into the light guiding plate 7 from a position closer to the end portion of the light guiding plate 7 than the central position of the alignment of the plurality of reflection surfaces. For that reason, as shown in FIG. 83B, within the xy plane, the incident lights toward the reflection surfaces are obliquely incident in a direction orthogonal to the direction in which the reflection surfaces are aligned. Accordingly, as shown in FIG. 83B and FIG. 83C, the point 6500 can be formed. For that reason, an image in a position where the reflection surfaces are apart in the alignment direction can be formed.

FIG. 84 shows a formation where the end surface 73 includes an inclination surface in the end portion. The end surface 73 includes an inclination surface 6600 inclined in the x-axis direction in an end portion on the x-axis minus side. The inclination surface 6600 is inclined by a predetermined inclination angle with respect to the x axis. The light source 22 is provided opposite to the inclination surface 6600. The optical axis of the emitted light from the light source 22 is provided so as to be substantially orthogonal to the inclination surface 6600. Therefore, the light guiding plate 70 allows the light from the light source 22 to propagate in the direction inclined by the inclination angle from the y-axis direction. By providing the inclination surface 6600, the utilization efficiency of the light from the light source 22 can be increased. It should be noted that the inclination angle of the end surface 73 may be determined based on the angle range within which an image is to be formed. As described with reference to FIGS. 83A to 83C and FIG. 84 and the like, by inclining the propagating direction of the propagation light of the light guiding plate 70 with respect to the y axis, an image can be formed in the position where the reflection surfaces are apart in the alignment direction. As shown in FIG. 83A and FIG. 84, the light guided by the light guiding plate 7 may be incident into the light guiding plate 7 from a position closer to the end portion of the light guiding plate 7 than the position of the center of each of the plurality of light converging sections in the direction along the x axis.

FIG. 85 schematically shows a ticket examination machine system 6800 using a display apparatus 6700 which allows the propagation light to be inclined with respect to the y axis. The ticket examination machine system 6800 includes a ticket examination machine 6810 and a ticket examination machine 6820. The ticket examination machine 6810 and the ticket examination machine 6820 are provided opposite to each other such that a passer passes through between the ticket examination machine 6810 and the ticket examination machine 6820.

The ticket examination machine 6810 includes a display apparatus 6710 which is provided to a side surface on the passer passing side. As described with reference to FIGS. 83A to 83C and the like, the display apparatus 6710 has a configuration where the light source 22 is arranged such that the propagation light is inclined to the y axis. The x-axis minus direction in the display apparatus 6710 corresponds to a direction through which the passer of the ticket examination machine 6810 passes. The y-axis plus direction in the display apparatus 6710 corresponds to a direction orthogonal to the surface through which the passer of the ticket examination machine 6810 passes. The y-axis plus direction corresponds to a vertical upward direction. As shown in FIG. 85, the light source 22 is provided to the end portion in the x-axis minus direction of the end surface of the light guiding plate. For that reason, the display apparatus 6710 can form an image 6701 in a position apart in the x-axis plus direction. Therefore, the observer can visually recognize the image 6711 from the position apart from the ticket examination machine 6810.

The ticket examination machine 6820 includes a display apparatus 6720 provided to a side surface on the passer passing side. The display apparatus 6720 forms an image 6721 symmetrical to the image 6720 for the surface parallel to the xy plane. Specifically, the display apparatus 6720 has a configuration plane symmetric to the display apparatus 6710 to the reference surface in the case where a reference surface parallel to the xy plane is set in a position on the z axis plus side. For that reason, the display apparatus 6710 can form the image 6701 in a position apart in the x-axis plus direction. According to the display apparatus 6720, the image 6721 visually recognizable by the observer from the position apart from the ticket examination machine 6810 can be formed.

FIG. 86 schematically shows a display apparatus 6910 applied to the ticket examination machine system 6900. FIG. 86 is a schematic perspective view for showing the entire ticket examination machine system 6900. FIG. 87 is a cross-section view of a section A of the ticket examination machine system 6900. The ticket examination machine system 6900 includes a ticket examination machine body 6960 and a display unit 6970. The display unit 6970 includes a display apparatus 6910 and a display apparatus 6980.

The ticket examination machine body 6960 further includes a communication section 701 which communicates with a device carried by a passer. The display apparatus 6980 displays information on the display section 6982 based on a communication result of the communication section 6990 with the device carried by the passer. The device carried by the passer is a non-contact type communication device, for example, an IC card such as a non-contact type IC card train ticket, a cell phone with a non-contact type communication function, and the like. The display apparatus 6980 displays a balance of electronic money stored in the non-contact type communication device and the like on the display section 6982.

The display apparatus 6910 includes a light guiding plate 6907 and the light source 22. The light guiding plate 6907 includes a tabular light guiding section 6920 onto which the light from the light source 22 is incident along the light guiding direction of the light, a curved light guiding section 6930, and a tabular light emitting section 6940. The tabular light guiding section 6920 is positioned under the display apparatus 6980. The light emitting section 6940 is positioned above the display apparatus 6980 and is provided overlapping on the display surface 6982 of the display apparatus 6980. The curved light guiding section 6930 is an area between the light guiding section 6920 and the light emitting section 6940. The light guiding section 6930 connects the light guiding section 6920 with the light emitting section 6940. The light guiding section 6920, the light guiding section 6930 and the light emitting section 6940 are provided so as to surround the display apparatus 6980 from three directions. The light incident onto the light guiding plate 6907 is guided by the light guiding section 6920, the light guiding section 6930 and the light emitting section 6940 in this order, and the emission surface where the light forming the image 6916 is to be emitted is provided by a surface on the opposite side to the surface on the light guiding section 6920 side in the light emitting section 6940.

The display apparatus 6910 forms the image 6916 in space vertically upward the display section 6982 of the display apparatus 6980. The image 6916 is an image for notifying the passer of the position of the display section 6982. The light from the light source 22 is guided by the light guiding section 6920 and the light guiding section 6930, and reaches the light emitting section 6940. In the light emitting section 6940, the above-described reflection surfaces for forming the image 6916 have been formed.

According to the display apparatus 6910, the light from the light source 22 proceeds for a long distance in the light guiding direction of the light guiding plate 6907 and reaches the light emitting section 6940. Accordingly, the distance for guiding within the light guiding plate 6907 becomes longer and the light reaching the light emitting section 6940 can be further close to a parallel light. Therefore, since it is easy to make the light guided by the light guiding plate 6907 deflect to a direction toward a space on the observer side, the image 6916 is easily formed in the space on the observer side. It should be noted that, instead of the light guiding section 6930, a member which is not curved like the reflecting section 980 of FIGS. 70A to 70B may be applied.

FIG. 88 schematically shows a positional relation of passers being able to visually recognize the image 6916. The image 6916 is an image formed on the display section 6982 and is for notifying the passer of the position of the display section 6982. In this case, it is preferable that the image 6916 is presented so as to be exactly seen by a passer 7120 who is in a position slightly apart from the display unit 6970. On the other hand, although it is necessary that the display contents of the display section 6982 can be exactly seen by a passer 7110 who is in a position in the vicinity of the display unit 6970, the image 6916 is not needed to be seen. For that reason, for the passer 7110, it is preferable that the image 6916 is set not to be seen.

The angle range within which the light from the reflection surface provided to the light emitting section 6940 can be emitted changes depending on the angle α shown in FIG. 18. As the angle α shown in FIG. 18 is larger, the light can be emitted in the position closer to the display unit 6970. It is preferable that the angle α is less than 30° in order to set the image 6916 not to be seen by the passer who is in a position in the vicinity of the display unit 6970.

FIGS. 89A to 89C show a configuration for making the incident light of the light guiding plate 7 close to the parallel light. As the light guiding distance of the light guiding plate is set to be longer as FIG. 86 and the like, since the light incident onto the end surface 75 or the end surface 76 of the light guiding plate 7 before reaching the light emitting area 7040 is increased, the luminance of the light emitted from the light emitting area 69407 is decreased. Here, it is preferable that the light incident onto the light guiding plate 7 is close to the parallel light.

FIG. 89A shows a variation where between the light source 22 and the end surface 73, the spread of the light from the light source 22 within the xy plane is set smaller and an optical member 7000 incident onto the end surface 73 is provided. The optical member 7000 is, for example, a lens to make the spread of the light within the surface parallel to the xy plane become smaller. As shown in FIG. 89A, within the xy plane, the optical member 7000 may convert the light from the light source 22 into the light which is spread after converged in the specific position within the light guiding plate 7. As another example of the optical member 7000, the light can be converted into a light converged in the specific position outside of the light guiding plate 7. Also, as further another example of the optical member 7000, the spread of the light from the light source 22 in the xy plane may be simply set to be smaller without causing the light to be converged on the specific position within the light guiding plate 7 or outside of the light guiding plate 7.

FIG. 89B shows a variation where an optical member 7010 including a side surface 7011 and a side surface 7012 which reflect the light from the light source 22 is provided between the light source 22 and the end surface 73. The length in the x-axis direction of the optical member 7010 has a tapered shape longer on the light guiding plate 7 side than on the light source 22 side.

FIG. 89C shows a variation where between the light source 22 and the end surface 73, a lens section 7020 making the spread of the light from the light source 22 within the xy plane smaller is formed. The lens section 7020 has a shape protruding on the light source 22 side from the end surface 73. The spread of the light from the light source 22 in the xy plane in a case where the light is incident onto the end surface 73 becomes small by the lens section 7020. It should be noted that the optical member 7000, the optical member 7011 and the lens section 7020 are examples of the light conversion section, which are provided between the light source 22 and the light guiding plate 7 to convert the light from the light source 20 into the light having a small spread angle within the xy plane.

In the above, the display apparatus according to various embodiments has been described showing as examples the display apparatus 700, the display apparatus 102, the display apparatus 100 and the variations. Generally, in a stereoscopic display apparatus with multi-view including the binocular type, as shown in FIG. 90A, an object can be stereoscopically recognized by obtaining a distance feeling according to the border of the displayed object or the pattern, the feature, the texture and the like in accordance with the fine changes of colors or luminance within the object. However, when trying to achieve the stereoscopic display apparatus using the light guiding plate, blurring or jagging of the border of the object may occur due to the influence from the prism in the light guiding plate and the like in some cases. Also, it may be difficult to make the patterns and the like of two objects be the same in some cases.

For example, in a case where the light guiding plate has been used, since a granular feeling of dots is generated by the prism pattern in the light guiding plate and the like, it is very difficult to make the pattern and the like within the object to be the same. Also, when trying to achieve a transparent display apparatus, since a diffusion plate or a prism plate and the like cannot be used, it is difficult to make the object be the same. Although the uniformity can be increased to some level by refining the prism pattern, since the diffraction phenomenon occurs, the prism cannot be set as 10 μm or less. Also, it is also not easy to make the objects the same from the manufacturing precision of the prism pattern. Also, since the light is emitted on the way of light guiding toward a desired emitting position within the light guiding plate, it is also not easy to exactly uniform the light emission quantity (for example, refer to. 90B). For that reason, it is not easy to display an image which can be readily stereoscopically recognized by using the light guiding plate. Also, as described with reference to FIG. 92A and FIG. 92B, even if the display apparatus can be set transparent, since the background of the display apparatus is seen by the observer, the stereoscopic image is hardly focused and it is difficult to obtain the distance feeling. Also, as shown in FIG. 92A, although a point 9020 apart from the optical device 9000 can be focused only when viewing the optical device 9000 with both eyes, a position of a point 9012 on the optical device 9000 is focused when viewing with the right eye, and a position of a point 9011 on the optical device 9000 is focused when viewing with the left eye. In this way, the position of the desired point 9020 apart from the optical device 9000 is difficult to be focused.

On the other hand, for example, as schematically shown in FIG. 91A and FIG. 91B and the like, according to the display apparatus in accordance with the embodiments described above, the lights can be converged on the point or the line by the light converging section and the stereoscopic image can be formed by the aggregation of the points or the aggregation of the points on the line. Also, the transparent display apparatus to form a stereoscopic image can be provided. Also, according to the display apparatus in accordance with the above-described embodiments, since the stereoscopic image can be formed by the aggregation of the convergence points and the like, the bright spot of the converging position can be exactly seen. For that reason, the problem due to the border or the pattern of the object and the like is suppressed and the distance feeling becomes easily obtained. Also, since the converging position can be exactly seen as the bright spot, the influence of non-uniformity of the light emission quantity is extremely small. For that reason, compared to a so-called multi-view stereoscopic display apparatus, a stronger stereoscopic effect can be provided. The display apparatus according to the above-described embodiments is in particular effective for a case where the three-dimensional object to be projected has a relatively simple shape. Further, according to the display apparatus in accordance with the above-described embodiments, since the light is converged by the linear light converging section (for example, FIG. 91A) generally, even if the position of the observer is changed, the position of the stereoscopic image does not change significantly. For that reason, even if the light is not converged on one complete point or line due to the influence of the manufacturing precision and the like, the stereoscopic effect is easily obtained. Also, as shown in FIG. 91A, the wavefront of the light emitted from the linear light converging section becomes a wavefront of light where the wavefront is converged on a point 8000 (or on a line parallel to a display surface including the point 8000) and is diverged from the point 8000 (or on the line parallel to a display surface including the point 8000). For that reason, the position of the point 8000 apart from the display surface is easily focused.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10, 100, 102, 110, 120, 1000, 1100, 1200, 1300, 1400, 1500, 1700, 1800, 1900, 2000, 2100, 2200, 2300, 2400, 2500, 2600, 2800, 3000, 3100, 3200, 3300, 4000, 5000 . . . display apparatus, 1021 . . . light source, 1024 . . . light emitting section, 1025 . . . aperture, 1026 . . . light shielding section, 112 . . . optical component, 1121 . . . light source, 1122 . . . light source section, 1124 . . . light emitting section, 113 . . . reflection surface, 1180 . . . pattern section, 1181 . . . reflection surface, 1182 . . . side surface, 1183 . . . side surface, 1184 . . . rear surface, 1186 . . . front edge, 1187 . . . rear edge, 1221 . . . light source, 1224 . . . light emitting section, 1228 . . . lens, 1280 . . . pattern section, 1281 . . . reflection surface, 1284 . . . rear surface, 1286 . . . front edge, 1301, 1302 . . . cover film, 1303, 1304, 1410 . . . adhesive layer, 1310 . . . base material layer, 1311, 1312 . . . front surface layer, 140, 141, 142, 143, 144 . . . reflection surface, 1407, 1507 . . . light guiding plate, 1440 . . . light converging section, 1441, 1446 . . . reflection surface, 1471, 1472 . . . main surface, 1472 . . . main surface, 1480 . . . translucent sheet, 150, 151, 152, 159 . . . reflection surface, 1521 . . . light source, 1560 . . . two-dimensional display area, 161, 162, 163, 164 . . . reflection surface, 1707 . . . light guiding plate, 171, 172 main surface, 1722 . . . light source, 1730 . . . stereoscopic image, 1732 . . . two-dimensional image, 1740 . . . light converging section, 1775 . . . side surface, 1790 . . . scattered pattern group, 1804 . . . stereoscopic image, 181 . . . line, 1811, first unit, 1812 . . . second unit, 1813 . . . third unit, 182 . . . line, 1821 . . . light source, 1822, 1823 . . . light source, 1870, 1872 . . . light shielding section, 1880, 1882 . . . adhesive layer, 190 . . . line, 200 . . . cone, 202 . . . intersection line, 2021, 2022, 2023 . . . light source, 21 . . . light source, 210 . . . circle, 2121, 2122, 2123, 2124 . . . light source, 220 . . . projection axis, 2421 . . . first light source, 2422 . . . second light source, 2550 . . . cylindrical lens, 2607, 2707 . . . light guiding plate, 2750 . . . cylindrical lens section, 2770 . . . flat section, 2850 . . . cylindrical lens, 30 . . . light converging section, 300 . . . observer, 3021 . . . light source, 3107 . . . light guiding plate, 3121 . . . light source, 3141, 3142, 3143 . . . reflection surface, 32 . . . light converging section, 3207 . . . light guiding plate, 3221 . . . light source, 3241, 3242, 3243 . . . refractive surface, 33 . . . light converging section, 3307 . . . light guiding plate, 3321 . . . light source, 3341, 3342, 3343 . . . reflection surface, 34, 35, 36, 40 . . . light converging section, 4006 stereoscopic image, 4007 . . . light guiding plate, 4010 . . . straight line, 4040 . . . light converging section, 4071 . . . main surface, 4072 . . . main surface, 41 . . . reflection surface, 410 . . . signboard, 4141, 4142, 4143 . . . reflection surface, 42, 43, 4144, 4143, 4342, 4241, 4242 . . . reflection surface, 4441, 4442, 4443, 4444 . . . reflection surface, 420 . . . fingerprint detection apparatus, 430 . . . stereoscopic image, 44, 45, 46, 47, 48 . . . reflection surface, 50 light converging section, 500 . . . portion, 5000 . . . display apparatus, 5002 . . . product, 5006 . . . stereoscopic image, 5007 . . . light guiding plate, 5010, 5020 . . . straight line, 5040 . . . light converging section, 5071, 5072 . . . main surface, 510 . . . portion, 5141, 5142, 5143 . . . reflection surface, 540, 550 . . . stereoscopic image, 7 . . . light guiding plate, 70 . . . light guiding plate, 700 . . . display apparatus, 5, 6, 706 . . . image, 707 . . . light guiding plate, 71, 72 . . . main surface, 730, 732 . . . light converging section, 740 . . . portion, 73, 74, 75, 76 . . . end surface, 771, 772 . . . main surface, 773, 774, 775, 776 . . . end surface, 790 . . . line, 79 . . . flat surface, 80 . . . pattern section, 81, 281 . . . reflection surface, 82, 83, 282, 283 . . . side surface, 84 . . . rear surface, 86 . . . front edge, 1941, 1942, 1943 . . . light shielding section, 1921, 1922, 1923 . . . light source, 6101, 6102, 6103, 6104, 6105 . . . light converging section

What is claimed is:

1. An optical device, comprising:
a light guiding plate which guides lights within a surface parallel to an emission surface; and
a plurality of light converging sections onto which the lights guided by the light guiding plate are incident, each of the plurality of light converging sections having an optical surface which allows the lights guided by the light guiding plate to be emitted from the emission surface in a direction where the emitted light is to be substantially converged on one convergence point or convergence line in space viewed from a distance by a viewer, or to be substantially diverged from one convergence point or convergence line in space viewed from a distance by a viewer, wherein
the plurality of light converging sections are formed respectively along a predetermined line within the surface parallel to the emission surface,
the convergence points or the convergence lines are different from each other among the plurality of light converging sections and an image is formed in space distant from the viewer by an aggregation of a plurality of the convergence points or the convergence lines, and
each of the plurality of light converging sections comprise a plurality of reflection surfaces on a main surface angled to be non-parallel with an opposing emission surface so as to cause lights reflected off the plurality of reflection surfaces to converge on a common point or line.

2. An optical device, comprising:
a light guiding plate which guides lights within a surface parallel to an emission surface; and
a plurality of light converging sections onto which the lights guided by the light guiding plate are respectively incident, the plurality of light converging sections formed respectively with a length in a direction orthogonal to a light guiding direction of the light guiding plate within the surface parallel to the emission surface, wherein
each of the plurality of light converging sections has an optical surface where a direction of a normal line continuously or intermittently changes along a lengthwise direction of each of the light converging sections when the normal line is projected onto the surface parallel to the emission surface, and allows the lights guided by the light guiding plate to be emitted from the emission surface in a direction where the lights guided by the light guiding plate are, by being reflected by the optical surface, substantially converged on one convergence point or convergence line in space viewed from a distance by a viewer, or substantially diverged from one convergence point or convergence line in space viewed from a distance by a viewer,
the convergence points or the convergence lines are different from each other among the plurality of light converging sections, and an image is formed in space distant from the viewer by an aggregation of a plurality of the convergence points or the convergence lines, and
each of the plurality of light converging sections comprise a plurality of reflection surfaces on a main surface angled to be non-parallel with an opposing emission surface so as to cause lights reflected off the plurality of reflection surfaces to converge on a common point or line.

3. The optical device according to claim 1 or 2, wherein a spread angle of the lights guided by the light guiding plate at each point within the light guiding plate is 5° or less within the surface parallel to the emission surface.

4. The optical device according to claim 1 or 2, satisfying $1.5\theta < \Phi_{Ap}/5$,
where $\theta$ is a spread angle of the lights guided by the light guiding plate at each point within the light guiding plate, and $\Phi_{Ap}$ is an angle formed by lines connecting two end points of the image with each of the plurality of light converging sections in a direction along a forming direction of the plurality of light converging sections.

5. The optical device according to claim 1 or 2, satisfying $1.5\theta < 2\Phi_{Ai}$,
where $\theta$ is a spread angle of the lights guided by the light guiding plate at each point within the light guiding plate, and $\Phi_{Ai}$ is an angle formed by lines connecting two feature points included in the image with each of the plurality of light converging sections when the lines are projected onto a surface orthogonal to a light guiding direction of the light guiding plate and the emission surface.

6. The optical device according to claim 1 or 2, satisfying $1.5\theta < 2\Phi_{Ar}$,
where $\theta$ is a spread angle of the lights guided by the light guiding plate at each point within the light guiding plate, and $\Phi_{Ar}$ is an angle formed by lines connecting two of the convergence points adjacent to each other in a direction along a forming direction of the plurality of light converging sections with each of the plurality of light converging sections when the lines are projected onto a surface orthogonal to a light guiding direction of the light guiding plate and the emission surface.

7. The optical device according to claim 1 or 2, satisfying W≤L/10,
where L is a distance between an incident light end surface of the light guiding plate and a center of the emission surface, and W is a spread width of lights incident from the incident light end surface.

8. The optical device according to claim 1 or 2, further comprising:
a light source; and
a light shielding section which is provided between an incident light end surface of the light guiding plate and the light source and has an aperture that limits lights incident from the light source onto the incident light end surface.

9. The optical device according to claim 1 or 2, further comprising:
a light source; and
a collimating section which collimates lights from the light source to make the lights incident onto an incident light end surface of the light guiding plate.

10. The optical device according to claim 1 or 2, wherein at least one light converging section of the plurality of light converging sections has a plurality of reflection surfaces continuously arranged along a forming direction of the light converging section.

11. The optical device according to claim 1 or 2, wherein a length of each of the plurality of light converging sections in a direction orthogonal to a forming direction of each of the light converging sections is not above ½ of a distance between the light converging sections adjacent to each other in a direction orthogonal to the forming direction of each of the light converging sections.

12. The optical device according to claim 1 or 2, wherein at least one light converging section of the plurality of light converging sections includes a plurality of optical surfaces forming a diffraction grating.

13. The optical device according to claim 1 or 2, wherein at least one light converging section of the plurality of light converging sections includes, on a main emission surface of the light guiding plate, at least one cylindrical lens.

14. The optical device according to claim 1 or 2, wherein the plurality of light converging sections are formed along a straight line, a concave curve or a convex curve.

15. The optical device according to claim 1 or 2, wherein one of a light converging section having the convergence point or the convergence line on the emission surface side of the light guiding plate among the plurality of light converging sections and a light converging section having the convergence point or the convergence line on an opposite side to the emission surface of the light guiding plate among the plurality of light converging sections is formed along a convex curve, and the other is formed along a concave curve.

16. The optical device according to claim 1 or 2, where the plurality of light converging sections are formed along lines approximately similar to each other among the plurality of light converging sections.

17. The optical device according to claim 1 or 2, wherein as a distance between each of the convergence points or a point on each of the convergence lines and the light guiding plate is longer, the plurality of light converging sections are respectively formed longer in a forming direction of each of the light converging sections.

18. The optical device according to claim 1 or 2, wherein the plurality of light converging sections are formed along intersection lines of a conical surface with each of the convergence points or a point on each of the convergence lines as a vertex and the light guiding plate, the conical surface having a predetermined solid angle to a predetermined axis.

19. The optical device according to claim 1 or 2, wherein at least one light converging section of the plurality of light converging sections are divided into a plurality of portions along a forming direction of the light converging section.

20. The optical device according to claim 19, satisfying $\Delta\psi < 1.5\theta$,
where $\Delta\psi$ is an angle formed by a straight line connecting a first portion of the plurality of portions with the convergence point or the point on the convergence line and a straight line connecting a second portion adjacent to the first portion with the convergence point or the point on the convergence line, and $\theta$ is a spread angle of lights guided by the light guiding plate at each point within the light guiding plate.

21. The optical device according to claim 19, an angle formed by a straight line connecting a first portion of the plurality of portions with the convergence point or the point on the convergence line and a straight line connecting a second portion adjacent to the first portion with the convergence point or the point on the convergence line is less than 5°.

22. The optical device according to claim 19, satisfying $\Delta\psi > \theta/5$,
where $\Delta\psi$ is an angle formed by a straight line connecting a first portion of the plurality of portions with the convergence point or the point on the convergence line and a straight line connecting a second portion adjacent to the first portion with the convergence point or the point on the convergence line, and $\theta$ is a spread angle of lights guided by the light guiding plate at each point within the light guiding plate.

23. The optical device according to claim 1 or 2, wherein an angle formed by straight lines connecting the convergence point or the convergence line of each of the plurality of light converging sections with two end points in a direction along a forming direction of each of the light converging sections is 20° or more.

24. The optical device according to claim 1 or 2, wherein within the surface parallel to the emission surface, a pattern density of the plurality of optical surfaces included in the plurality of light converging sections is 30% or less.

25. The optical device according to claim 1 or 2, wherein the plurality of light converging sections include:
a first light converging section which allows the lights guided by the light guiding plate to be emitted from the emission surface in a direction where the emitted light is to be substantially converged on a first convergence point or a first convergence line or to be substantially diverged from the first convergence point or the first convergence line, and
a second light converging section which allows the lights guided by the light guiding plate to be emitted from the emission surface in a direction where the emitted light is to be substantially converged on a second convergence point or a second convergence line or to be substantially diverged from the second convergence point or the second convergence line, wherein the first convergence point or the first convergence line is closer to the emission surface than the second convergence point or the second convergence line, and wherein the first light converging section does not have the optical surface in a position at which a straight line connecting the first convergence point or a point on the first convergence line with the second convergence point or a point on the second convergence line intersects the light guiding plate.

26. The optical device according to claim 1 or 2, wherein the plurality of light converging sections include:

a first light converging section which allows the lights guided by the light guiding plate to be emitted from the emission surface in a direction where the emitted light is to be substantially diverged from a first convergence point or a first convergence line in space on an opposite side to a space where lights are emitted from the emission surface, wherein the first convergence point or the first convergence line is in a position apart from the light guiding plate than a position in which an object is to be arranged in a space distant from the viewer on an opposite side to a space distant from the viewer where lights are emitted from the emission surface, and wherein the first light converging section does not have the optical surface in a position in which a straight line connecting the first convergence point or a point on the first convergence line with the position in which the object is to be arranged intersects the light guiding plate.

27. The optical device according to claim 1 or 2, further comprising:

a light conversion section which is provided between a light source and the light guiding plate and converts lights from the light source into lights having a small spread angle within the surface parallel to the emission surface.

28. The optical device according to claim 1 or 2, further comprising:

a light conversion section which is provided between a light source and the light guiding plate and converts lights from the light source into lights which are converged in a light guiding direction of the light guiding plate within the surface parallel to the emission surface.

29. The optical device according to claim 1 or 2, wherein the lights guided by the light guiding plate are incident into the light guiding plate from a position closer to an end portion of the light guiding plate than a position of a center of each of the plurality of light converging sections in a direction along a forming direction of the plurality of light converging sections.

30. The optical device according to claim 1 or 2, wherein the light guiding plate includes:

a tabular first light guiding section, a tabular second light guiding section provided approximately parallel to the first light guiding section, and a third light guiding section connecting the first light guiding section with the second light guiding section, wherein the lights incident onto the light guiding plate are guided to the first light guiding section, the third light guiding section, and the second light guiding section in this order, and wherein the emission surface is provided by a surface on an opposite side to a surface facing the first light guiding section in the second light guiding section.

31. The optical device according to claim 1 or 2, wherein each of the plurality of light converging sections allows the emitted light to be emitted from the emission surface, the emitted light toward a space on a side in a direction of the lights guided by the light guiding plate from a position of each of the light converging sections.

32. The optical device according to claim 1 or 2, wherein an acute angle which is an angle formed by the surface parallel to the emission surface and the optical surface is less than 30°.

33. The optical device according to claim 1 or 2, wherein a plurality of optical surfaces included in each of the plurality of light converging sections are provided at a substantially equal pitch along a forming direction of each of the plurality of light converging sections.

34. The optical device according to claim 33, wherein a length of each of the plurality of optical surfaces is approximately inversely proportional to a length of each of the light converging sections in a direction along a forming direction of each of the plurality of light converging sections.

35. The optical device according to claim 33, wherein at least one optical surface included in a first light converging section of the plurality of light converging sections and at least one optical surface included in a second light converging section of the plurality of light converging sections are provided as a continuous reflection surface connected with each other in a forming direction of the first light converging section and the second light converging section.

* * * * *